United States Patent
Patriarche

(10) Patent No.: US 10,672,113 B2
(45) Date of Patent: Jun. 2, 2020

(54) METHODS AND SYSTEMS FOR NORMALIZING IMAGES

(71) Applicant: AI ANALYSIS, INC., Bellevue, WA (US)

(72) Inventor: Julia Patriarche, Bellevue, WA (US)

(73) Assignee: AI Analysis, Inc., Bellevue, WA (US)

( * ) Notice: Subject to any disclaimer, the term of this patent is extended or adjusted under 35 U.S.C. 154(b) by 0 days.

(21) Appl. No.: 16/251,412

(22) Filed: Jan. 18, 2019

(65) Prior Publication Data

US 2019/0156470 A1 May 23, 2019

Related U.S. Application Data

(62) Division of application No. 15/347,681, filed on Nov. 9, 2016, now Pat. No. 10,192,295.

(51) Int. Cl.
*G06T 5/00* (2006.01)
*G06T 5/50* (2006.01)
*G06T 7/00* (2017.01)

(52) U.S. Cl.
CPC ............. *G06T 5/009* (2013.01); *G06T 5/008* (2013.01); *G06T 5/50* (2013.01); *G06T 7/97* (2017.01); *G06T 2207/10024* (2013.01); *G06T 2207/20008* (2013.01); *G06T 2207/20012* (2013.01)

(58) Field of Classification Search
CPC ........... G06T 5/008; G06T 5/007; G06T 5/50; G06T 5/009; G06T 7/0022; G06T 7/97; G06T 2207/20008; G06T 2207/20012; G06T 2207/20208; G06T 2207/20228; H04N 19/176; H04N 19/186; H04N 19/157
See application file for complete search history.

(56) References Cited

U.S. PATENT DOCUMENTS

| | | | | |
|---|---|---|---|---|
| 8,873,812 B2* | 10/2014 | Larlus-Larrondo | ...... | G06K 9/00 382/103 |
| 8,934,697 B2* | 1/2015 | Wiemker | ................ | G06T 11/60 382/132 |
| 9,025,880 B2* | 5/2015 | Perazzi | ................ | H04N 19/117 382/190 |
| 9,218,651 B2* | 12/2015 | Zhao | ................... | H04N 1/6027 |
| 9,691,140 B2* | 6/2017 | Seshadrinathan | ......... | G06T 5/50 |
| 10,235,344 B2* | 3/2019 | Moutafis | ................ | G06F 17/17 |

(Continued)

*Primary Examiner* — Michael S Osinski
(74) *Attorney, Agent, or Firm* — Olympic Patent Works PLLC

(57) ABSTRACT

The current document is directed to digital-image-normalization methods and systems that generate accurate intensity mappings between the intensities in two digital images. The intensity mapping generated from two digital images is used to normalize or adjust the intensities in one image in order to produce a pair of normalized digital images to which various types of change-detection methodologies can be applied in order to extract differential data. In one approach, a mapping model is selected to provide a basis for statistically meaningful intensity normalization. In this implementation, a genetic optimization approach is used to determine and refine model parameters. The implementation produces a hybrid intensity mapping that includes both intensity mappings calculated by application of the mapping model and intensity mappings obtained directly from comparison of the images.

6 Claims, 49 Drawing Sheets

(56) References Cited

U.S. PATENT DOCUMENTS

| | | | | |
|---|---|---|---|---|
| 10,375,534 B2* | 8/2019 | Rezvani | | H04W 4/14 |
| 2004/0208396 A1* | 10/2004 | Gunther | | G01C 11/04 |
| | | | | 382/294 |
| 2006/0004275 A1* | 1/2006 | Vija | | A61B 6/00 |
| | | | | 600/407 |
| 2008/0131016 A1* | 6/2008 | Kokemohr | | G06T 5/009 |
| | | | | 382/254 |
| 2010/0158332 A1* | 6/2010 | Rico | | A61B 5/4312 |
| | | | | 382/128 |
| 2010/0189363 A1* | 7/2010 | Riley | | G06T 5/50 |
| | | | | 382/209 |
| 2011/0292246 A1* | 12/2011 | Brunner | | G06T 5/009 |
| | | | | 348/231.99 |
| 2012/0327243 A1* | 12/2012 | Rezvani | | H04N 7/12 |
| | | | | 348/158 |
| 2013/0287296 A1* | 10/2013 | Li | | H04N 5/2355 |
| | | | | 382/167 |
| 2015/0117791 A1* | 4/2015 | Mertens | | H04N 19/17 |
| | | | | 382/239 |
| 2015/0248746 A1* | 9/2015 | Bordes | | G06T 5/40 |
| | | | | 382/170 |
| 2016/0055634 A1* | 2/2016 | Bystrov | | G06T 5/50 |
| | | | | 382/128 |
| 2016/0117975 A1* | 4/2016 | Kang | | G09G 3/2003 |
| | | | | 345/694 |
| 2016/0127616 A1* | 5/2016 | Seshadrinathan | | G06T 5/50 |
| | | | | 348/241 |
| 2016/0381363 A1* | 12/2016 | Tao | | G06T 5/009 |
| | | | | 375/240.03 |
| 2017/0078706 A1* | 3/2017 | Van Der Vleuten | | G06T 5/009 |
| 2017/0163999 A1* | 6/2017 | Li | | H04N 19/105 |
| 2017/0302936 A1* | 10/2017 | Li | | H04N 19/142 |
| 2017/0330529 A1* | 11/2017 | Van Mourik | | H04N 19/85 |
| 2017/0345130 A1* | 11/2017 | Wang | | G06T 3/4046 |
| 2018/0082454 A1* | 3/2018 | Sahu | | G06T 7/90 |
| 2019/0043176 A1* | 2/2019 | Li | | G06T 5/40 |
| 2019/0080441 A1* | 3/2019 | Guo | | G06T 5/40 |
| 2019/0208173 A1* | 7/2019 | Kadu | | G06T 5/009 |
| 2019/0281201 A1* | 9/2019 | Stauder | | H04N 5/235 |

* cited by examiner

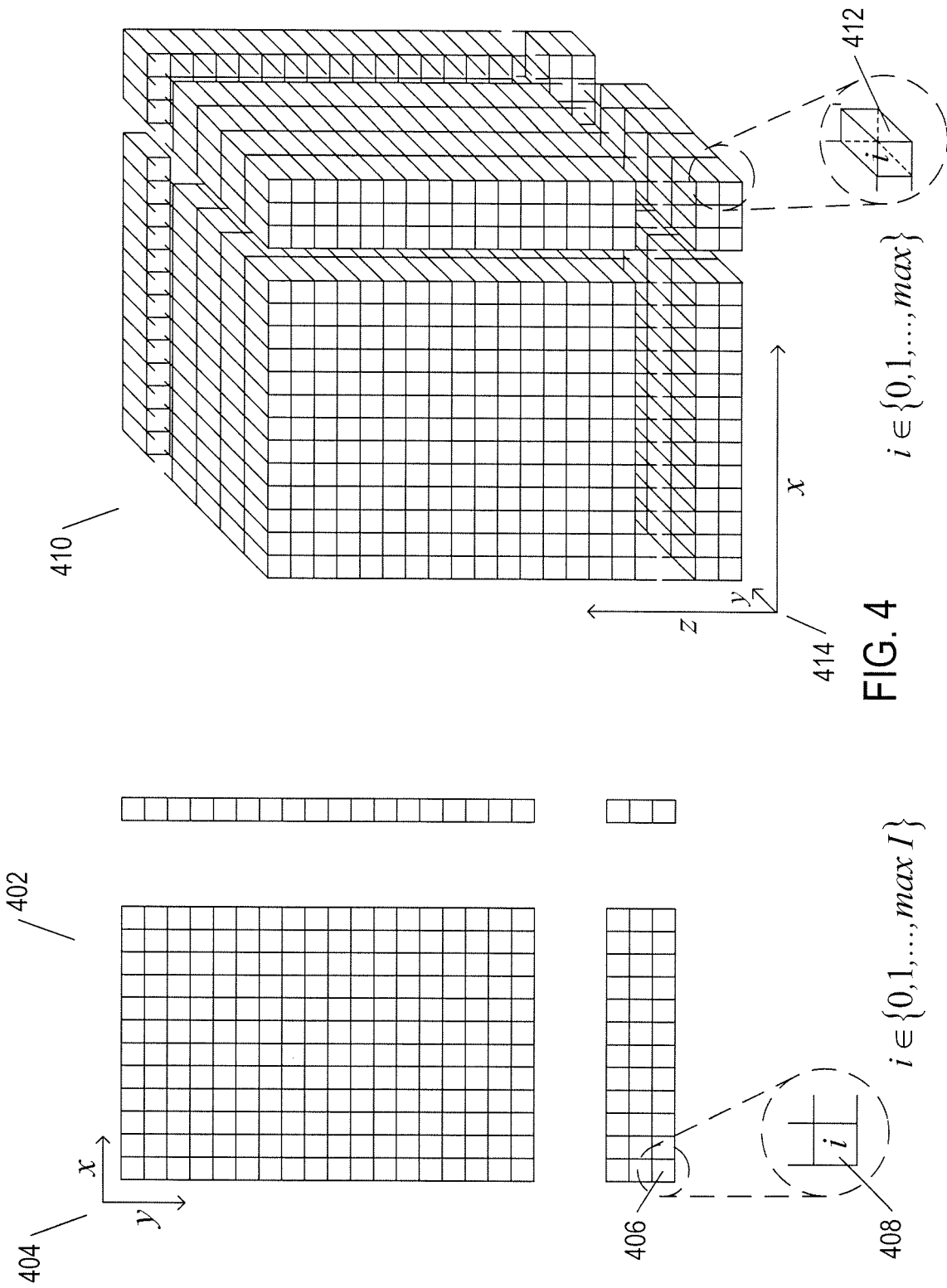

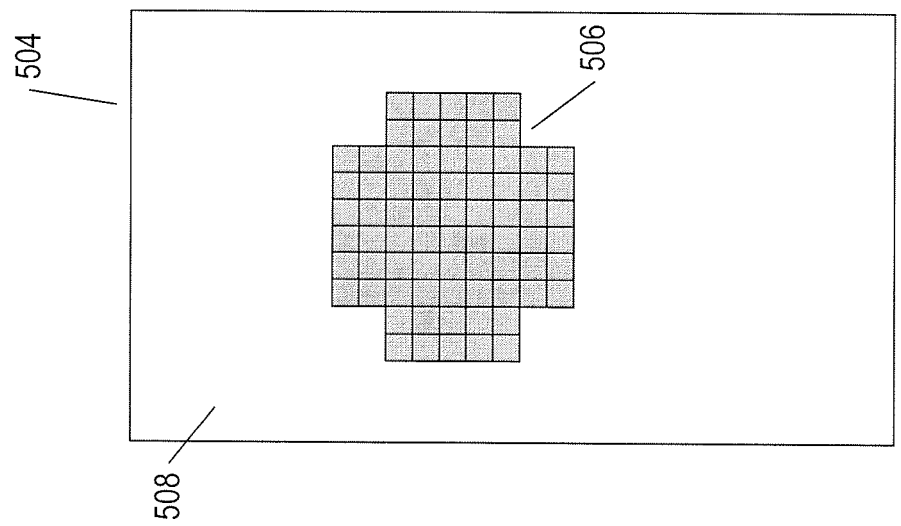
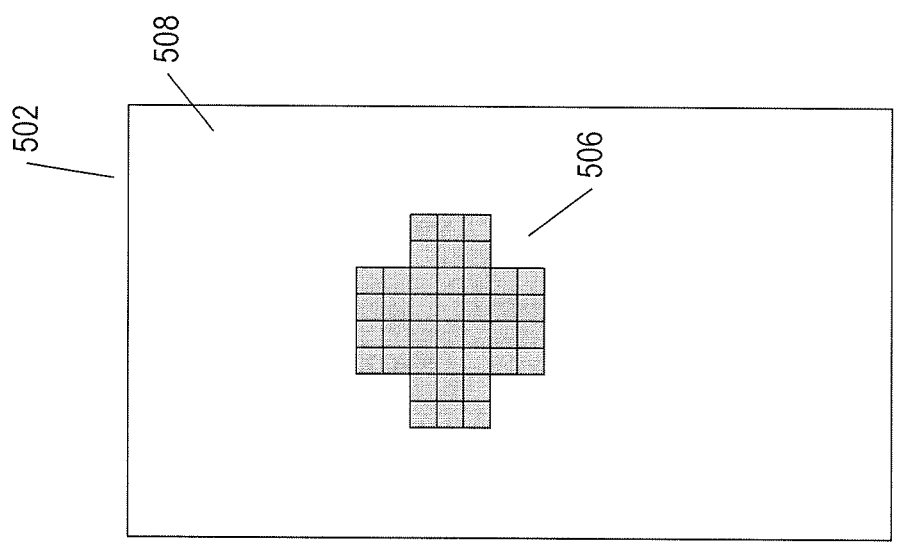
FIG. 5A

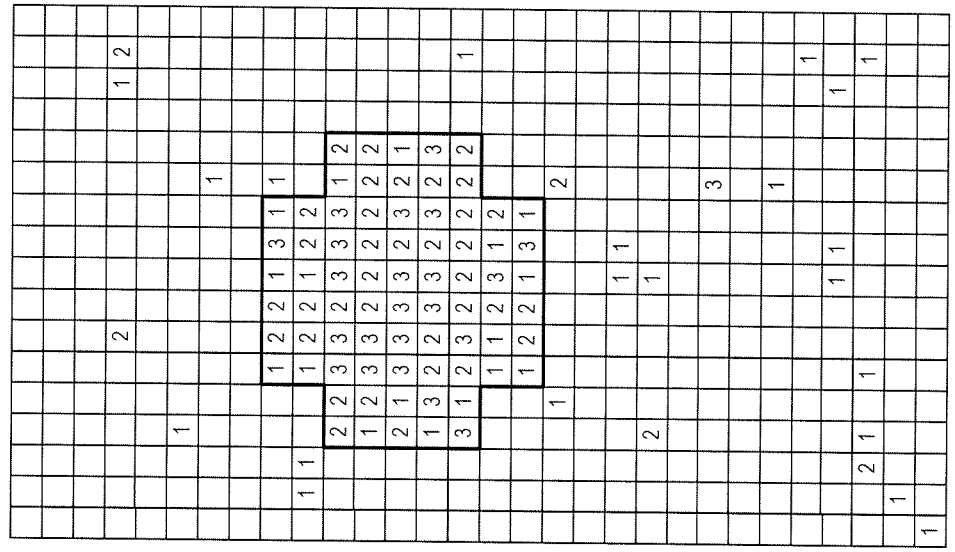
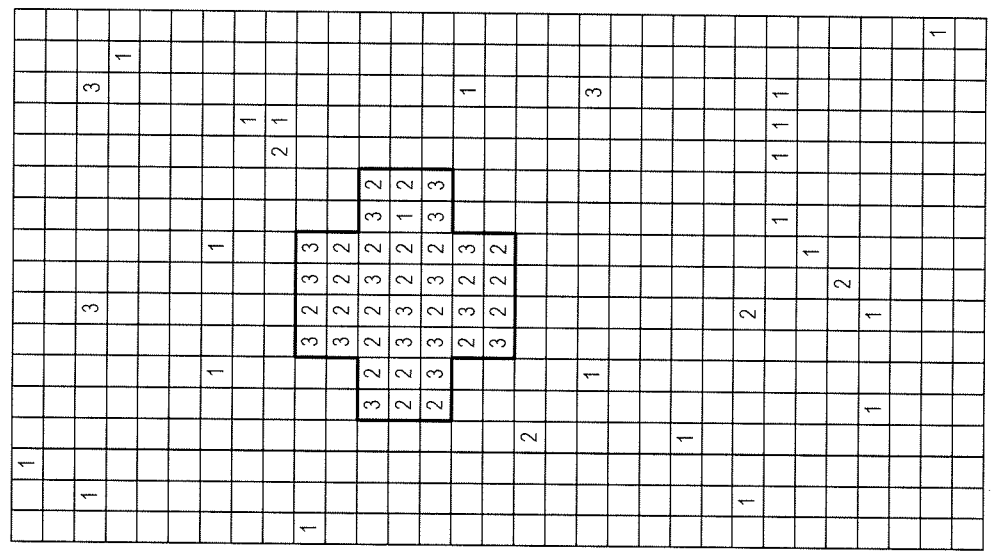
FIG. 7A

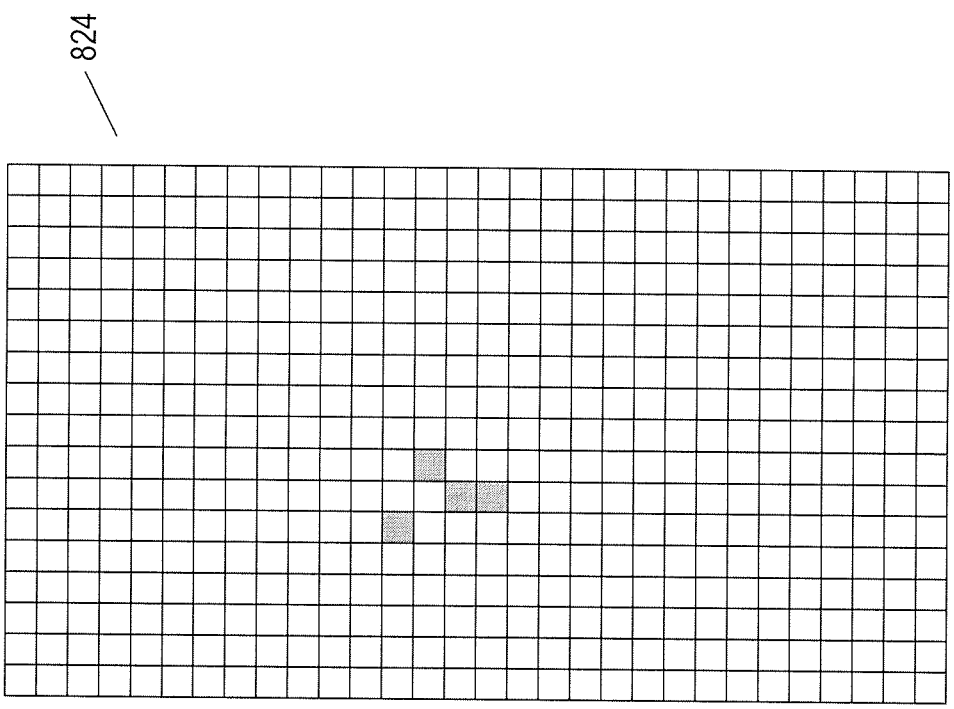

METHODS AND SYSTEMS FOR NORMALIZING IMAGES

CROSS-REFERENCE TO RELATED APPLICATION

This application is a divisional of application Ser. No. 15/347,681, filed Nov. 9, 2016.

TECHNICAL FIELD

The current application is directed to digital-image processing and, in particular, to methods and systems that normalize intensities within images in preparation for digital-image comparison.

BACKGROUND

Digital-image processing is a broad and a important field that provides foundation technologies for many types of diagnosis, monitoring, surveillance, data collection, and data analysis. Digital-image-processing methods are used in medical imaging, optical-character-recognition systems, processing and analysis of image data collected by surveillance, monitoring, and remote-sensing systems, production of informational and entertainment videos, and digital photography. A variety of sophisticated mathematical techniques have been developed to address many problem domains in digital-image processing, including reduction of noise in digital images, sharpening of imaged features in digital images, extraction of information from digital images, and many other such problem domains.

In many areas of digital-image processing and analysis, two or more different images are compared in order to extract differential information from the two or more images corresponding to various types of changes. As one example, frames of surveillance videos may be compared to one another by automated techniques in order to extract information related to temporal changes in the environment being monitored. Surveillance videos are often collected continuously from various types of environments, such as building entrances and the interiors of train stations and airports, and automated, analytical methodologies based on automated comparison of frames from such videos are applied to hours of days of recorded surveillance video in order to pinpoint particular anomalous events that occurred at particular points of time during surveillance. In other cases, frame-comparison-based methods are employed in real time to detect anomalous events and trigger alerts. As another example, a time sequence of digital medical images of a tumor or other pathology may be compared in order to detect changes in the tumor or other pathology over time. Often, digital images are compared by subtracting the intensity values in one image from the intensity values of another, in order to detect intensity differences between the two images. However, many intensity differences between images may arise from phenomena unrelated to the types of changes and events of interest. For example, the intensities in two different medical images may differ systematically due to differences in the imaging devices used to acquire the images, differences in image-device settings and parameters, random and systematic noise in the digital images, and many other types of intensity-altering phenomena. Normalization of images is therefore a major problem domain in image processing. Normalization seeks to reduce or eliminate systematic intensity variation between images, in preparation for image comparison, without losing or obscuring the meaningful, but often subtle, intensity differences that are sought to be extracted by digital-image-comparison techniques.

SUMMARY

The current document is directed to digital-image-normalization methods and systems that generate accurate intensity mappings between the intensities in two digital images. The intensity mapping generated from two digital images is used to normalize or adjust the intensities in one image in order to produce a pair of normalized digital images to which various types of change-detection methodologies can be applied in order to extract differential data. In one approach, a mapping model is selected to provide a basis for statistically meaningful intensity normalization. In this implementation, a genetic optimization approach is used to determine and refine model parameters. The implementation produces a hybrid intensity mapping that includes both intensity mappings calculated by application of the mapping model and intensity mappings obtained directly from comparison of the images.

BRIEF DESCRIPTION OF THE DRAWINGS

FIG. 4 illustrates two different types of digital images.

FIGS. 5A-B illustrate digital-image comparison.

FIGS. 7A-D show similar examples to those shown in FIG. 6A-D, but with the pixels corresponding to the imaged cruciform object having relatively low intensity values compared to the intensities of the pixels corresponding to the imaged cruciform object in FIG. 6A.

FIGS. 8A-D show a different example of image comparison using the same illustration conventions used in FIGS. 6A-D and FIGS. 7A-D.

FIGS. 9A-B illustrate a typical result obtained by digital-image comparison.

FIGS. 12A-G illustrate tabulation of pixel-intensity mappings and generation of a difference metric value for a particular mapping model.

FIGS. 13A-F illustrate aspects of a genetic mapping-function-parameter-fitting method that is used to optimize parameter values for a mapping function that maps intensities from a first image to a second image within at least a pair of image domains.

DETAILED DESCRIPTION OF EMBODIMENTS

The current document is directed to digital-image-normalization methods and systems. In a first subsection, below, an overview of computer systems is provided, with reference to FIGS. 1-3. In a second subsection, provided below, a description of digital images and digital-image-comparison operations is provided with reference to FIGS. 4-9B. In a third subsection, implementations of the currently disclosed methods and systems are provided with reference to FIGS. 10A-15K.

Overview of Computer Systems and Computer Architecture

Figure 1:
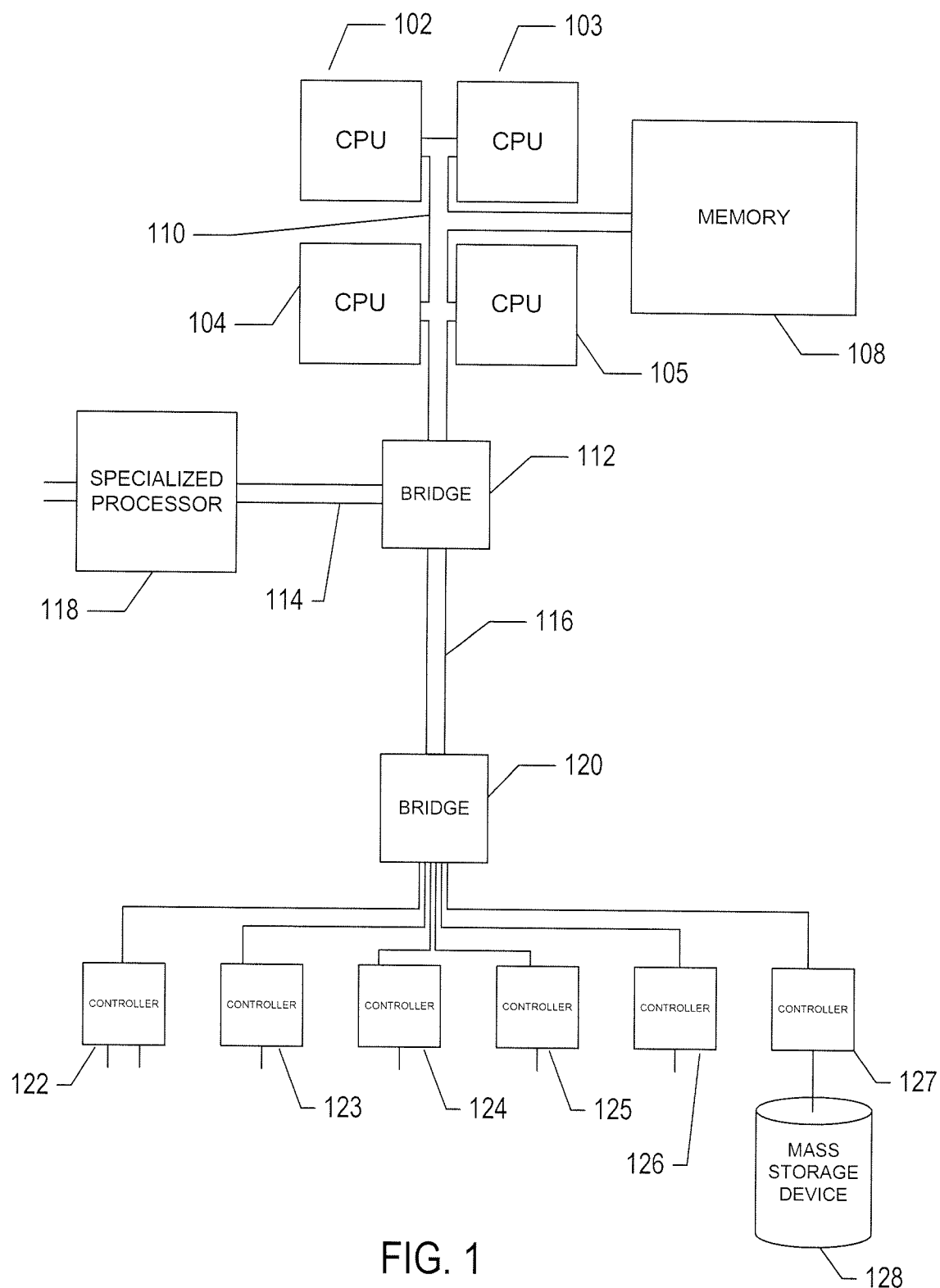
FIG. 1 provides a general architectural diagram for various types of computers.

FIG. 1 provides a general architectural diagram for various types of computers. The computer system contains one or multiple central processing units ("CPUs") 102-105, one or more electronic memories 108 interconnected with the CPUs by a CPU/memory-subsystem bus 110 or multiple busses, a first bridge 112 that interconnects the CPU/memory-subsystem bus 110 with additional busses 114 and 116, or other types of high-speed interconnection media, including multiple, high-speed serial interconnects. These busses or serial interconnections, in turn, connect the CPUs and memory with specialized processors, such as a graphics processor 118, and with one or more additional bridges 120, which are interconnected with high-speed serial links or with multiple controllers 122-127, such as controller 127, that provide access to various different types of mass-storage devices 128, electronic displays, input devices, and other such components, subcomponents, and computational resources. It should be noted that computer-readable data-storage devices include optical and electromagnetic disks, electronic memories, and other physical data-storage devices. Those familiar with modern science and technology appreciate that electromagnetic radiation and propagating signals do not store data for subsequent retrieval, and can transiently "store" only a byte or less of information per mile, far less information than needed to encode even the simplest of routines.

Figure 2:
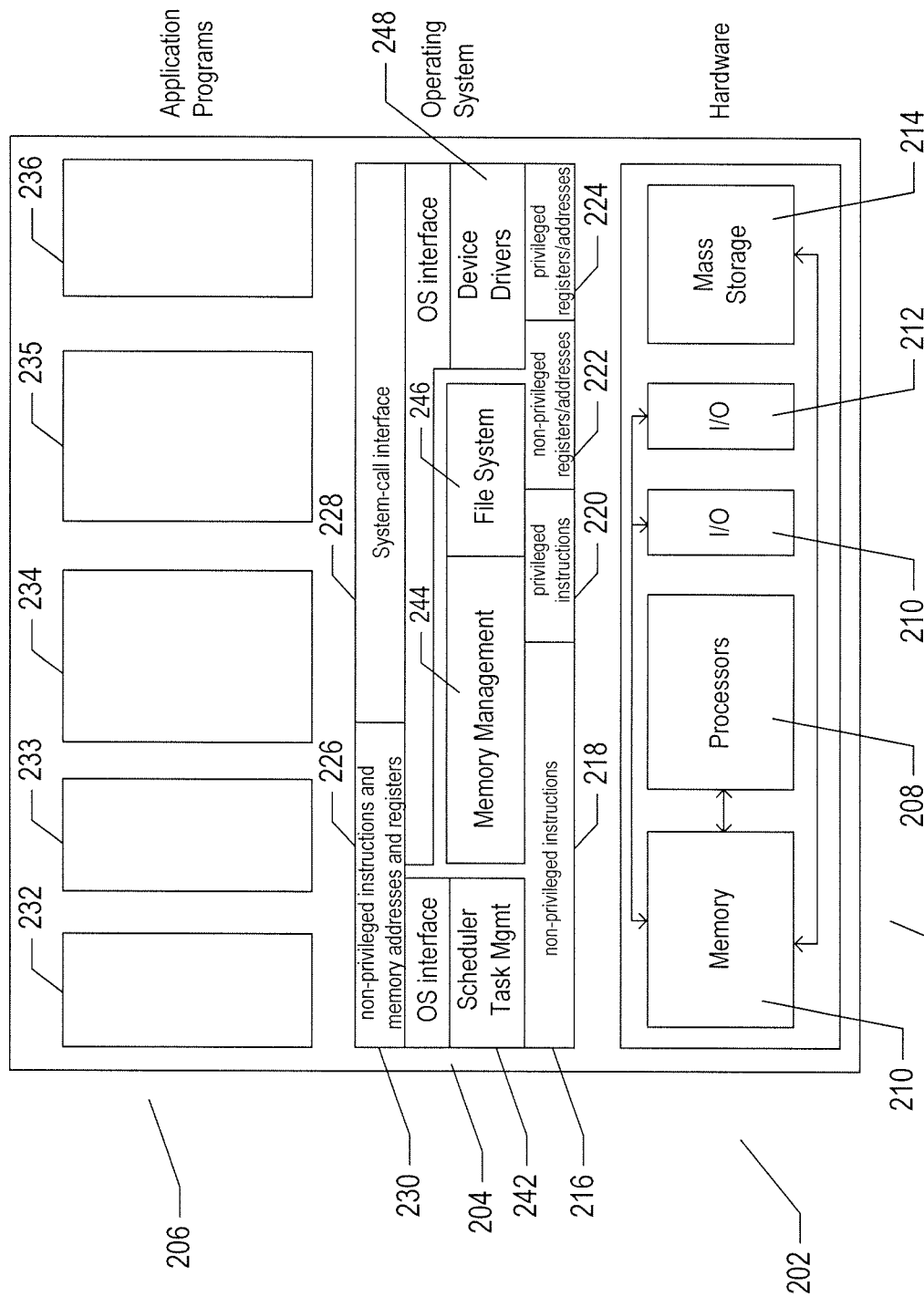
FIG. 2 illustrates generalized hardware and software components of a general-purpose computer system, such as a general-purpose computer system having an architecture similar to that shown in FIG. 1.

FIG. 2 illustrates generalized hardware and software components of a general-purpose computer system, such as a general-purpose computer system having an architecture similar to that shown in FIG. 1. The computer system 200 is often considered to include three fundamental layers: (1) a hardware layer or level 202; (2) an operating-system layer or level 204; and (3) an application-program layer or level 206. The hardware layer 202 includes one or more processors 208, system memory 210, various different types of input-output ("I/O") devices 210 and 212, and mass-storage devices 214. Of course, the hardware level also includes many other components, including power supplies, internal communications links and busses, specialized integrated circuits, many different types of processor-controlled or microprocessor-controlled peripheral devices and controllers, and many other components. The operating system 204 interfaces to the hardware level 202 through a low-level operating system and hardware interface 216 generally comprising a set of non-privileged computer instructions 218, a set of privileged computer instructions 220, a set of non-privileged registers and memory addresses 222, and a set of privileged registers and memory addresses 224. In general, the operating system exposes non-privileged instructions, non-privileged registers, and non-privileged memory addresses 226 and a system-call interface 228 as an operating-system interface 230 to application programs 232-236 that execute within an execution environment provided to the application programs by the operating system. The operating system, alone, accesses the privileged instructions, privileged registers, and privileged memory addresses. By reserving access to privileged instructions, privileged registers, and privileged memory addresses, the operating system can ensure that application programs and other higher-level computational entities cannot interfere with one another's execution and cannot change the overall state of the computer system in ways that could deleteriously impact system operation. The operating system includes many internal components and modules, including a scheduler 242, memory management 244, a file system 246, device drivers 248, and many other components and modules. To a certain degree, modern operating systems provide numerous levels of abstraction above the hardware level, including virtual memory, which provides to each application program and other computational entities a separate, large, linear memory-address space that is mapped by the operating system to various electronic memories and mass-storage devices. The scheduler orchestrates interleaved execution of various different application programs and higher-level computational entities, providing to each application program a virtual, stand-alone system devoted entirely to the application program. From the application program's standpoint, the application program executes continuously without concern for the need to share processor resources and other system resources with other application programs and higher-level computational entities. The device drivers abstract details of hardware-component operation, allowing application programs to employ the system-call interface for transmitting and receiving data to and from communications networks, mass-storage devices, and other I/O devices and subsystems. The file system 246 facilitates abstraction of mass-storage-device and memory resources as a high-level, easy-to-access, file-system interface.

Figure 3:
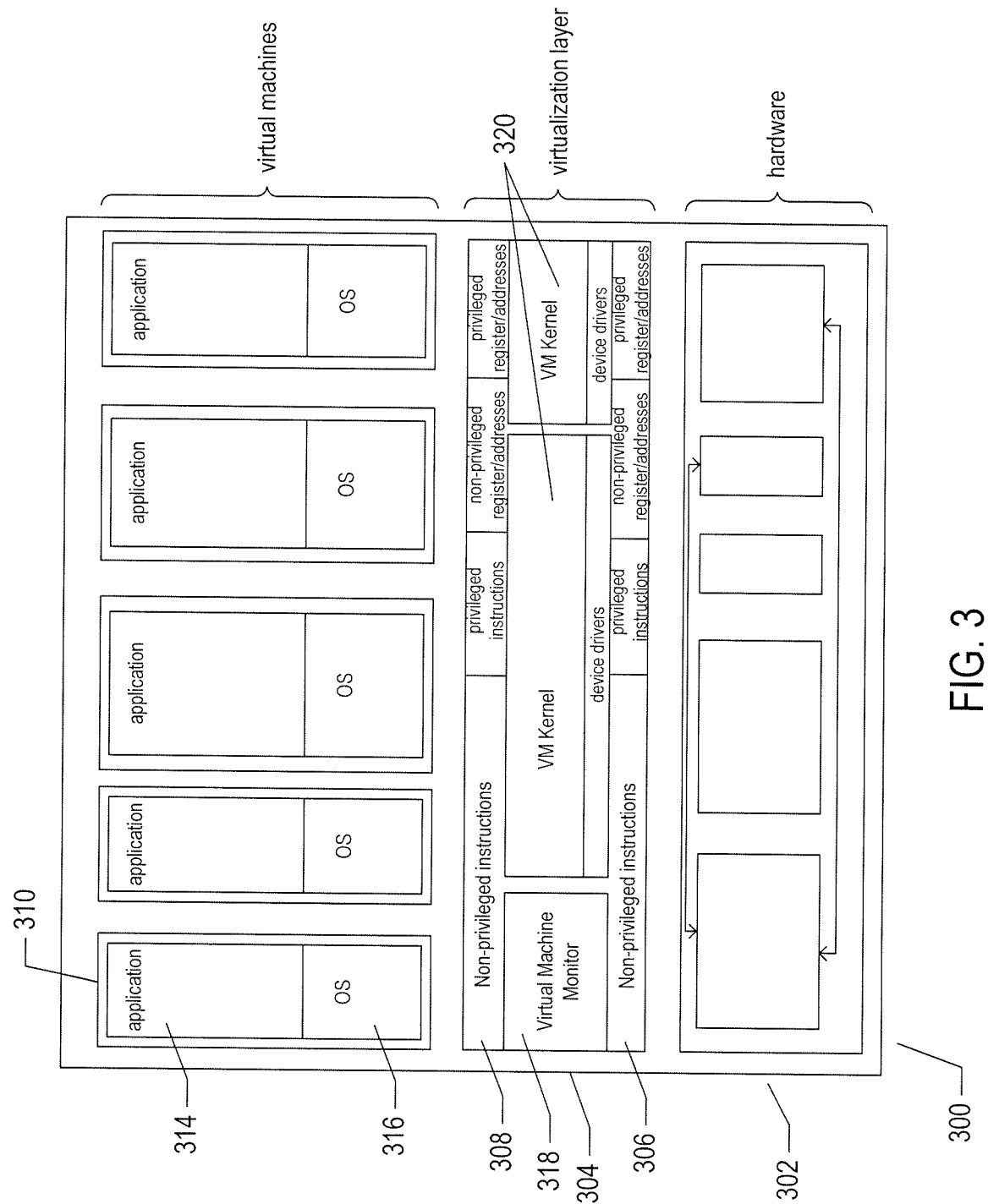
FIG. 3 illustrates a virtual machine and virtual-machine execution environment.

FIG. 3 illustrates a type of virtual machine and virtual-machine execution environment, using the same illustration conventions as used in FIG. 2. FIG. 3 shows a first type of virtualization. The computer system 300 in FIG. 3 includes the same hardware layer 302 as the hardware layer 202 shown in FIG. 2. However, rather than providing an operating system layer directly above the hardware layer, as in FIG. 2, the virtualized computing environment illustrated in FIG. 3 features a virtualization layer 304 that interfaces through a virtualization-layer/hardware-layer interface 306, equivalent to interface 216 in FIG. 2, to the hardware. The virtualization layer provides a hardware-like interface 308 to a number of virtual machines, such as virtual machine 310, executing above the virtualization layer in a virtual-machine layer 212. Each virtual machine includes one or more application programs or other higher-level computational entities packaged together with an operating system, referred to as a "guest operating system," such as application 314 and guest operating system 316 packaged together within virtual machine 310. Each virtual machine is thus equivalent to the operating-system layer 204 and application-program layer 206 in the general-purpose computer system shown in FIG. 2. Each guest operating system within a virtual machine interfaces to the virtualization-layer interface 308 rather than to the actual hardware interface 306. The virtualization layer partitions hardware resources into abstract virtual-hardware layers to which each guest operating system within a virtual machine interfaces. The guest operating systems within the virtual machines, in general, are unaware of the virtualization layer and operate as if they were directly accessing a true hardware interface. The virtualization layer ensures that each of the virtual machines currently executing within the virtual environment receive a fair allocation of underlying hardware resources and that all virtual machines receive sufficient resources to progress in execution. The virtualization-layer interface 308 may differ for different guest operating systems. For example, the virtualization layer is generally able to provide virtual hardware interfaces for a variety of different types of computer hardware. This allows, as one example, a virtual machine that includes a guest operating system designed for a particular computer architecture to run on hardware of a different architecture. The number of virtual machines need not be equal to the number of physical processors or even a multiple of the number of processors.

The virtualization layer includes a virtual-machine-monitor module 318 ("VMM") that virtualizes physical processors in the hardware layer to create virtual processors on which each of the virtual machines executes. For execution efficiency, the virtualization layer attempts to allow virtual machines to directly execute non-privileged instructions and to directly access non-privileged registers and memory. However, when the guest operating system within a virtual machine accesses virtual privileged instructions, virtual privileged registers, and virtual privileged memory through the virtualization-layer interface 308, the accesses result in execution of virtualization-layer code to simulate or emulate the privileged resources. The virtualization layer additionally includes a kernel module 320 that manages memory, communications, and data-storage machine resources on behalf of executing virtual machines ("VM kernel"). The VM kernel, for example, maintains shadow page tables on each virtual machine so that hardware-level virtual-memory facilities can be used to process memory accesses. The VM kernel additionally includes routines that implement virtual communications and data-storage devices as well as device drivers that directly control the operation of underlying hardware communications and data-storage devices. Similarly, the VM kernel virtualizes various other types of I/O devices, including keyboards, optical-disk drives, and other such devices. The virtualization layer essentially schedules execution of virtual machines much like an operating system schedules execution of application programs, so that the virtual machines each execute within a complete and fully functional virtual hardware layer.

Digital Images and Digital-Image-Comparison Operations

FIG. 4 illustrates two different types of digital images. A two-dimensional digital image 402 is a rectilinear grid of pixels, with each pixel identified by the grid-cell coordinates of the pixel according to a two-dimensional Cartesian coordinate system 404. Each pixel, such as pixel 406, includes an intensity value i 408. In the current discussion, digital images are considered to have grayscale intensities, where i is one of a number of successive integer intensity values ranging from 0 to maxI. For example, maxI may equal 255, in which case each pixel intensity is encoded as a byte. Alternatively, each pixel intensity may be encoded as a two-byte word, in which case maxI is 65,535. Each pixel of an RGB-encoded color image may include three different intensity values for the three color channels red, green, and blue or may include another type of encoding according to another of various other color models. A three-dimensional digital image 410 is a volume of voxels, such as voxel 412, the positions of which are generally described by a three-dimensional Cartesian coordinate system 414. The currently disclosed methods and systems for image normalization are applicable both to two-dimensional and to three-dimensional digital images.

Figure 5B:
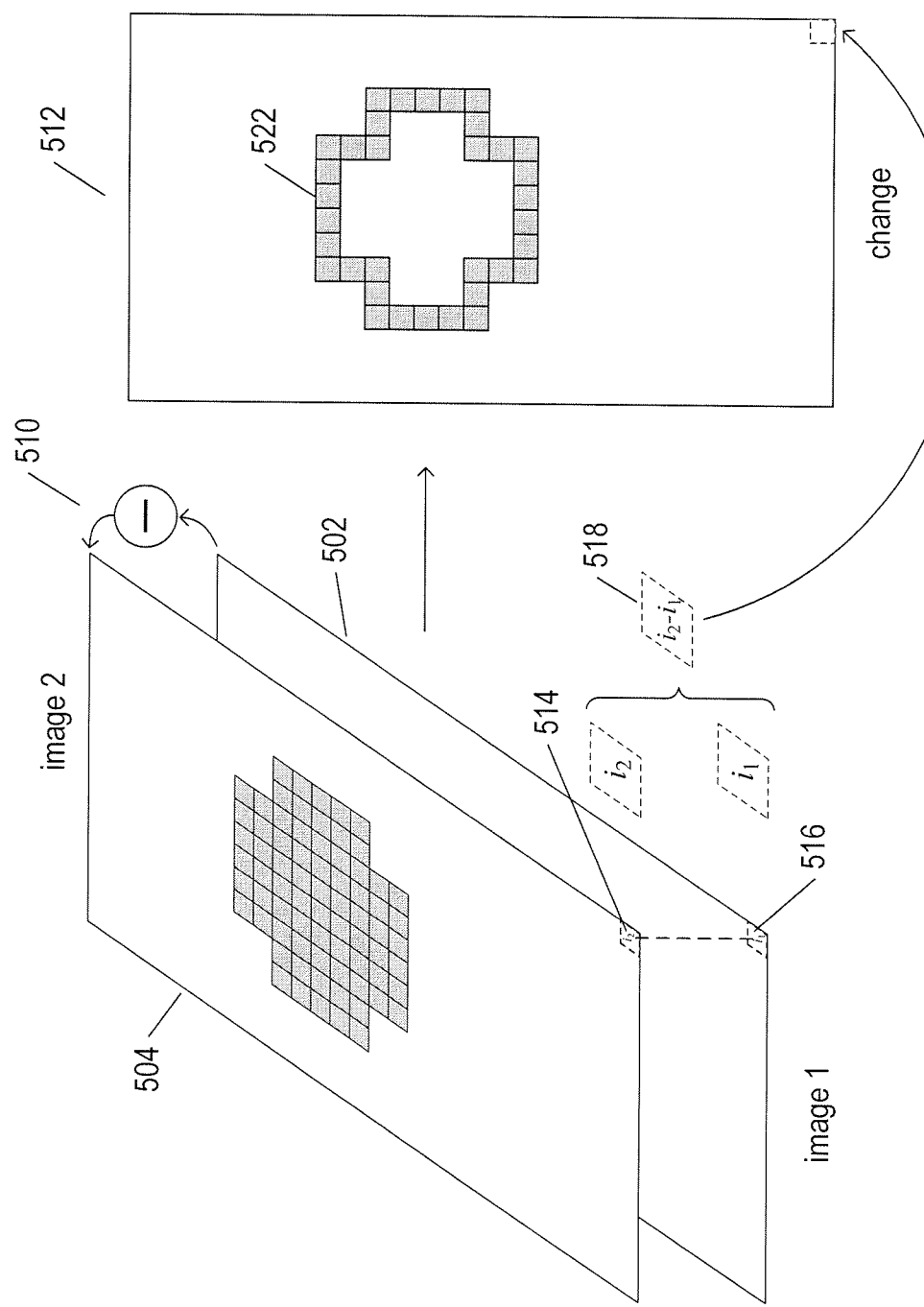

FIGS. 5A-B illustrate digital-image comparison. In FIG. 5A, a first digital image 502 and a second digital image 504 are acquired by digital-image-capture devices at two different points in time. In this example, as in all the remaining examples provided below, pixels are shown with exaggerated dimensions relative to the image size, for clarity of illustration. In a typical digital image, there may be several hundred or more pixels per centimeter in the x and y directions of a two-dimensional digital image or tens to a hundreds of voxels per centimeter in the x, y, and z directions of a three-dimensional digital image. Pixel sizes often depend on the medium in which pixels are displayed and may differ dramatically among printed images and images rendered for display on LCD display devices.

Both the first image 502 and the second image 504 in FIG. 5A show a cruciform imaged object 506 with relatively low-intensity pixels on a high-intensity background 508. In one convention, small-magnitude intensity values correspond to dark or black pixels while high-magnitude intensity values correspond to light or white pixels. In the example shown in FIG. 5A, it is obvious that the cruciform object is larger in the second image 504 than in the first image 502. However, in many real-world imaging examples, the differences between the contents of two images are not apparent to a human viewer by visual inspection. Instead, many of the most interesting differences may be quite subtle.

In order to automatically process the pair of images shown in FIG. 5A to determine the differences between the two images, the pixel intensities of the corresponding pixels in the two images may be subtracted, as shown by the digital-image-subtraction operation 510 in FIG. 5B, to produce a difference image 512. The subtraction operation involves, for a given pair of corresponding pixels 514 and 516, generating a single difference pixel 518 containing the difference of the intensities in the original pixel pair 514 and 516 that is placed into the same position in the difference image 512 as the positions of the pixel pair in the original images 502 and 504. The computed differences are often rescaled to fall within the intensity range [0, maxI]. In this example case, the difference image 512 displays those pixels 522 that have different intensity values in the original digital images 502 and 504 and those differences accurately reflect a cruciform border region that represents growth of the cruciform object.

While straight subtraction of digital images is one method for creating a difference image that highlights differences between two original images, there are many other techniques for generating difference images that use different or additional operations on the intensity values of the two original images. Nonetheless, all of the various different types of comparison operations between digital images seek to highlight meaningful differences between the two images. Meaningful differences are generally differences in image intensities that reflect physical differences in the imaged objects and environments, such as change of tissue type in medical images or the sudden appearance of an object in the imaged environment in a surveillance-video frame. Automated comparison operations are used to detect and display subtle differences in images that would not be apparent to human viewers and to automate the process of identifying even differences in image sequences that would be apparent during visual inspection, were there time for visual inspection, such as in surveillance videos, or both.

Figure 6A:
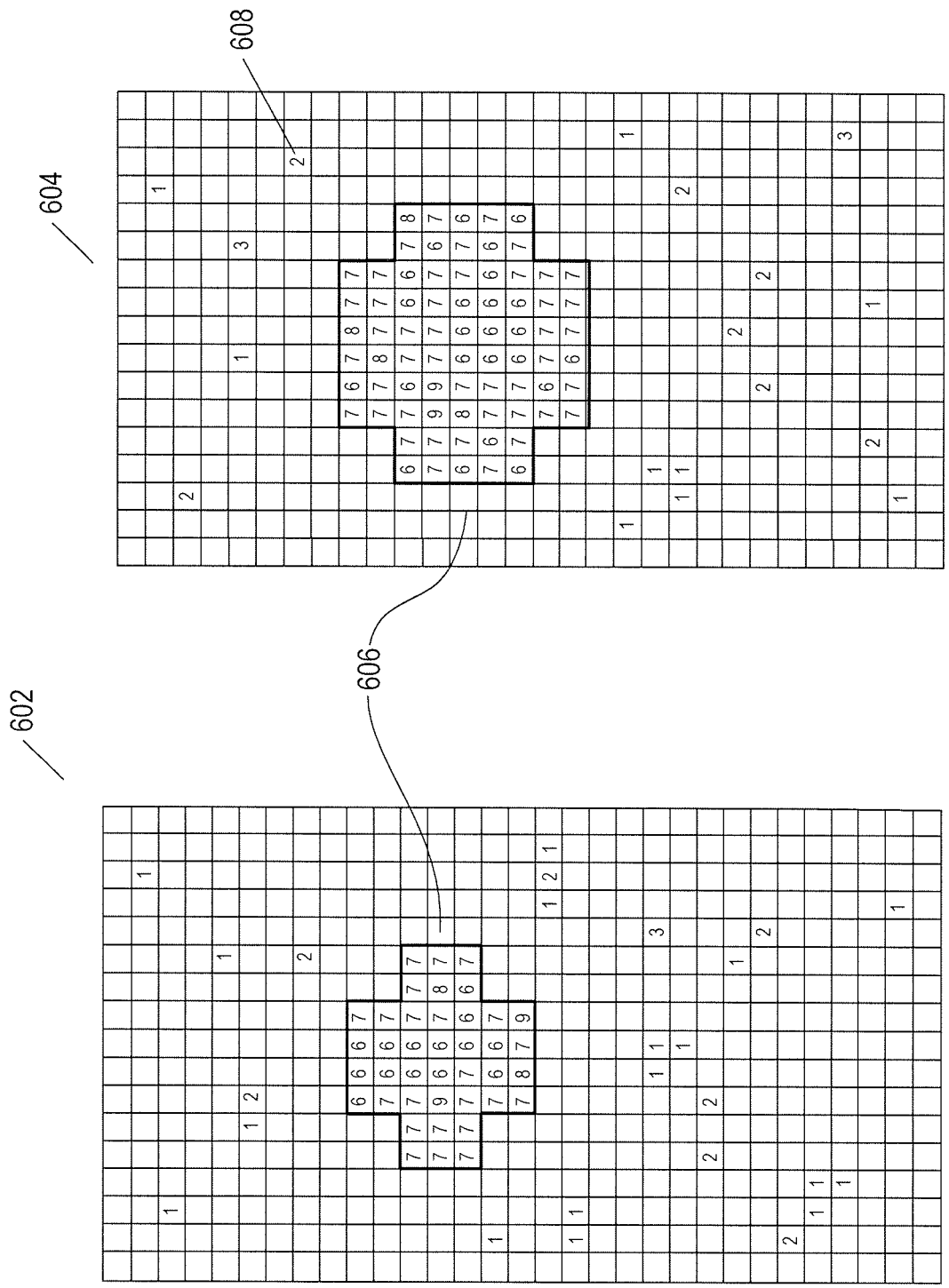
FIGS. 6A-D illustrate the effect of noise on the digital-image-comparison process discussed above with reference to FIGS. 5A-B.
Figure 6B:
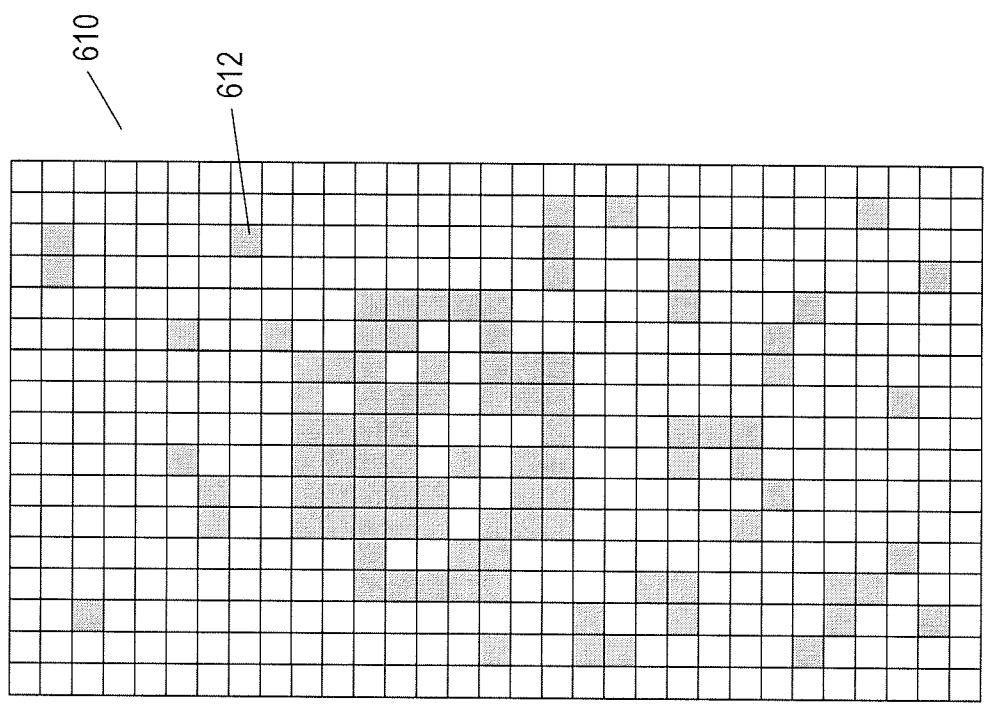
Figure 6C:
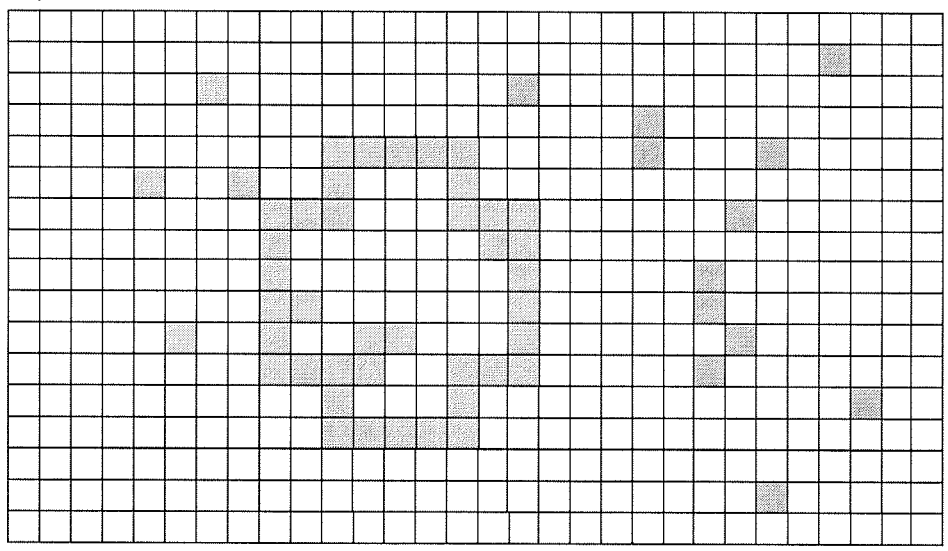
Figure 6D:
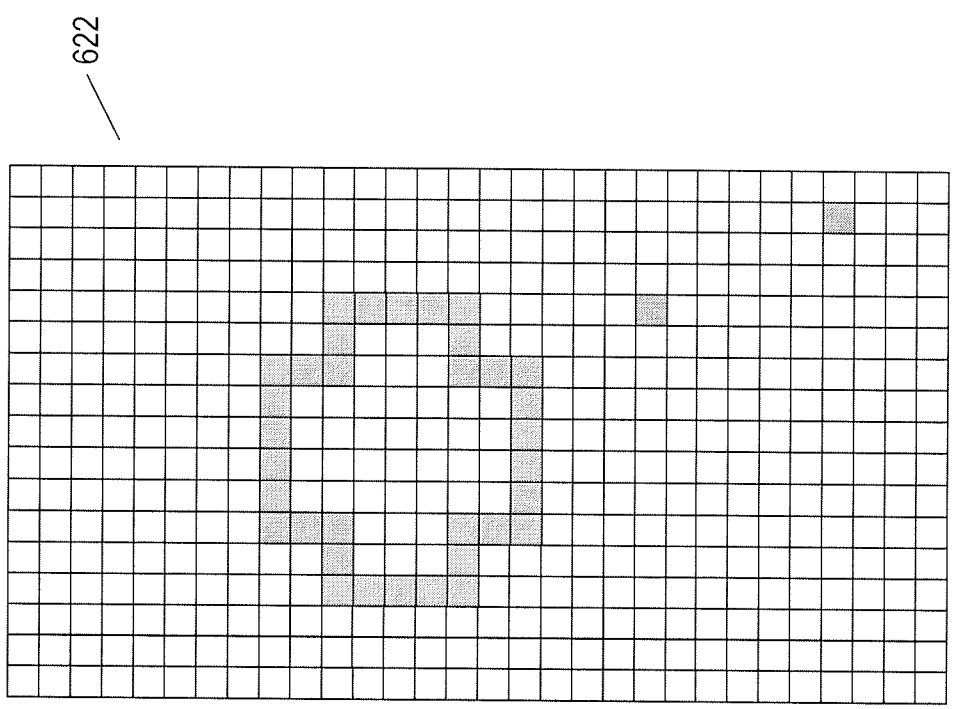

FIGS. 6A-D illustrate the effect of noise on the digital-image-comparison process discussed above with reference to FIGS. 5A-B. FIGS. 6A-D use common illustration conventions subsequently used for FIGS. 7A-9B. Each digital image is shown as a rectilinear grid of pixels with single-digit intensity values. Blank pixels are assumed to have the intensity value 0. FIG. 6A shows a pair of images 602 and 604 similar to images 502 and 504 in FIG. 5A. In this example, the imaged cruciform object 606 has relatively high intensity values while the background pixels have relatively low intensity values. Rendered as positive images, the cruciform object would appear lightly colored or white on a dark background, but, for clarity of illustration, negative or inverse renderings of the images are shown in FIG. 6A. In addition to relatively high-intensity pixels that comprise the cruciform object 606, each image contains low-intensity values corresponding to noise. For example, pixel 608 in the second image 604 has an intensity value of 2 while the pixel at the same location in the first image 602 has an intensity value 0. In many cases, noise is a stochastic phenomena and produces different patterns of anomalous pixels in each different image. Furthermore, the intensities of the pixels within the imaged cruciform object 606 in each image are non-uniform, the non-uniformity a product of both noise and perhaps image-acquisition-device-characteristic differences. As a result, when a difference image 610, shown in FIG. 6B, is produced by the comparison method 510 discussed above with reference to FIG. 5B, the difference image is visually cluttered. In FIG. 6B, the non-0 valued pixels are shown darkened while the 0-valued pixels are shown unshaded, an inverted or negative image of the positive difference image produced by the difference operation. This cluttered difference image does include the same difference pixels 522 produced in the example shown in FIG. 5B, but also includes non-0 valued pixels, such as pixel 612 at the position of pixel 608 in the second image shown in FIG. 6A, resulting from noise. Noise can therefore clutter and mask the differences of interest or meaning in a difference image produced by a comparison operation. A thresholding operation may be used to attempt to eliminate noise pixels from a difference image. As shown in FIG. 6C, only difference pixels with unrescaled absolute-value intensities greater than 1 are shaded in the thresholded difference image 620. By removing difference pixels with intensities 1 and −1, much of the clutter in the difference image 610 shown in FIG. 6B has been removed. An even better difference image 622 is shown in FIG. 6D, produced by showing only those difference pixels with at least absolute-value difference intensity 2. When the intensity differences of the pairs of pixels in the original image of interest are large compared to the intensity differences of noise pixels and background pixels, thresholding can remove much of the unwanted noise signal to produce a clear, meaningful difference image.

Figure 7B:
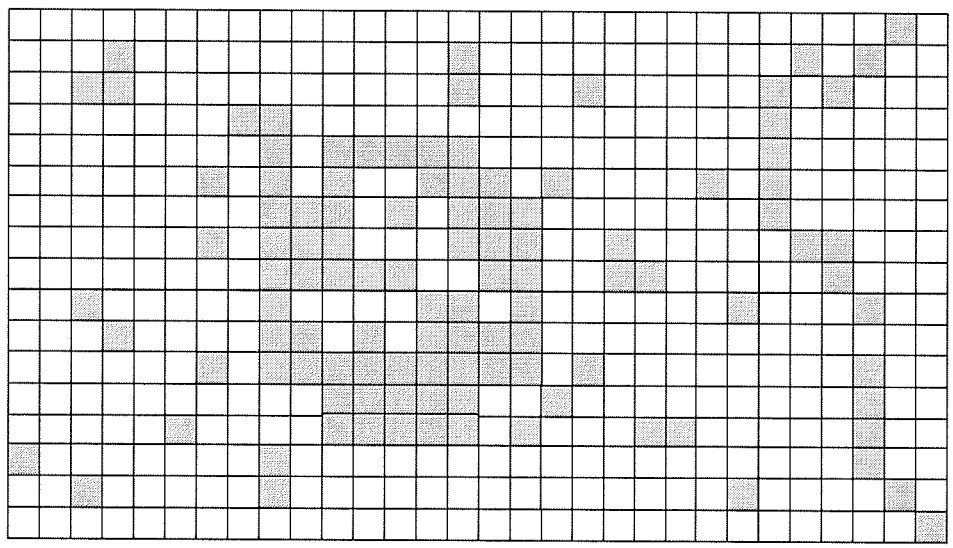
Figure 7C:
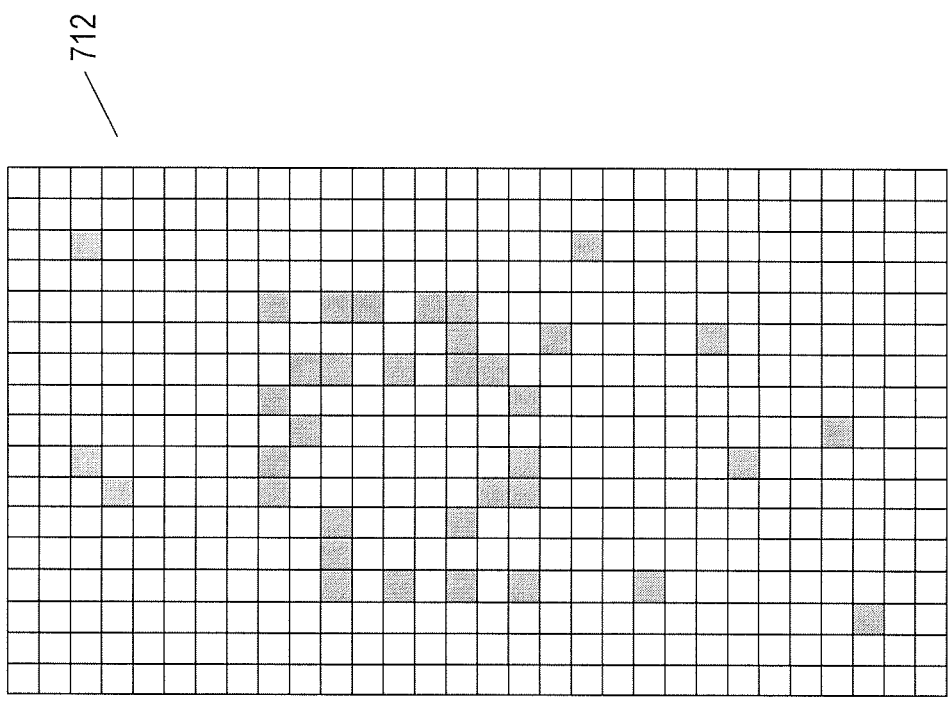
Figure 7D:
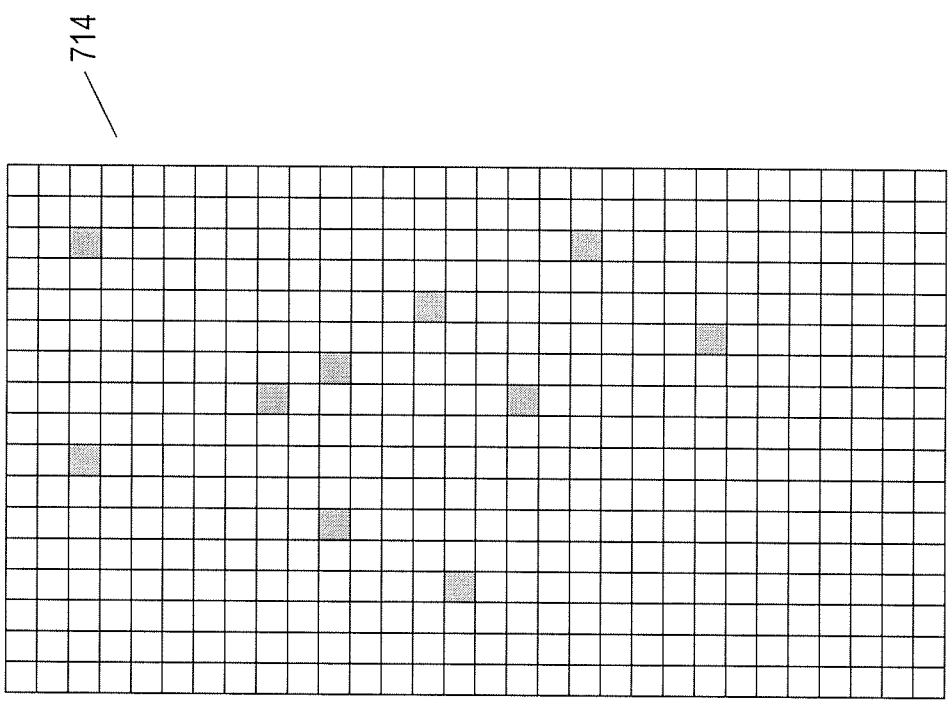

However, when the intensity-valued differences of the pixel pairs of interest in the original images have magnitudes on the order of the magnitudes of noise differences, thresholding may not be effective. FIGS. 7A-D show similar examples to those shown in FIG. 6A-D, but with the pixels corresponding to the imaged cruciform object having relatively low intensity values compared to the intensities of the pixels corresponding to the imaged cruciform object in FIG. 6A. The unthresholded difference image 710 in FIG. 7B produced by the comparison operation 510 discussed above with reference to FIG. 5B applied to original images 702 and 704 shown in FIG. 7A is more visually cluttered than difference image 610 in FIG. 6B. A thresholded version of the difference image 712 in FIG. 7C, with difference pixels having unrescaled absolute-value intensities less than 2 not displayed, has less clutter but does not reveal the cruciform-outline pattern of the difference pixels of interest, originally shown in the difference image 512 in FIG. 5B. A second thresholded difference image 714 in which only difference pixels with unrescaled absolute-value intensities of 2 or greater are displayed, provides relatively little information. Thus, as shown in the example of FIGS. 7A-D, when the intensity differences between two images are subtle, the differences may be entirely masked by the presence of noise in the two images.

Figure 8A:
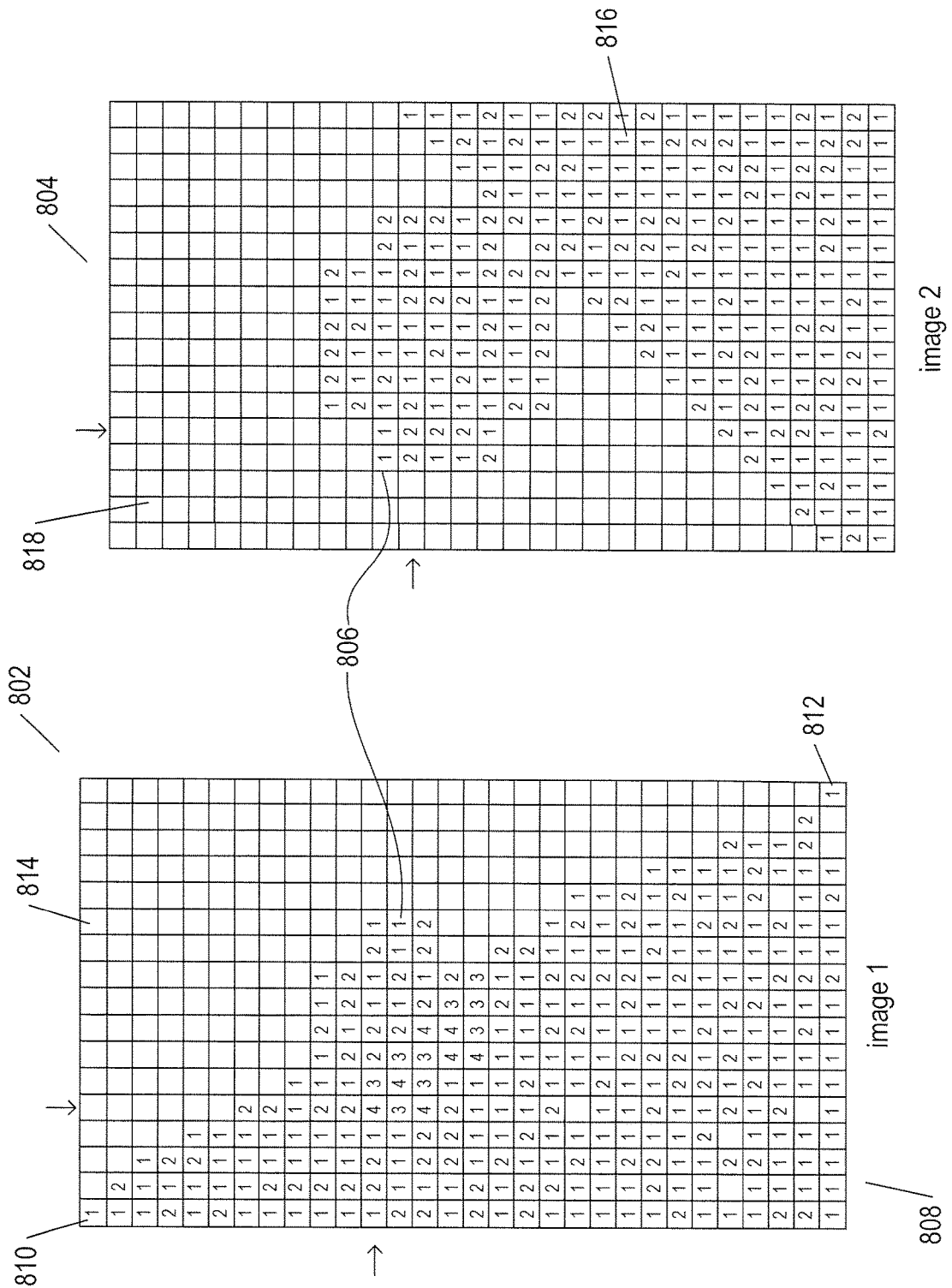
Figure 8B:
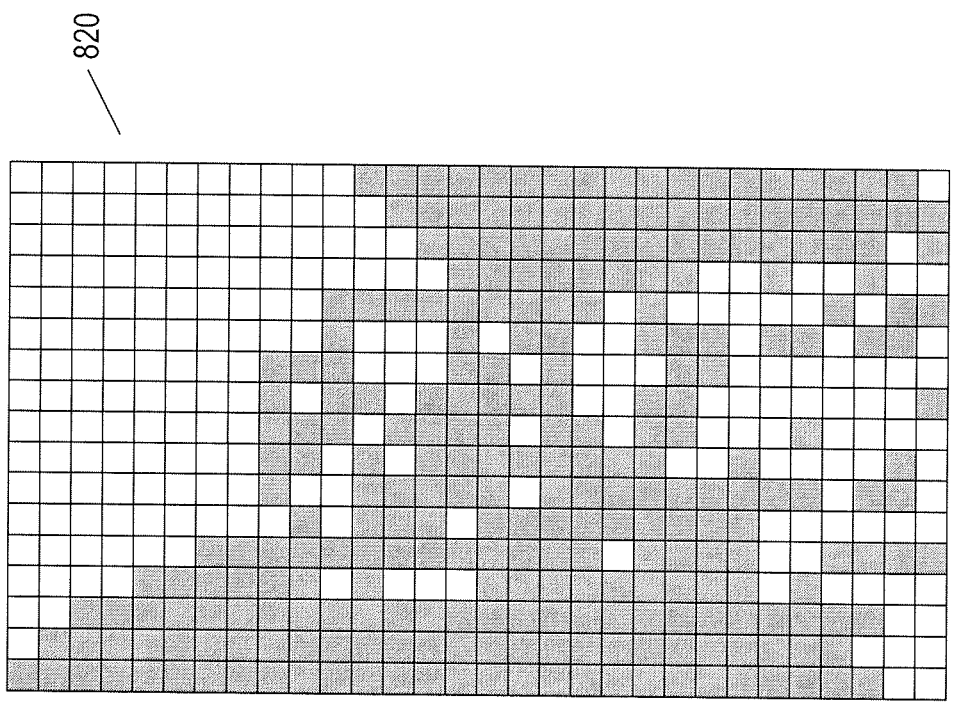
Figure 8C:
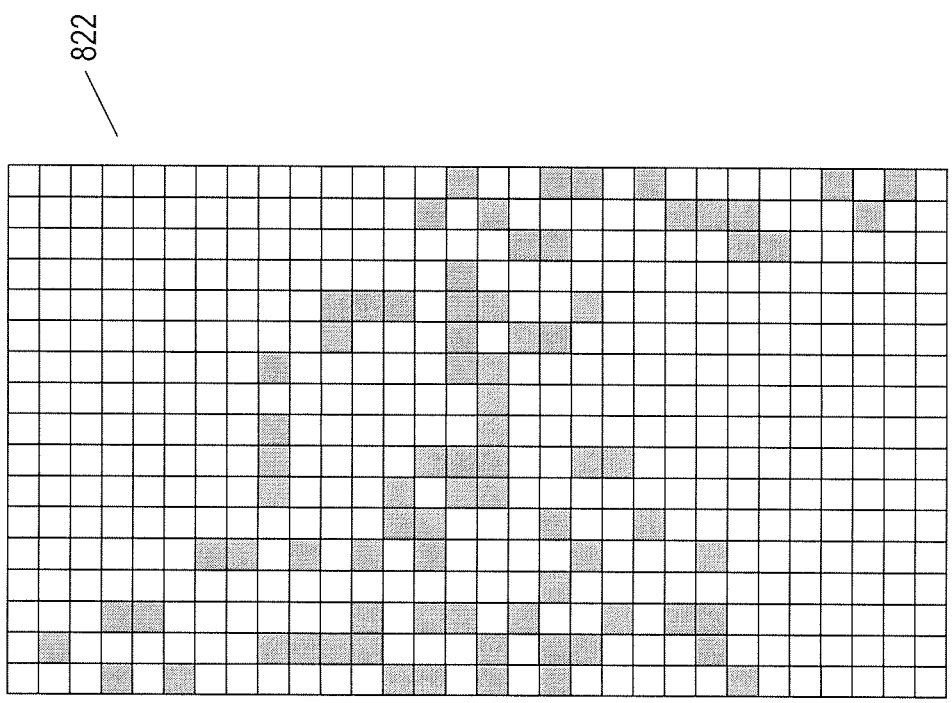

FIGS. 8A-D show a different example of image comparison using the same illustration conventions used in FIGS. 6A-D and FIGS. 7A-D. The original images 802 and 804 shown in FIG. 8A both contain the imaged cruciform object 806. However, original image 802 additionally includes a systematic variation in image intensity, with the portion of the image 808 below a diagonal line from the top left-hand pixel 810 to the bottom right-hand pixel 812 having higher intensities than the portion of the image 814 above the diagonal line. Similarly, the second original image 804 has a lower, roughly triangular region 816 with generally higher intensities than the upper portion 818 of the image. Such systematic intensity differences and patterns may be caused by shading or illumination differences in the environment being imaged or by systematic variations in recorded pixel intensities during image capture within the image-capture device. FIG. 8B shows the unthresholded difference image 820 in similar fashion to the unthresholded difference images shown in FIGS. 6B and 7B. Because of the systematic pixel-intensity differences within each of the original images, the unthresholded difference 820 appears to have more difference pixels than non-difference pixels and is dominated by differences generated from the systematic intensity variation within the two original images rather than from the increase in size of the cruciform object 806. When the difference image is thresholded to remove difference pixels with unrescaled absolute-value intensities less than 2, the thresholded difference image 822, shown in FIG. 8C, is much less cluttered, but also fails to clearly show the differences of interest that represent an increase in size of the cruciform object. When the difference image is thresholded to remove difference pixels with unrescaled absolute-value intensities of 1 and 2, to produce the difference image 824 shown in FIG. 8D, there is almost no difference information of interest remaining in the thresholded difference image. Thus, systematic intensity variation within the original images may completely frustrate an attempt to extract meaningful difference information from the two images.

Figure 9A:
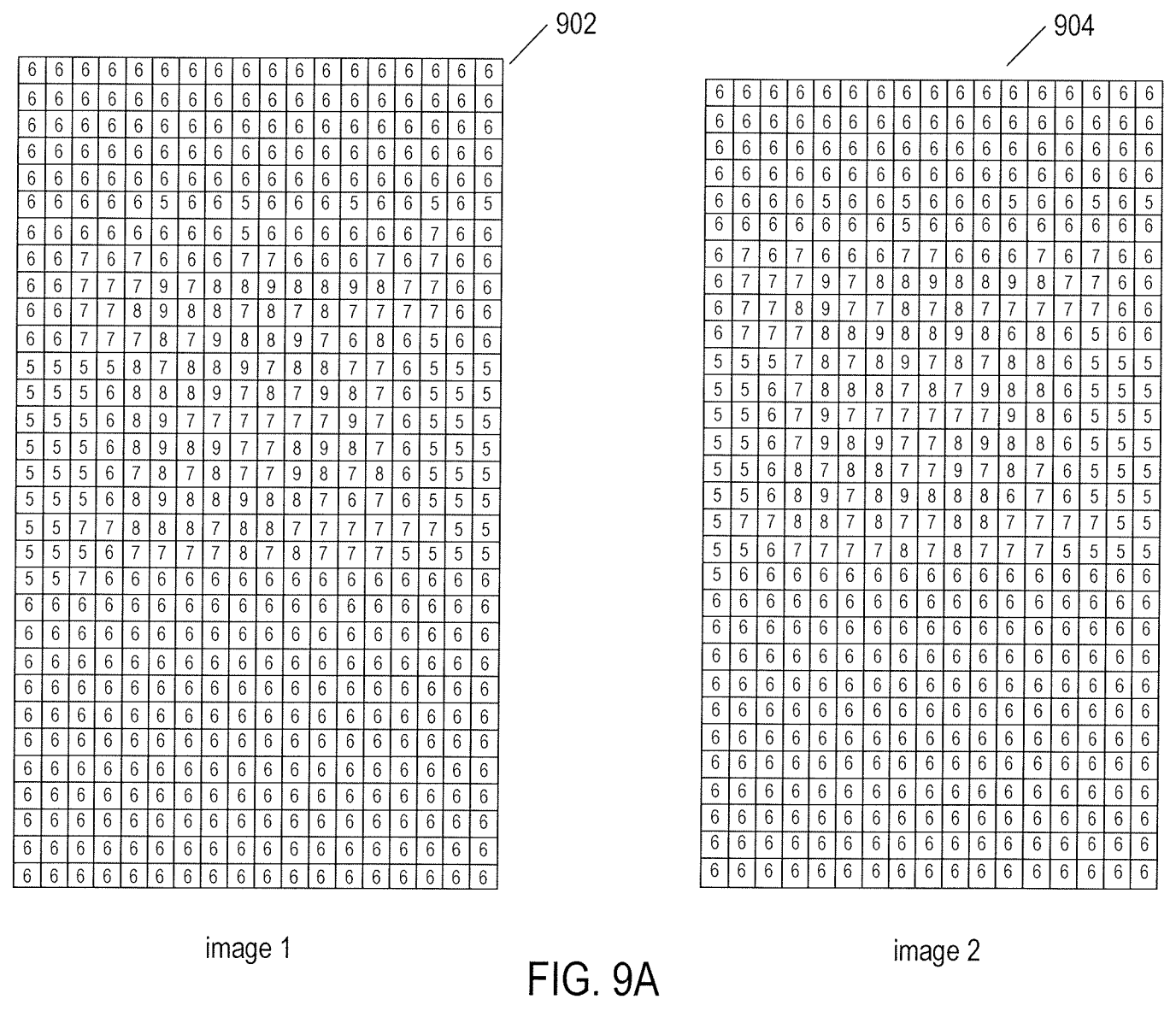
Figure 9B:
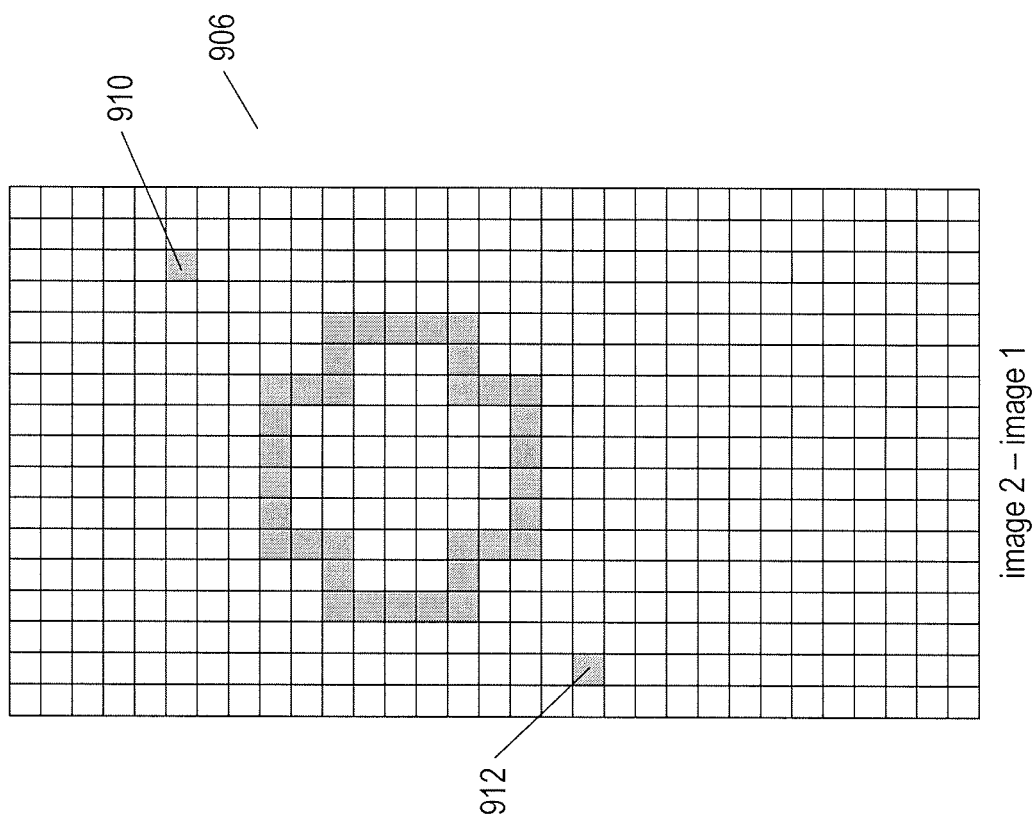

FIGS. 9A-B illustrate a typical result obtained by digital-image comparison. In the examples of FIGS. 5A-8D, the difference pixels of interest were readily apparently from visual inspection of the example original images shown in FIGS. 5A, 6A, 7A, and 8A. By contrast, in many real-world image-analysis problems, the differences may not be readily apparent during visual inspection of the original images. For example, FIG. 9A shows original images 902 and 904 in which all of the pixels have intermediate or high intensities. Neither the imaged cruciform object nor the increase in size of the imaged cruciform object is readily apparent from these displayed intensities. However, when the two images are differenced to produce difference image 906 shown in FIG. 9B, the pattern of difference pixels nicely shows the growth of size of the imaged cruciform object 908 along with several noise-induced differences 910 and 912. Thus, in many cases in which computational digital-image comparison is used, the comparison may reveal meaningful patterns that are not apparent to human viewers. Such subtle patterns of intensity difference are often completely obscured by the presence of noise or systematic intensity variations, as discussed above with reference to FIGS. 7A-D and 8A-D. It is to facilitate comparison of digital images that the normalization methods and systems disclosed in the current document were developed.

Implementations of the Currently Disclosed Methods and Systems

The current document is directed to normalization methods and systems that reduce or eliminate certain types of intensity variations among digital images prior to applying comparison operations to the digital images in order to detect meaningful differences in intensity between the digital images. The currently disclosed methods and systems seek to remove systematic intensity variation without exacerbating noise-induced intensity variations between images, which can lead to obscuring or eliminating the meaningful differences between digital images sought by digital-image comparison. The currently disclosed normalization methods and systems attempt to normalize digital images largely based on the intensity values of pixels or voxels within the images themselves rather than by using extrinsic information, and thus are useful in a wide variety of automated digital-image-processing and digital-image-analysis systems, including systems that identify and highlight meaningful differences in time sequences of medical images, systems that identify the time points of anomalies and events within long sequences of video frames, and systems that analyze images obtained by remote sensing.

Figure 10A:
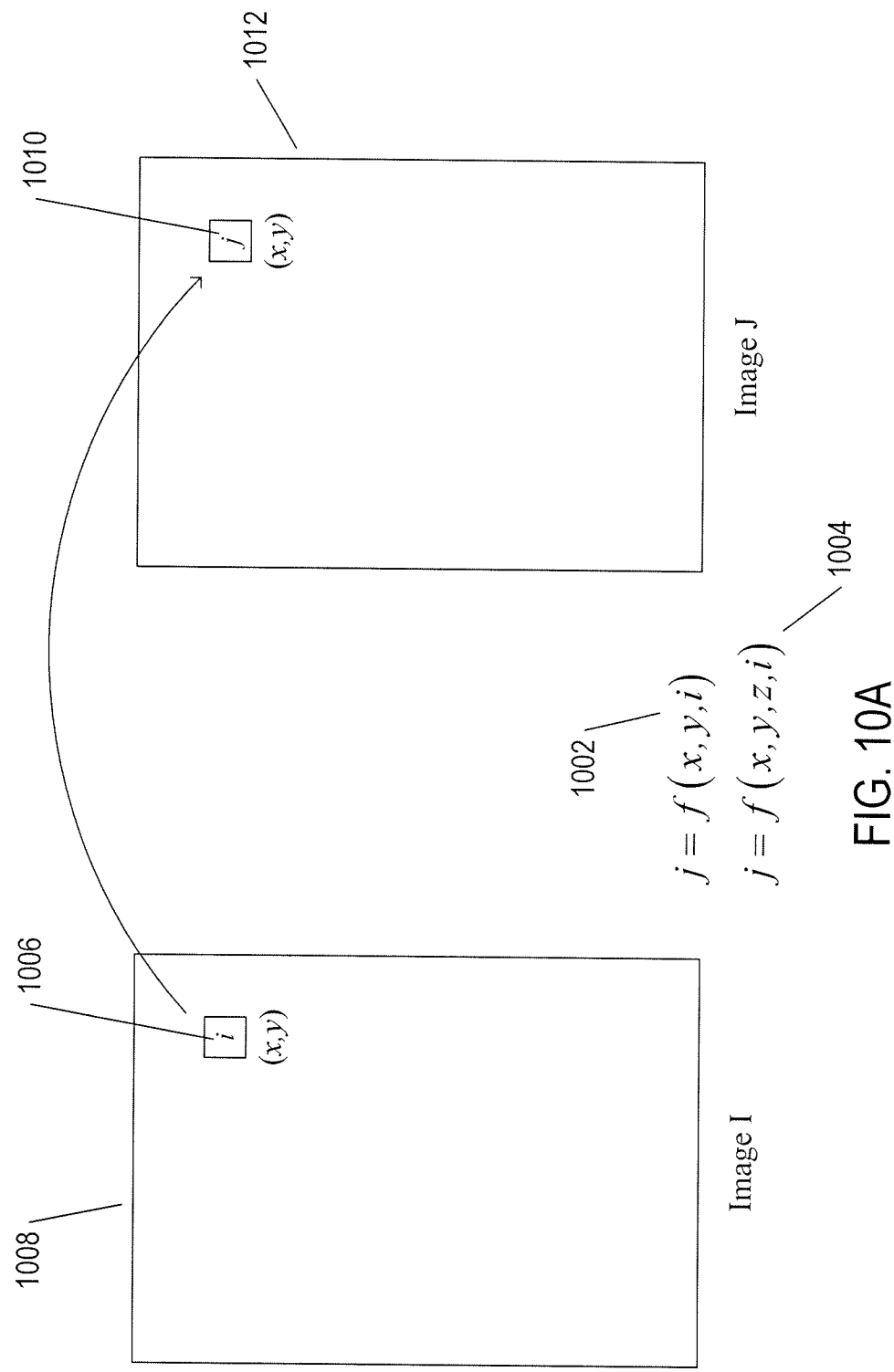
FIGS. 10A-B illustrate underlying concepts of the currently disclosed normalization methods and systems.
Figure 10B:
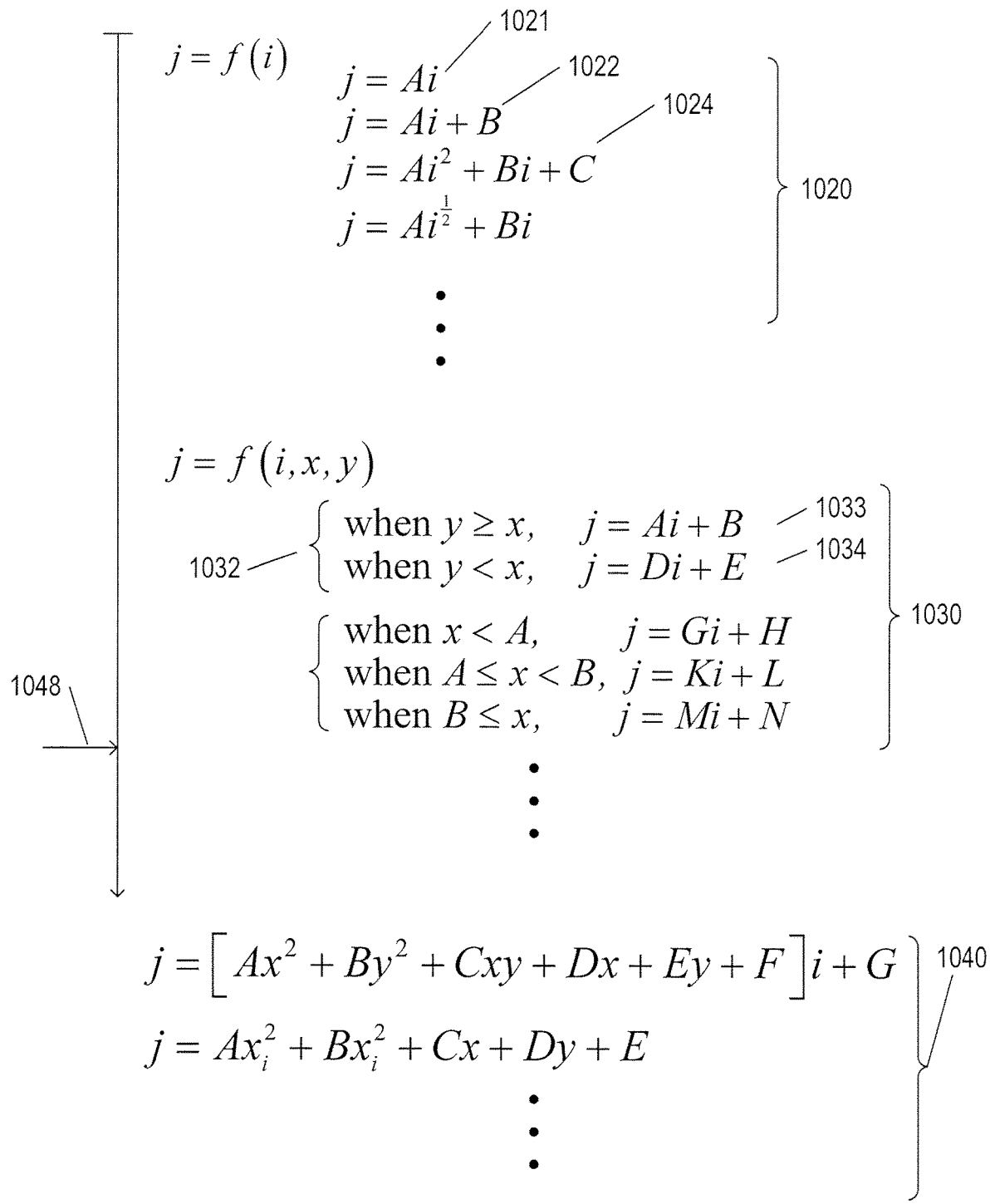

FIGS. 10A-B illustrate underlying concepts of the currently disclosed normalization methods and systems. As shown in FIG. 10A, the currently disclosed normalization methods seek to generate a mapping model, such as a mapping function 1002 for two-dimensional images or a mapping function 1004 for three-dimensional images that, given the position and intensity of a pixel 1006 in a first image 1008, generate a corresponding intensity 1010 for an equivalently located pixel in a second image 1012. By applying the mapping model to each pixel in the first image, a normalized image is produced that can be compared to the second image by using any of many different types of comparison operations to reveal intensity differences of interest between the two images. Of course, the mapping model can also be applied in an opposite sense to the second image to normalize the intensities in the second image to those of the first image.

FIG. 10B illustrates, for the two-dimensional-image case, a range of different types of analytical functions, that may be contemplated as mapping models for intensity normalization. A first class of mapping functions 1020 generates corresponding intensities j for intensities i without regard for the position of the pixel with that intensity in the first image. In other words, in this class of mapping functions, only the intensity i is provided as an argument. The mapping functions may be any of a variety of different types of expressions, including linear mapping functions 1021-1022 and quadratic mapping function 1024. Note that, in FIG. 10B, capital letters represent constant parameters in the example mapping functions.

In a second class of mapping functions 1030, each mapping function takes both the intensity as well as the position of a pixel in the first image as arguments and generates a corresponding intensity for a pixel at that same position in the second image. However, as shown by example mapping function 1032, the position arguments are used only to determine to which of several different subregions, or domains, the image any particular mapping function applies. In model 1032, when the pixel is in an upper left triangular domain of the image, a first linear function 1033 is used while, when the input pixel is in a lower triangular region or domain of the image, a second linear function 1034 is used. Thus, the second class of mapping functions essentially divide or partition an image into multiple domains, for each of which a domain-specific mapping function is generated for normalization of the intensities within an image.

A third class of mapping functions 1040 specifically maps individual pixel intensities to corresponding individual pixel intensities. For these mapping functions, both the position and the intensity of a pixel are variables within the mapping function. As shown in the downward-pointing vertical arrow 1046 in FIG. 10B, the specificity of the mapping functions significantly increase over the classes 1020, 1030, and 1040. Were model functions of the final class 1040 obtainable, and were they accurate, such mapping functions may be reasonably expected to provide the most precise and accurate intensity normalization. However, the problem with this level of specificity is that there is insufficient data, when only the intensity values within the two images are considered, to try to determine parameter values for such functions in a single pass at parameter optimization. As the model functions become more specific, the danger of the functions being dominated by stochastic noise, rather than real intensity-difference variations between the images, greatly increases, as a result of which a normalization process that attempted to employ such mapping functions in an initial single-pass optimization would likely mask meaningful differences obtained by subsequent image comparison and would instead generate a large amount of unwanted and meaningless noise-induced differences. Thus, as indicated by arrow 1048 in FIG. 10B, the currently disclosed normalization methods and systems initially use either models of the first class 1020 or the second class 1030, with the additional caveat that the domains specified in the second class of mapping functions must be sufficiently large to provide a sound statistical basis for determining mapping-function parameters.

Figure 11:
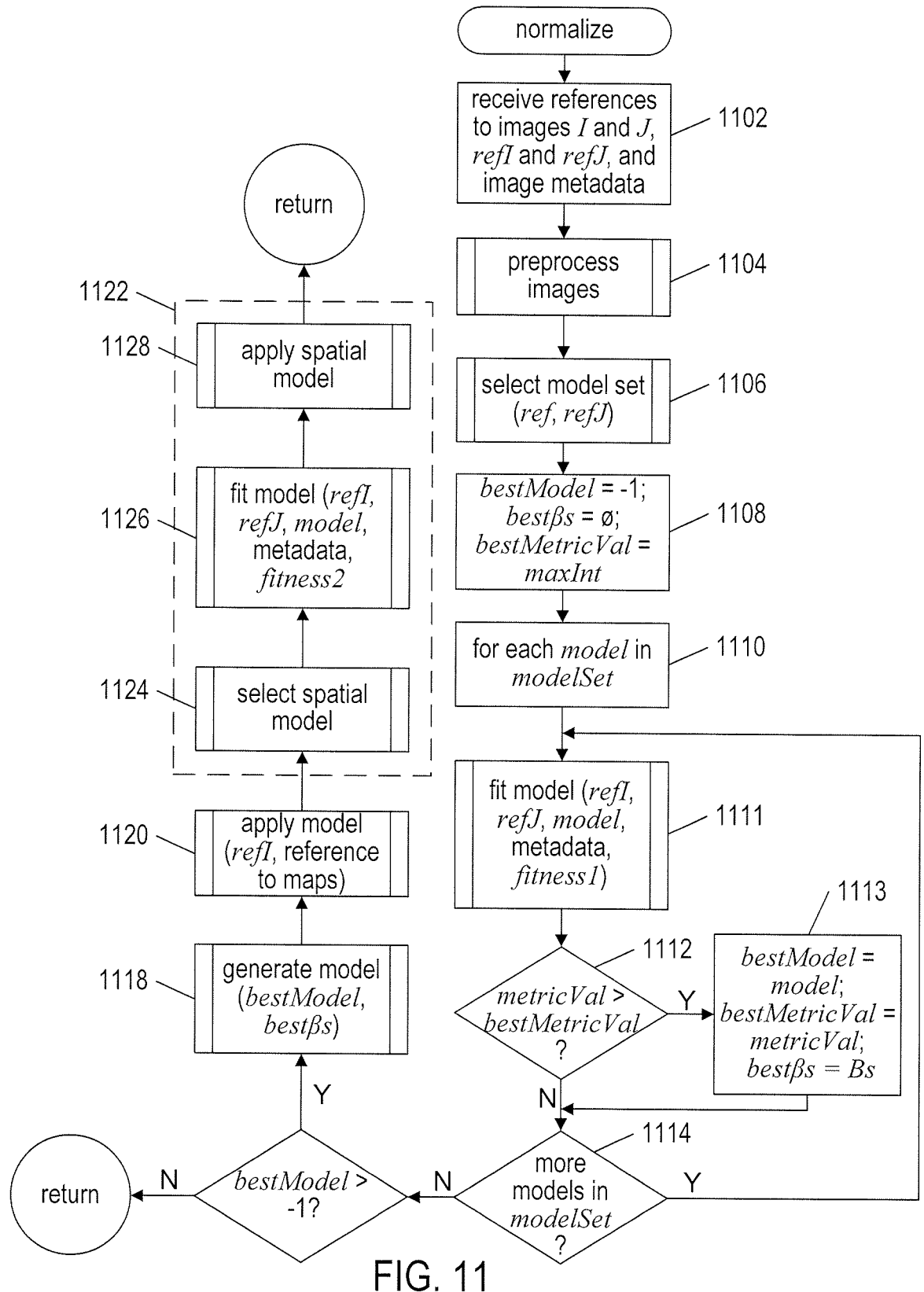
FIG. 11 provides a control-flow diagram for one implementation of the currently disclosed methods and systems.

FIG. 11 provides a control-flow diagram for one implementation of the currently disclosed methods and systems. In step 1102, the normalization procedure receives references to two images, refI and refJ, as well as image metadata that describes the types of images, their sizes, and other image parameters. In step 1104, the routine "normalize" calls a routine "preprocess images" to prepare the images for normalization. The routine "preprocess images" registers the images, so that each positionally equivalent pair of pixels selected from the two images correspond to the same point within the imaged environment. Registration may involve rotation and translation of the two images, as well as cropping, and may also involve more complex operations when extrinsic information about the subject matter to which the content of the images pertains is available. Preprocessing may also identify domains with different intensity variations within the images and may compute minimum and maximum intensities to allow for selection of appropriate data structures used in the normalization process. In step 1106, a set of possible mapping functions, or models, for normalization is selected. In many cases, normalization may use only a single intensity-mapping function when either multi-domain imaging is not supported or when multiple domains cannot be identified. However, in the general case, the normalization process may try numerous different mapping functions to determine which mapping function produces the best normalization. In that case, in step 1108 and the for-loop of steps 1110-1114, normalization is attempted for each mapping function and the best mapping function is selected.

In step 1111, the routine "fit model" is called to fit model parameters of a currently considered model, or mapping function, to the data, as discussed below, using the fitness function fitness 1, also discussed below. Note that the fitness function is passed to the routine "fit model" as an argument and is referred to internally within the routine "fit model" by the internal argument name "fitness." The best mapping function is then used to generate, as discussed below with reference to FIGS. 14A-B, an image-adjustment model, in step 1118, and the image-adjustment model is then applied, in step 1120, to the image referenced by refI to normalize image i with respect to image j in preparation for an image-comparison operation.

The final three steps in FIG. 11, shown within dashed rectangle 1122, are applied, in certain implementations, to address the problem of inhomogeneities. Inhomogeneities of various different types are spatial artifacts in images, including, for example, spatial artifacts in medical magnetic-resonance images ("MRIs") as well as illumination changes in scenes imaged by surveillance cameras. Inhomogeneities may arise from characteristics of image-acquisition devices, including systematic spatial response differentials, from characteristics of the objects or scenes being imaged, including varying illumination intensities, varying illumination spectral characteristics, and temporal changes in the absorbance and reflectivity of imaged surfaces, and other such changes. These artifacts can be relatively continuous, large-scale intensity fluctuations across an image. Thus, amelioration of inhomogeneities involves an intensity model, such as mapping functions 1040 discussed above with reference to FIG. 10B, that take into consideration the spatial locations of pixels within an image. In step 1124, a spatial mapping function is selected for parameter fitting, in step 1126, via a call to the above discussed function "fit model," called previously in step 1111. In this call to the function "fit model," a different fitness function fitness 2, discussed below, is passed to the function "fit model." The model is then used, in step 1128, to refine the normalization of the image referenced by refI. In certain implementations, the series of steps 1106 through 1120 may be alternated with steps 1124 through 1128 in multiple iterations to carry out multiple passes at normalization and refinement, with the iterations continuing until a convergence criterion is met or until a fixed number of iterations have been executed. In alternative implementations, amelioration of inhomogeneities may precede normalization, in one pass, or in each of multiple iterations. In yet additional implementations, various characteristics of the input images determine whether or not amelioration of inhomogeneities is attempted and, if attempted, whether or not amelioration of inhomogeneities precedes or follows normalization.

FIGS. 12A-G illustrate tabulation of pixel-intensity mappings and generation of a difference metric value for a particular mapping model. FIGS. 12A-E all use the same illustration conventions, next discussed with reference to FIG. 12A. The examples are based on two-dimensional images, but the illustrated methods are equally applicable to three-dimensional images. In each figure, a first example image 1202 and a second example image 1204 are shown, similar to pairs of images shown in FIGS. 5A, 6A, 7A, 8A, and 9A. Below the two images, a table 1206 is shown in each figure. The table represents a mapping of intensity values that occur in the first image 1202, referred to as image "A," to intensity values in the second image 1204, referred to as image "B." The population of this data table is illustrated in FIGS. 12B-E. The illustrated mapping is a mapping for non-0 intensities in image A to corresponding intensities in image B, in the currently discussed example. In certain medical images, for example, areas or volumes of the image may be omitted from normalization, such as areas or volumes corresponding to air, or non-tissue volumes. These omitted areas or volumes may, of course, have non-zero intensities.

Figure 12A:
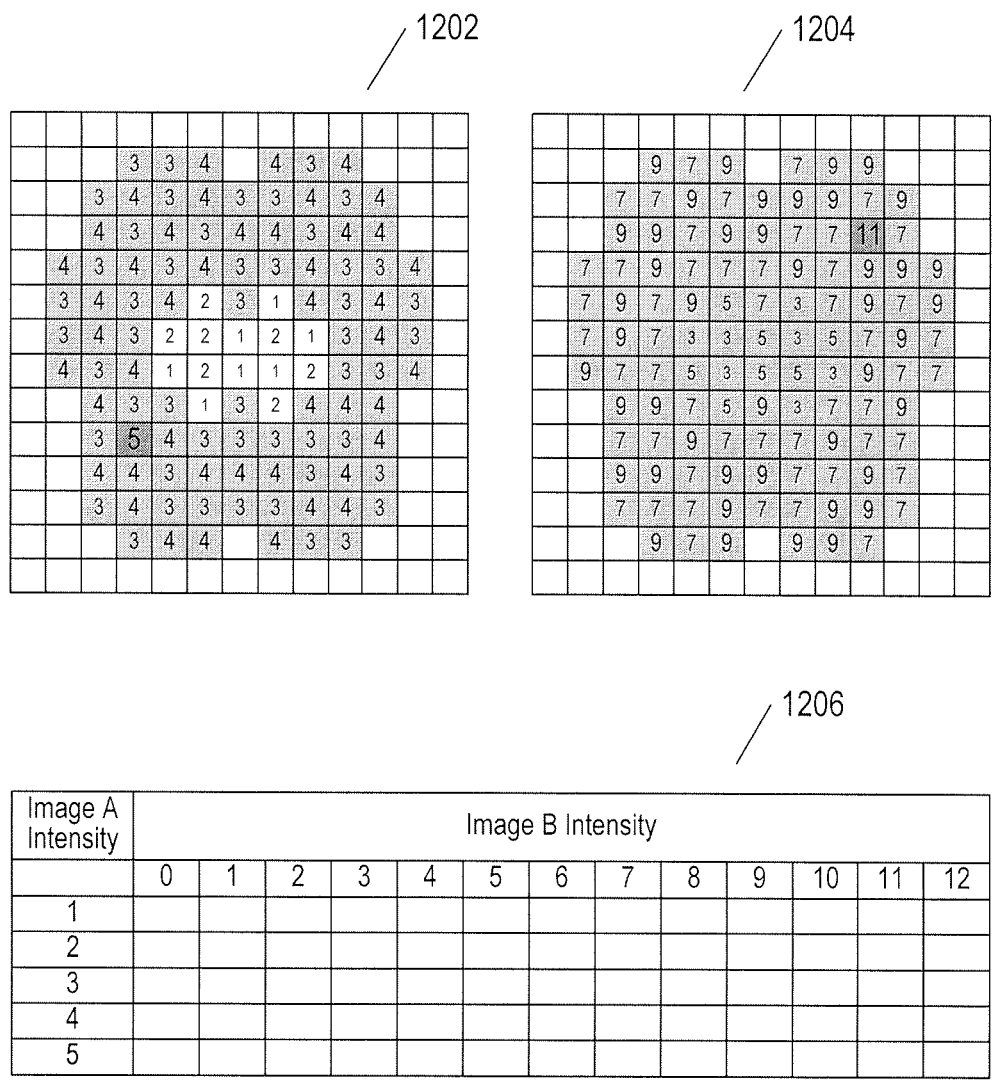
Figure 12B:
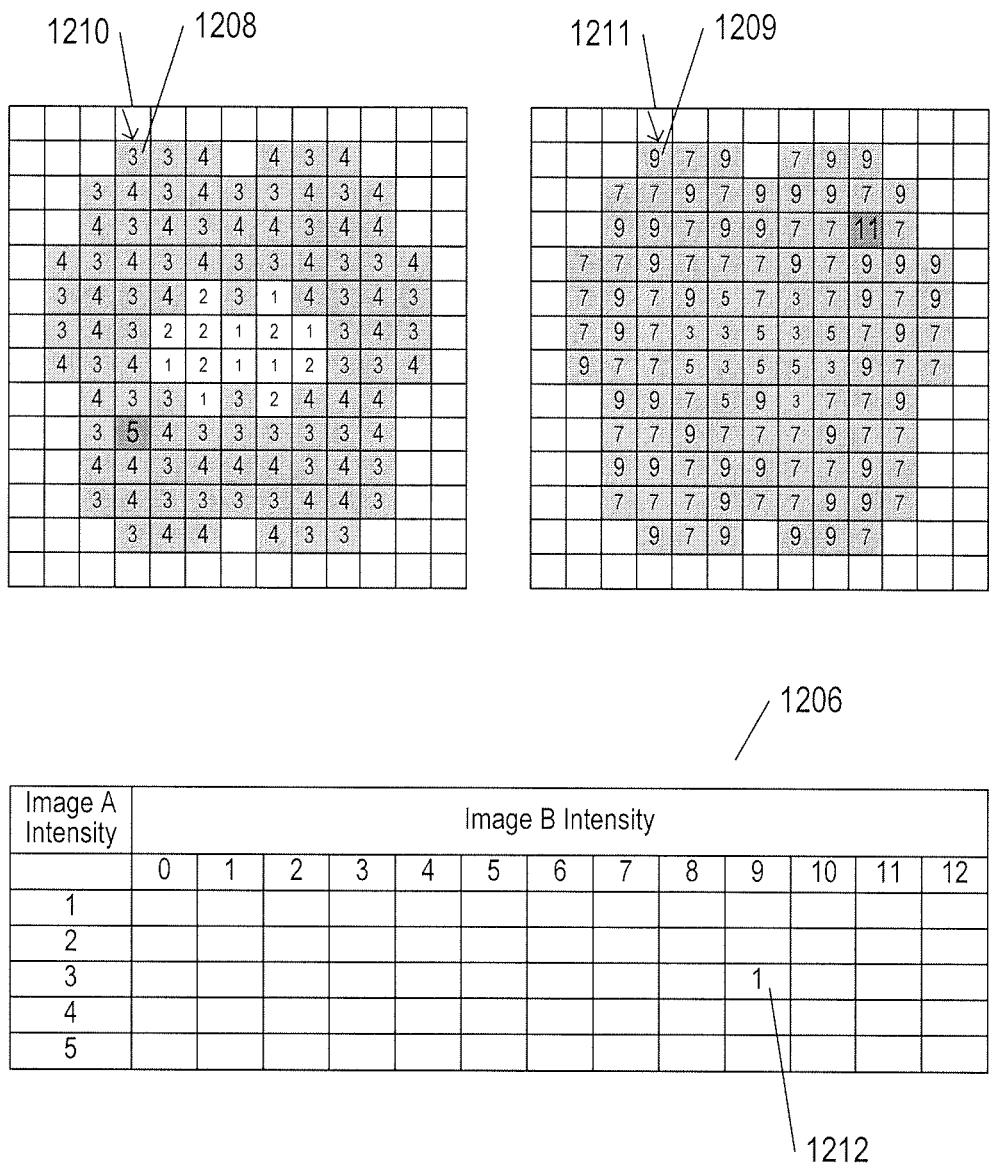
Figure 12C:
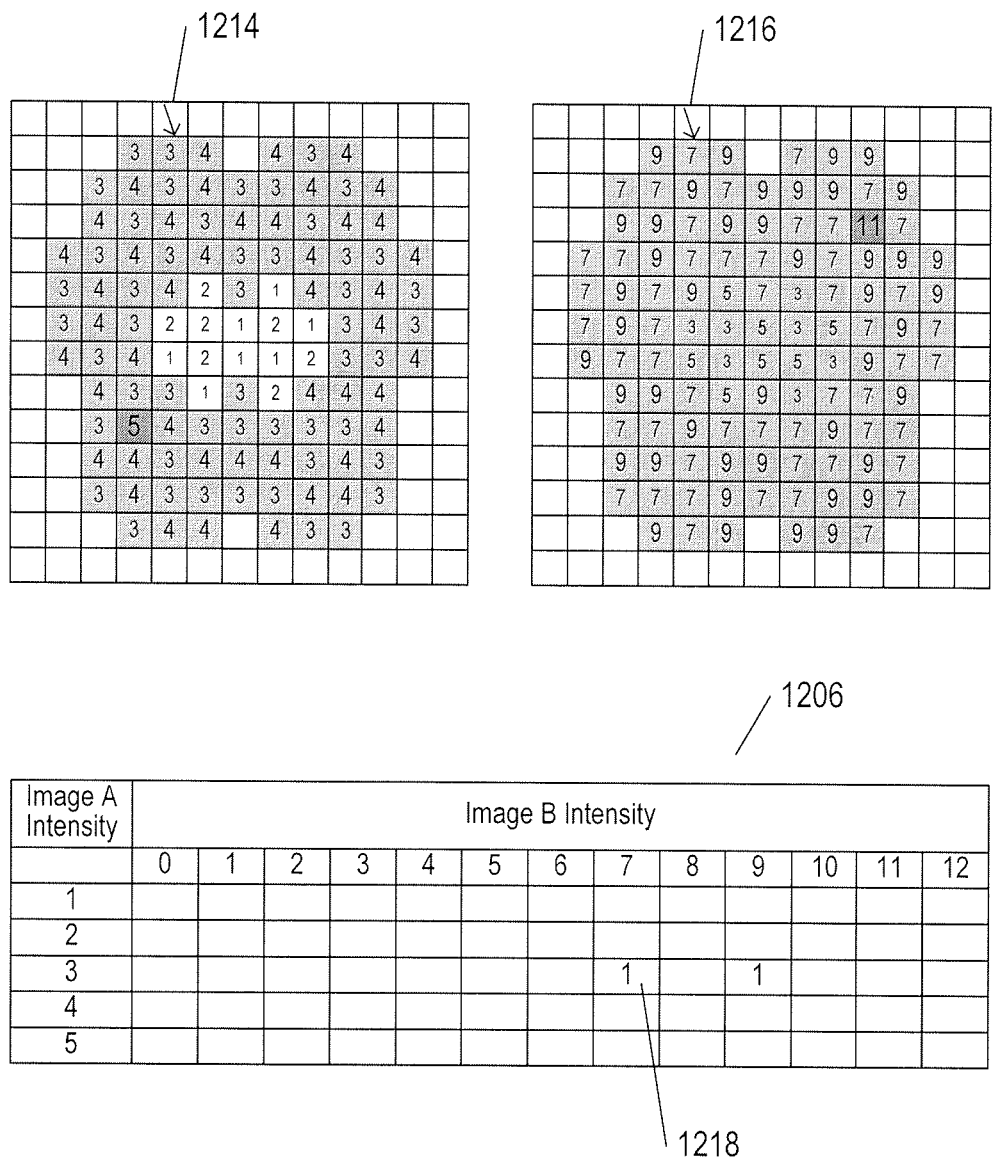
Figure 12D:
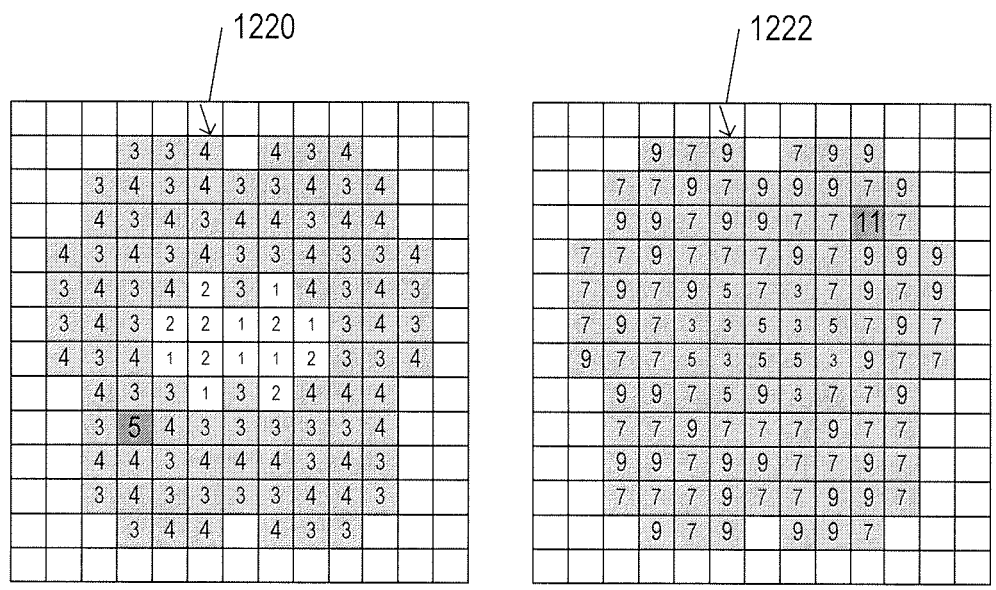
Figure 12E:
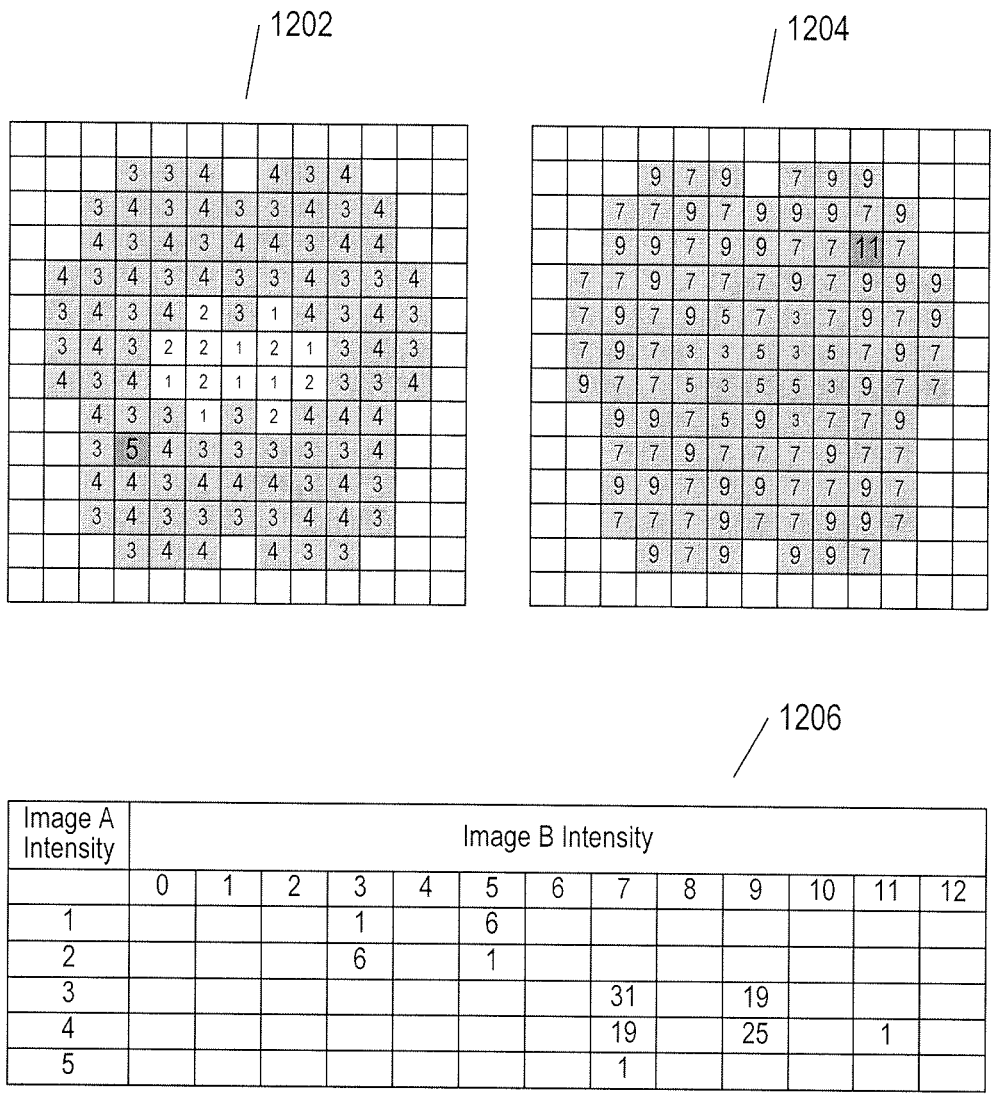

FIG. 12B shows a first step in the population of data table 1206. A pair of equivalently located pixels 1208 and 1209 are indicated by arrows 1210 and 1211 in images A and B. The intensity value 3 of pixel 1210 in image A is mapped to intensity value 9 of pixel 1211 in image B. Therefore, the cell 1212 in table 1206 corresponding to mapping of intensity value 3 to intensity value 9 from image A to image B is incremented to 1. FIG. 12C shows consideration of a next pair of pixels represented by arrows 1214 and 1216. In this case, the intensity value 3 in image A is mapped to the intensity value 7 in image B. Thus, the cell 1218 corresponding to a mapping of intensity value 3 to intensity value 7 is incremented to the value 1. FIG. 12D shows a third step in table population. Arrows 1220 and 1222 indicate a third pair of pixels. In this case, intensity value 4 is mapped to intensity value 9, as a result of which cell 1224 in table 1206 is incremented to the value 1. This process proceeds through all of the shaded pixel pairs in images A and B to populate table 1206, as shown in FIG. 12E.

Figure 12F:
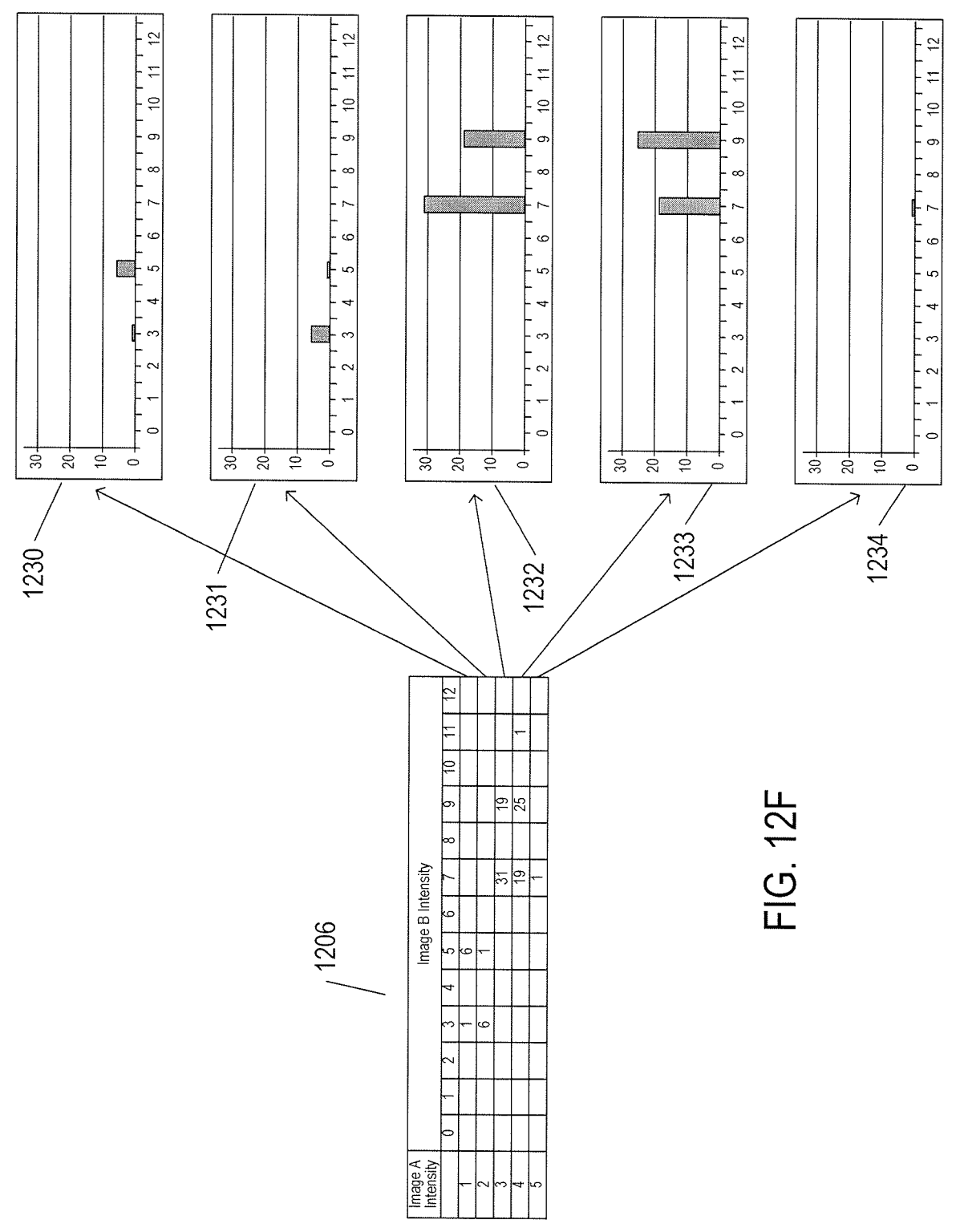

As shown in FIG. 12F, table 1206, produced by considering a sequence of positionally equivalent pixels in images A and B, as discussed above with reference to FIGS. 12A-E, can be alternatively considered to be a set of histograms 1230-1234, with each row in table 1206 providing the data for a single, corresponding histogram. Histogram 1230 shows the distribution of intensity values in image B for pixels in image B positionally corresponding to pixels in image A with intensity value 1. Similarly, histogram 1231 shows the distribution of intensities of pixels in image B positionally corresponding to pixels in image A with intensity value 2.

Figure 12G:
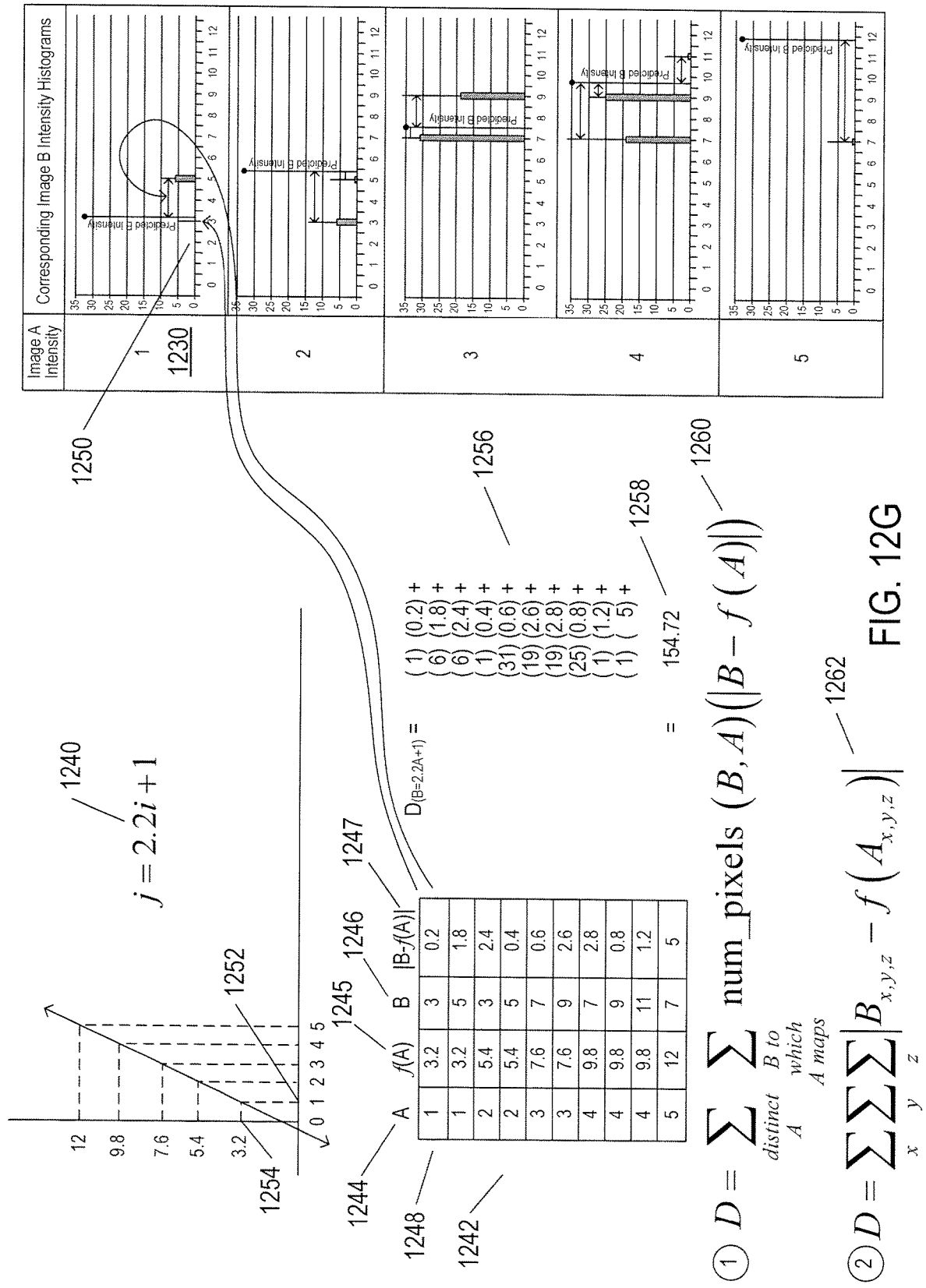

The currently disclosed methods and systems seek to use the tabulated intensity-mapping data, such as the data tabulated in example 1206 or, equivalently, tabulated in histograms 1230-1234 shown in FIG. 12F, to generate parameters for a mapping function. FIG. 12G shows a plot 1240 of the mapping function $j=mi+b$, where the values for the parameters m and b have been determined to be 2.2 and 1, respectively. The difference metric is used to evaluate how closely the mapping function fits the tabulated data. Computation of the difference metric is illustrated in the lower portion of FIG. 12G. First, a table 1242 of differences is computed. Each row in this table corresponds to the mapping from a particular intensity value in image A to another intensity value in image B, and also corresponds to a particular bar within one of the histograms. The elements within a row, or the columns of the table, correspond to: (1) the intensity value in image A 1244; (2) a corresponding intensity value computed using the mapping function 1245; (3) the intensity value observed in image B 1246; and (4) the absolute value of the difference between the observed intensity value and the intensity value computed by the mapping function 1247. Thus, the first row 1248 in table 1242 corresponds to the first bar 1250 in histogram 1230. This bar represents the number of pixels with intensity value 1 in image A whose positionally corresponding pixel in image B has the intensity value 3. According to the mapping function, the intensity value 1 (1252 in FIG. 12G) in image A is mapped to the intensity value 3.2 (1254 in FIG. 12G) in image B. The absolute value of the difference between the computed value 3.2 and the observed value 3 is 0.2.

In the central portion of FIG. 12G, an example calculation of the difference metric D is shown 1256. This difference metric is computed as a sum of terms, each term corresponding to a row in table 1242. Each computed absolute-value difference in the final column of table 1242 is multiplied by the height of the histogram bar corresponding to the row in FIG. 1242 that contains the absolute-value difference to produce a numeric sum of terms 1258 that represents the sum of the absolute values of the differences between the observed pixel values in image B and the pixel values computed by the mapping function based on corresponding intensities in image A. The computation of the difference metric D is alternatively illustrated by two equations 1260 and 1262. The first equation is equivalent to the computation shown in the example 1256. The outer summation is over the distinct intensity values observed in image A. The inner summation is over the distinct intensity values observed in image B for a given intensity value observed in image A. The terms of the expression are the product of the number of pixels with a particular intensity value in image B times the absolute value of the difference between that intensity value and the computed intensity value. Alternatively, as shown by equation 1262, the difference metric is the sum, over all corresponding pairs of pixels in images A and B, of the absolute value of the difference between the observed intensity value of each pixel in image B and the value computed by the mapping function for the intensity value of the corresponding pixel in image A.

FIGS. 13A-F illustrate aspects of a genetic mapping-function-parameter-fitting method that is used to optimize parameter values for a mapping function that maps intensities from a first image to a second image within at least a pair of image domains. The genetic parameter-fitting method is used iteratively to produce successive generations of individuals, each corresponding to a set of mapping-function parameter values. The method simulates evolution of individuals to produce a most fit individual with the best model parameter values.

Figure 13A:
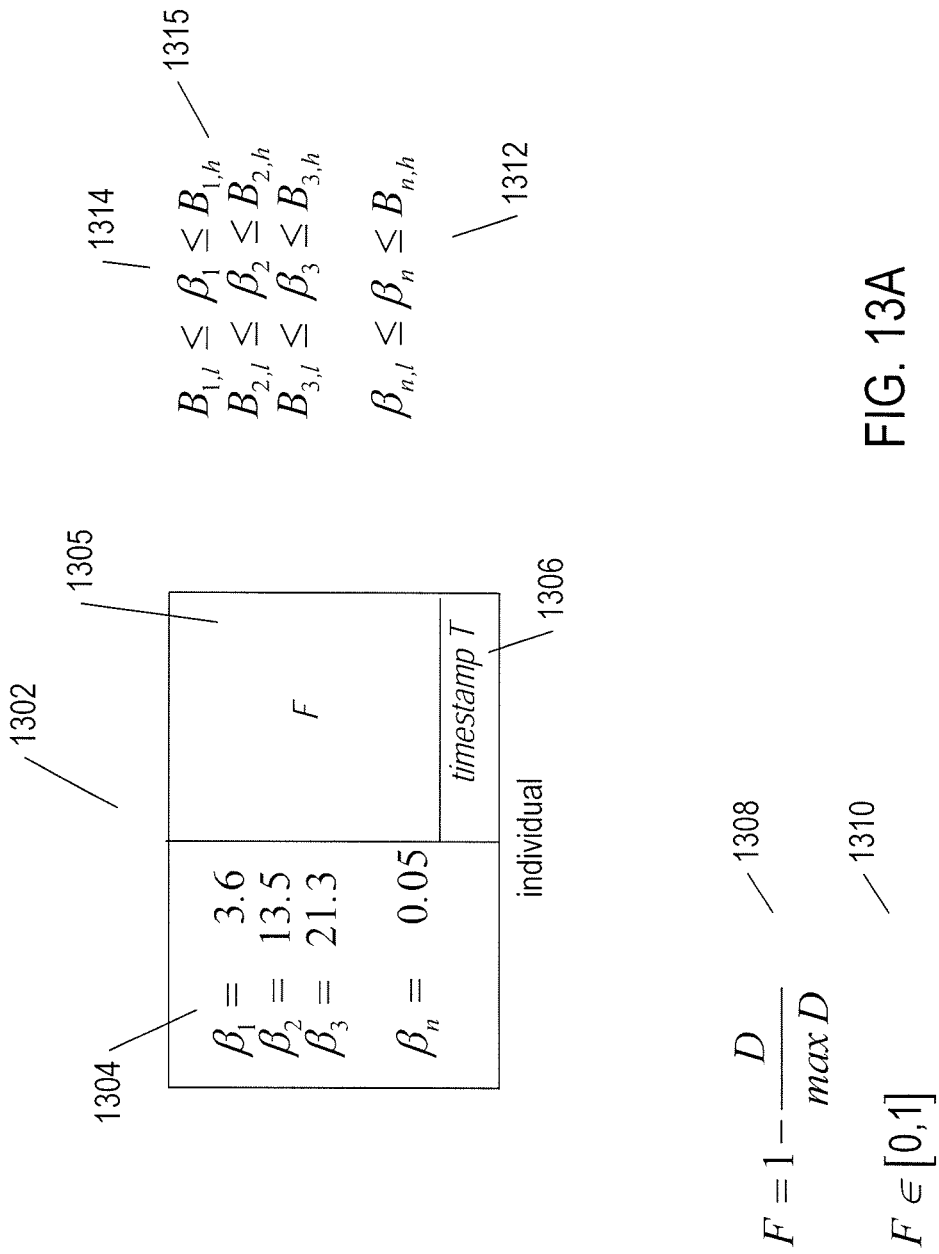

FIG. 13A illustrates an individual. The individual 1302 can be thought of as a data structure that includes a set of mapping-function parameter values 1304, a fitness value 1305, and a timestamp 1306. The fitness value is computed from the difference metric, computation of which is discussed above with reference to FIG. 12G. The timestamp is, in the described implementation, an indication of the number of generations over which the particular individual has survived. Computation of the fitness value is shown by equation 1308 in FIG. 13A. The fitness value is 1—the ratio of the difference metric for the set of parameter values contained in the individual divided by the maximum observed difference metric. Fitness values range from 0 to 1 1310, with 1 representing a maximally fit, or perfectly fit, individual. In alternative implementations, different computed fitness values with difference ranges and senses may be used. For example, the difference metric can be used as the fitness value, in which case a value of 0 would be best and increasing positive values would represent decreasing fitness. The parameter values $\beta_1, \beta_2, \ldots \beta_n$ are the constant parameter values for a mapping function. As discussed above, a linear mapping function may have two parameter values, in which case an individual would contain the two parameter values $\beta_1$ and $\beta_2$. There is a set of lowest-possible- and highest-possible values for each parameter value, so that the parameter values can be assumed to fall within the ranges specified by the lowest and highest values 1312. In certain implementations, these ranges are empirically estimated. Thus, for example, the value of parameter $\beta_1$ 1314 is assumed to fall within the range $[B_{1,l}, B_{1,h}]$ 1315. As discussed below with reference to FIG. 15K, a modified fitness value is used for fitting spatial mapping functions to data.

Figure 13B:
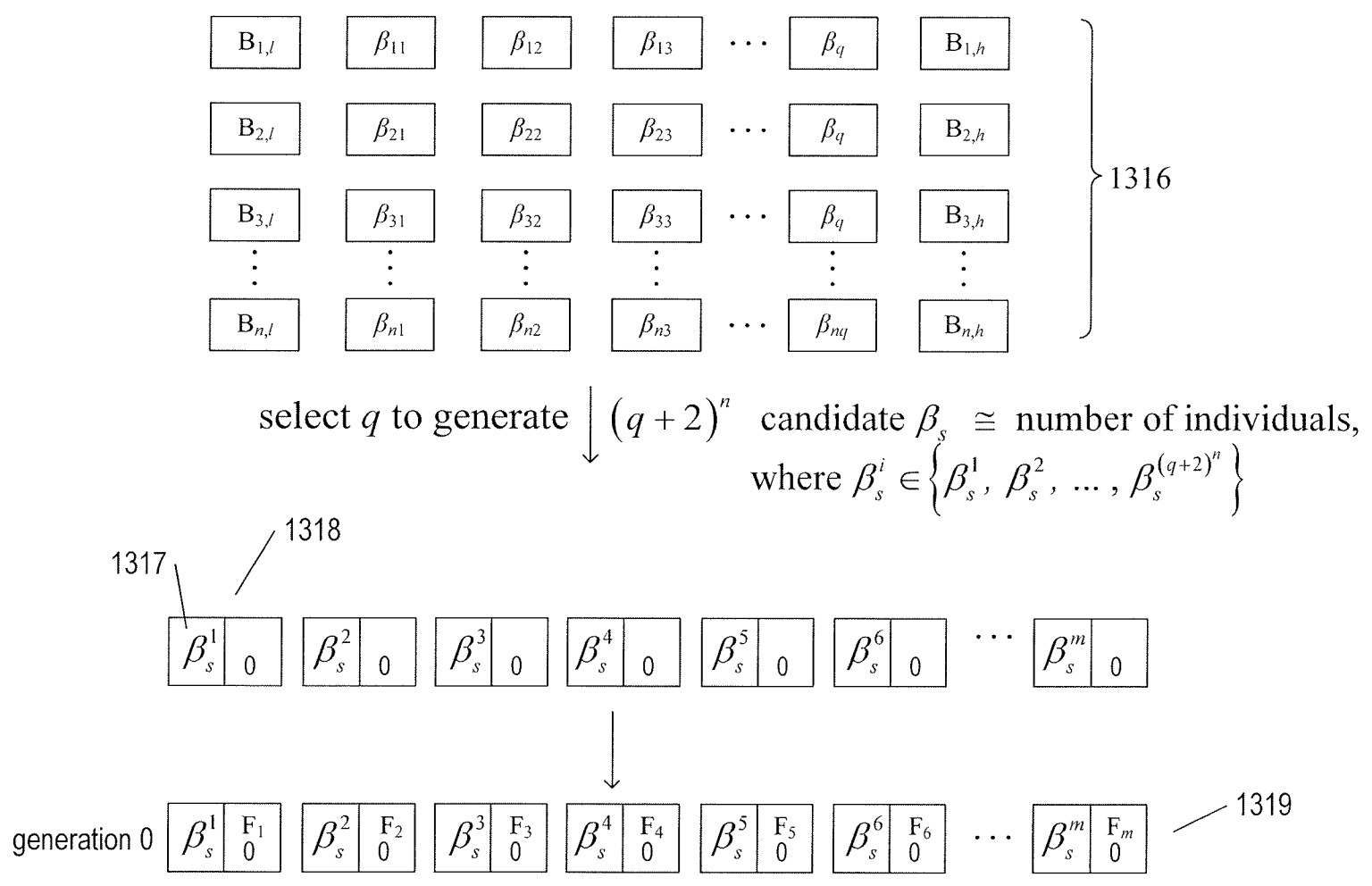

FIG. 13B illustrates construction of a first generation of individuals, generation 0. In this construction, used in certain implementations, a number q of different, evenly spaced, candidate parameter values within the range of values for each parameter is computed, as represented by the matrix-like set of nodes 1316 in FIG. 13B. These candidate parameter values can be used to generate $(q+2)^n$ different sets of candidate parameters $\beta_s$. The value q is selected so that the number of candidate parameter-value sets $\beta_s$ is approximately equal to, but equal to or greater than, the number of individuals used in the genetic optimization method. A unique set of candidate parameter values $\beta_s$ is assigned to each individual, such as the candidate set of parameter values $\beta_s^1$ 1317 assigned to individual 1318. The timestamp for each generation-0 individual is set to 0. Finally, a fitness value is computed for each candidate set of parameter values/individual and included in the individual data structure. Generation 0 is shown in FIG. 13B as the individuals in the row of individuals 1319.

Figure 13C:
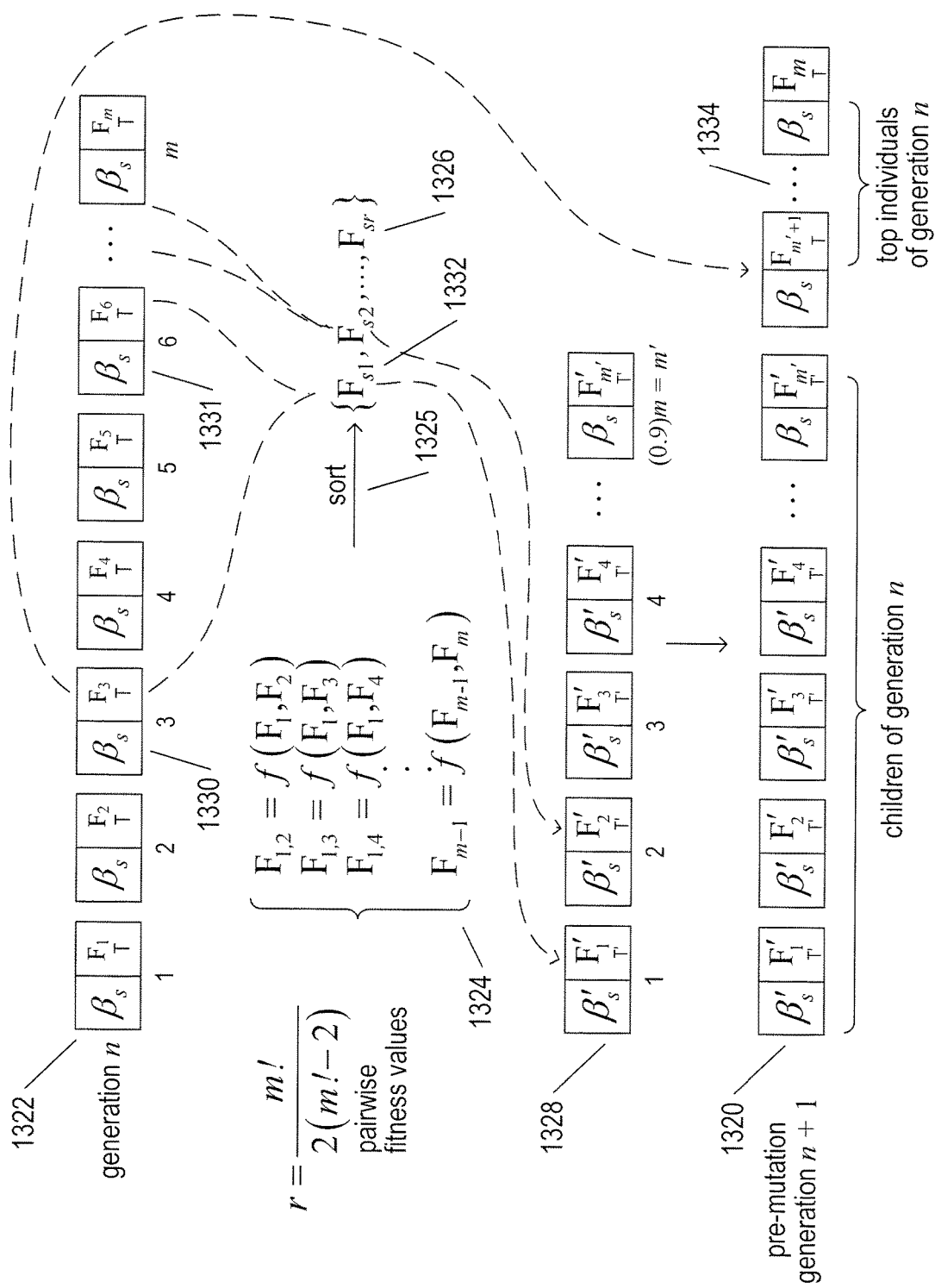

FIG. 13C illustrates production of a next generation n+1 of individuals 1320 from a generation n of individuals 1322. In a first step, a set of combined or pairwise fitness values is computed for the possible combinations of two individuals selected from generation n 1324. Computation of the pairwise fitness values may be simply addition of the fitness values of each individual in the pair of individuals, but may also be represented by a more complex function in alternative implementations. The set of pairwise fitness values is sorted 1325 in descending magnitude order. Then, a child individual is produced from the parent individuals in generation n corresponding to pairwise fitness values selected from the set of pairwise fitness values 1326 in magnitude-descending order. For example, a first child individual 1328 is obtained by breeding parent individuals 1330 and 1331 corresponding to the pairwise fitness value 1332. A number of child individuals is produced in this manner equal to 90 percent of the total number of individuals in a generation. Then, the 10% most fit individuals from generation n are selected as the remaining 10% 1334 of the individuals in generation n+1. Thus, 90% of the individuals in a subsequent generation n+1 are children bred from the most fit pairs of individuals in generation n and 10% of the individuals in a subsequent generation n+1 are replicates of the 10% most fit individuals of generation n. Of course, the 90% death ratio and 10% survival ratios for successive generations are only one possible pair of ratios. In alternative implementations, different death and survival ratios may be used and, in certain implementations, the ratios may vary over parameter fitting through successive generations.

Figure 13D:
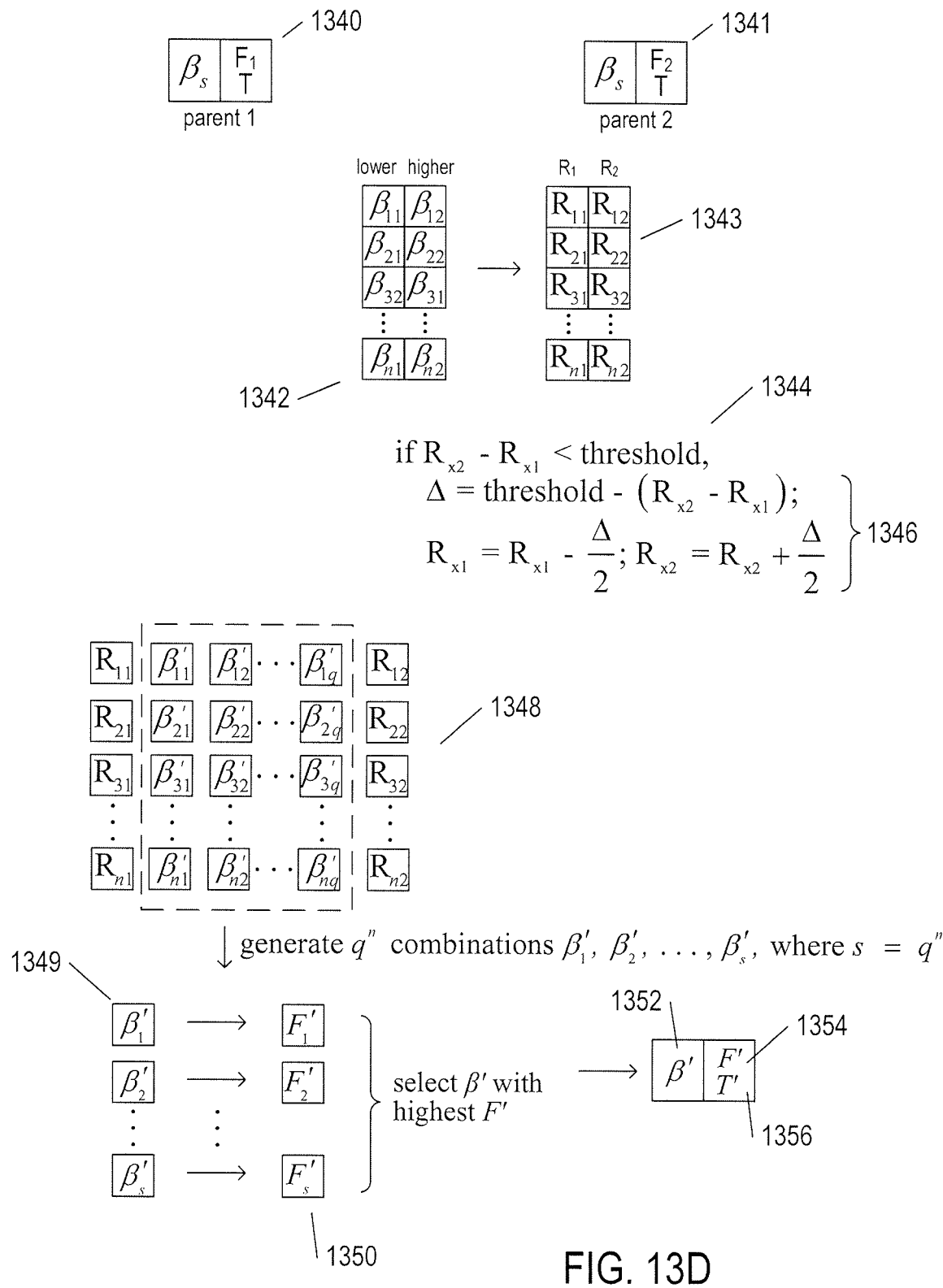

FIG. 13D illustrates how two fit parents from generation n are bred to produce a child individual, such as the breeding of individuals 1330 and 1331 from generation n, in FIG. 13C, to produce child 1328. In FIG. 13D, the two parents 1340 and 1341 are shown at the top of the figure. Pairs of corresponding parameter values of these two parents are sorted into pairs of parameter values that includes a first lower-valued parameter and a second higher-valued parameter 1342. These sorted pairs of parameter values are then used to produce parameter-value ranges 1343. In most cases, the range $R_1$-$R_2$ is equal to the range represented by ordered parameters $\beta_1$-$\beta_2$. However, when the difference between the highest value and lowest value in the range is less than a threshold value 1344, the range values are adjusted to span the minimum threshold range 1346. This handles a case in which the difference between the highest value and lowest value is sufficiently small that the differences between adjacent parameter values for a parameter would be too small to produce meaningful changes in the overall fitness for the mapping function. Next, as indicated by matrix 1348, a set of candidate parameter values, evenly spaced within the range for each parameter value, is generated. A number q of candidate values for each parameter value is generated, where q is a parameter of the genetic optimization method. A number $q^n$ parameter combinations, each combination including a candidate value for each of the n model parameters, is selected from this set of candidate parameter values. Then, a corresponding fitness value is generated for each of the $q^n$ combinations, as indicated by columns 1349 and 1350 in FIG. 13D. The set of candidate parameter values with the highest fitness value is then selected as the set of parameter values for the child 1352. The corresponding fitness metric is included in the child 1354 along with a new timestamp value of 0.

Figure 13E:
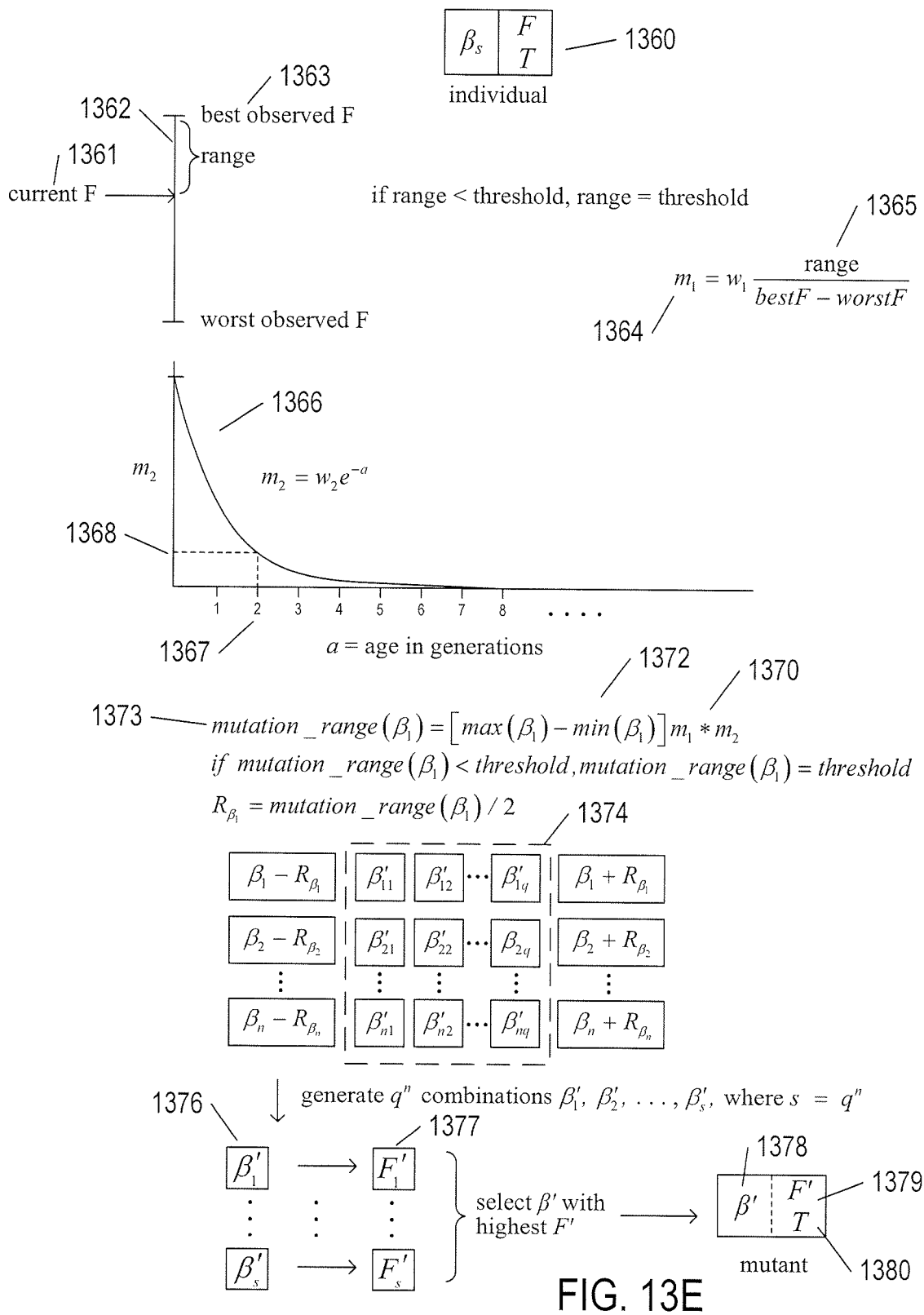

After producing children and copying fit individuals from a previous generation to produce individuals of the next generation, as discussed above with reference to FIG. 13C, each of the individuals is mutated. FIG. 13E illustrates the mutation operation. At the top of FIG. 13E, a next-generation individual is shown 1360. Two multipliers are computed for the individual. A first multiplier $m_1$ reflects the current optimality of the individual. The computed fitness for the individual 1361 is used to determine a range 1362 that is equal to the distance between the current fitness and the best-observed fitness 1363. The first multiplier $m_1$ 1364 is computed as the ratio of that range to the difference between the best and worst observed fitnesses multiplied by a weight $w_1$ 1365. A second multiplier $m_2$ is generated from an exponential decay curve 1366. The current age, in generations of the individual, such as the age 2 (1367 in FIG. 13E), is used to compute a corresponding $m_2$ value 1368. The more optimal the parameter set of the individual, as reflected by the smallness of the computed range 1362, the smaller the multiplier $m_1$ 1364. The older the individual, the smaller the multiplier $m_2$. The product of these two multipliers 1370 is used as a multiplier of the total possible range of parameter values 1372 to produce a mutation range 1373 for the parameter. Then, an evenly spaced set of candidate parameter values, shown within the dashed square 1374, is generated within this range for each model parameter. Thus, the more fit the individual and the older the individual, the smaller the adjustments to the parameter values that are made during the mutation process. A set of combinations of candidate parameter values, one candidate parameter value selected from each row in the matrix 1374, represents the set of possible parameter-value sets for the mutated individual. The fitness values for each candidate set of parameter values are then computed, as represented by columns 1376 and 1377 in FIG. 13E, and the candidate set of parameter values corresponding to the highest-computed fitness is used as the set of parameter values for the mutant individual 1378. The computed fitness value for the set of parameter values is inserted into the individual 1379 but the timestamp remains unchanged 1380.

Figure 13F:
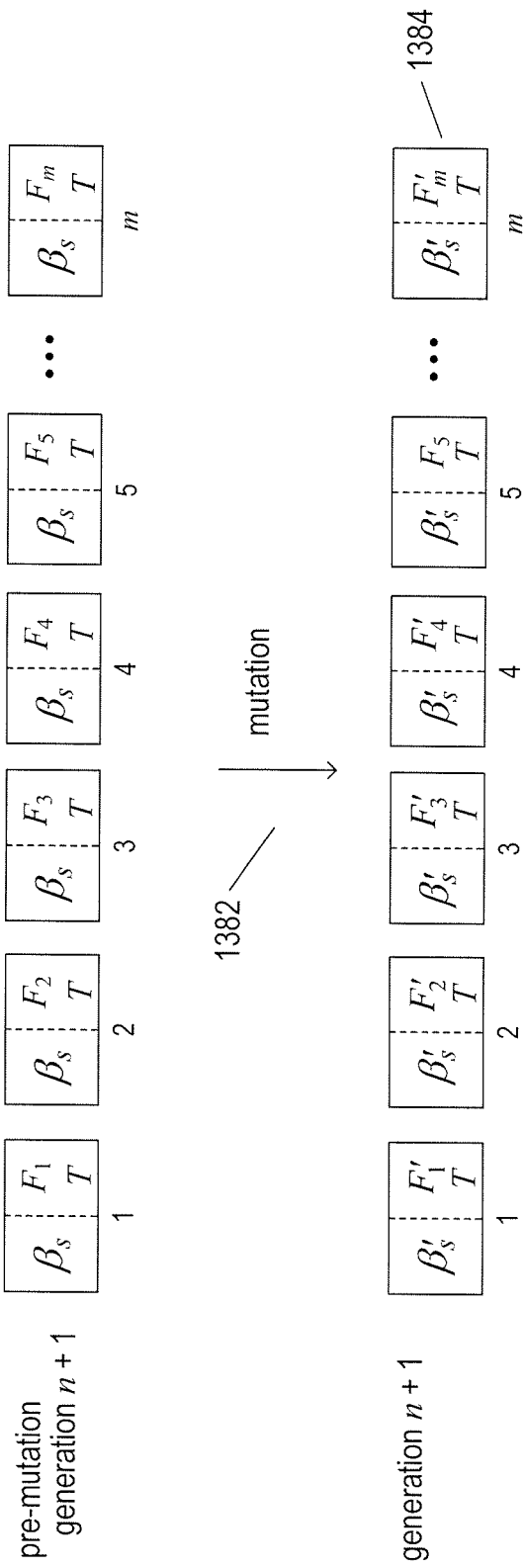

FIG. 13F illustrates completion of construction of a next generation. As shown in FIG. 13F, mutation 1382 of each individual in the pre-mutation set of individuals produces a complete subsequent generation n+1 1384. It should be noted that the currently disclosed genetic mapping-function-parameter-fitting method is fully deterministic, unlike commonly used genetic mapping-function-parameter-fitting methods. The term "deterministic," as used in the preceding sentence, means that the same parameter values would be obtained for a given data set each time the currently disclosed genetic mapping-function-parameter-fitting method is applied to the data set. Many stochastic genetic mapping-function-parameter-fitting methods employ pseudo-random-number generators to select parameter values during breeding and mutation, as a result of which generally different parameters are produced each time the commonly used genetic mapping-function-parameter-fitting methods are applied to a given data set. Determinism is a highly desirable characteristic for image normalization, particularly for medical images. However, stochastic parameter-fitting methods may also be used in alternative implementations. In fact, many other parameter-fitting methods may be used in alternative implementations, including least-squares, Gauss-Newton non-linear least squares, and various optimization methods.

Figure 14A:
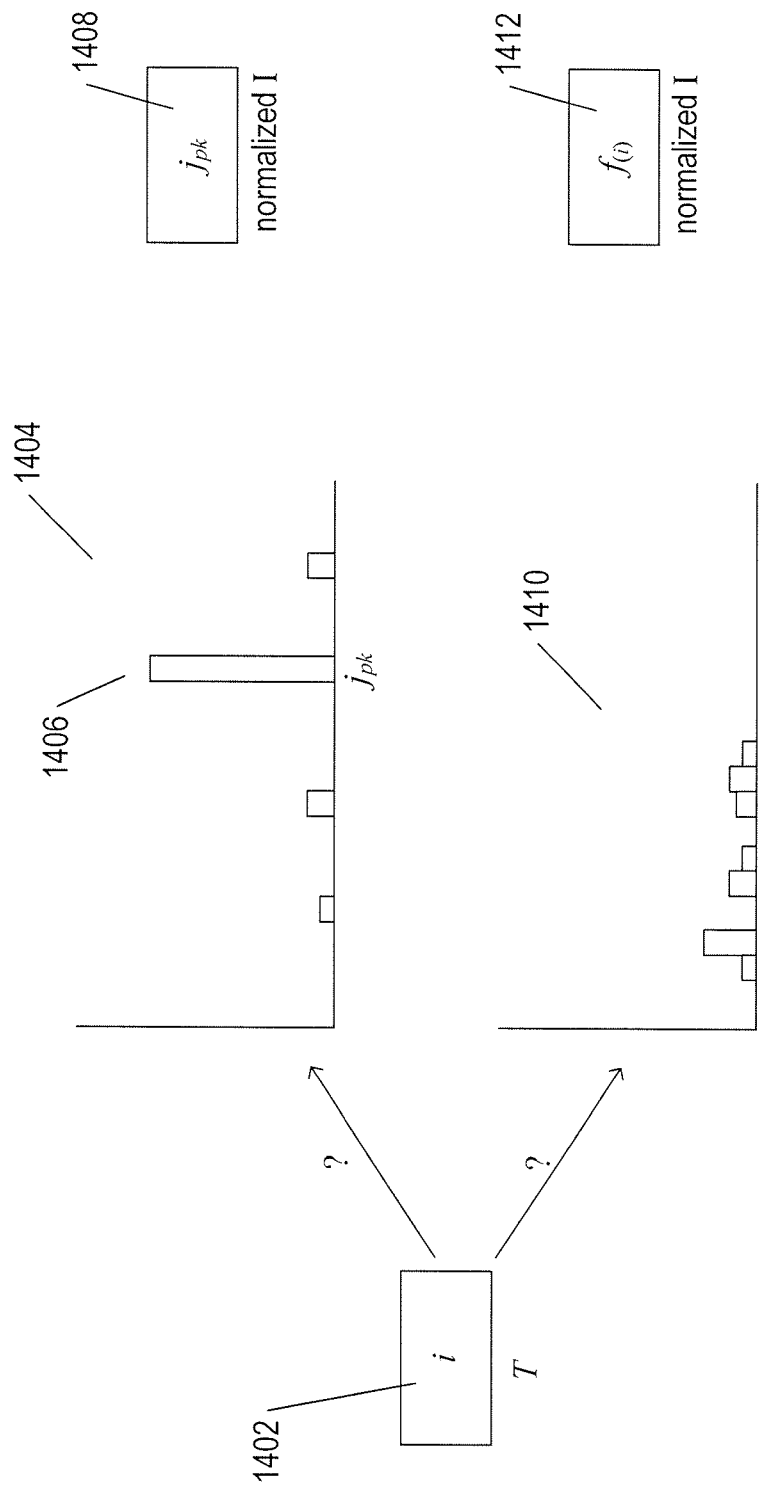
FIGS. 14A-B illustrate the final intensity-mapping model produced by the currently disclosed methods and system.
Figure 14B:
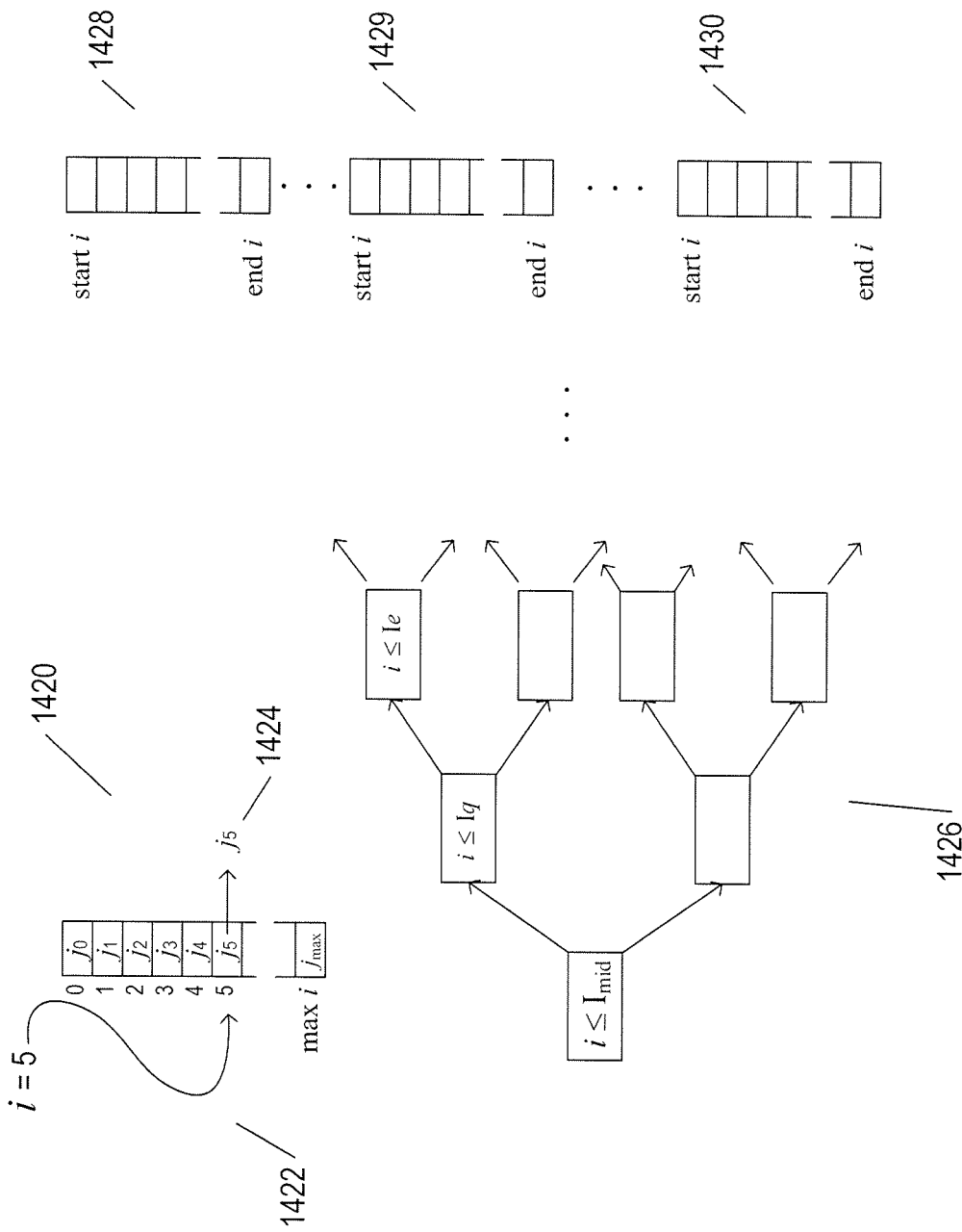

FIGS. 14A-B illustrate the final intensity-mapping model produced by the currently disclosed methods and system. Recall the data table 1206 in FIGS. 12A-E. Each row in this data table corresponds to a histogram, as discussed above with reference to FIG. 12F. As shown in FIG. 14A, an intensity that occurs as a value of a pixel in the first image 1402 corresponds to a histogram of pixel intensities in the second image. When, as shown in histogram 1404, there is a single prominent peak 1406 in the histogram, as determined either by the height of the peak or the relative height of the peak with respect to the next-highest peak, the final mapping model simply maps intensity 1402 to the intensity value $j_{pk}$ corresponding to the prominent peak 1408. Thus, in the prominent-peak case, the mapping function generated by the genetic parameter-fitting method is not used. By contrast, as shown in histogram 1410, when there is no single prominent peak in the distribution of intensities, the mapping function $f(i)$ is used to generate the intensity value 1412 for normalizing intensity value i in the first image. Thus, final intensity-mapping model is a hybrid model, containing both observed intensity correspondences as well as computed intensity correspondences. A hybrid model can be thought of as a discontinuous model in relation to a model solely based on a mapping function.

The final intensity-mapping model for each image domain is a table of computed mappings, such as table 1420 in FIG. 14B. An intensity value of a pixel in the image to be normalized is used as an index 1422 in the table 1420 to select a corresponding normalized value 1424 for the normalized image. However, in cases where there are far more possible intensity values than observed intensity values, in which case the table 1420 would be very large and sparse, a tree-like index 1426 can be developed to index a set of compact tables 1428-1430. An intensity value from the original image is used to traverse the index 1426 to identify the appropriate compact table, and the intensity is then used as an index into that table, following subtraction of the intensity in the first entry of the table from the intensity value, in order to find a corresponding normalized image intensity. Many other types of model data structures are possible.

Figure 15A:
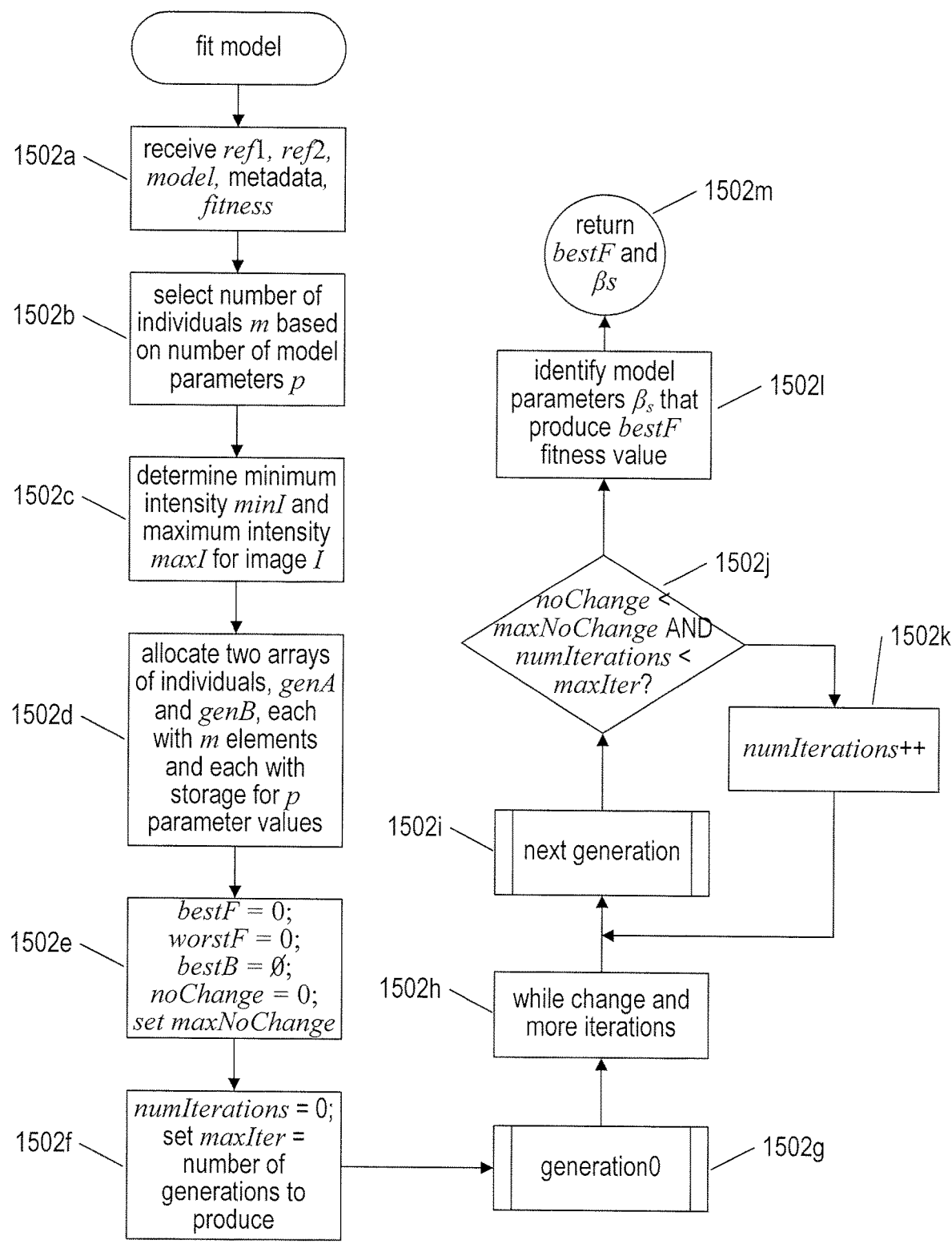
FIGS. 15A-K provide control-flow diagrams that illustrate one implementation of the routine "fit model," called in step 1111 of FIG. 11.

FIGS. 15A-K provide control-flow diagrams that illustrate one implementation of the routine "fit model," called in step 1111 of FIG. 11. The routine "fit model" carries out the parameter-fitting method discussed above with reference to FIGS. 12A-13F. Note that, in certain cases, routines are shown with explicit input parameters, while, in other cases, it is assumed that a called routine can access variables within the scope of the calling routine. In FIG. 15A, the routine "fit model" receives references to the two images, a selected mapping function, or model, image metadata, and a reference to a fitness function, in step 1502a. In step 1502b, the number of m individuals to be used in each generation of the genetic method is determined based on the number of model parameters P. In step 1502c, the minimum and maximum intensity values in image I is determined from the metadata. In step 1502d, two arrays of individuals, referenced by reference variables genA and genB, are allocated to each contain m elements or individuals, each with storage for P parameter values. In step 1502e, a number of variables are initialized, including the variables bestF, worstF, bestβ, noChange, and maxNoChange. In step 1502f, the variable numIterations is set to 0 and the variable maxIter is set to the number of generations to produce during the genetic optimization method. In step 1502g, the routine "generation 0" is called to generate the first generation of individuals, as discussed above with reference to FIG. 13B. Then, in the for-loop of steps 1502h-1502k, the routine "next generation" is iteratively called, in step 1502i, until either no change in fitness has been observed for some number of preceding iterations, as represented by the value in the variable noChange, or until the maximum number of iterations maxIter has been carried out, as determined in step 1502j. In step 1502l, the parameters of the individual that produced the best fitness value are selected as the model parameters and are returned, in step 1502m along with the fitness value for those parameters.

Figure 15B:
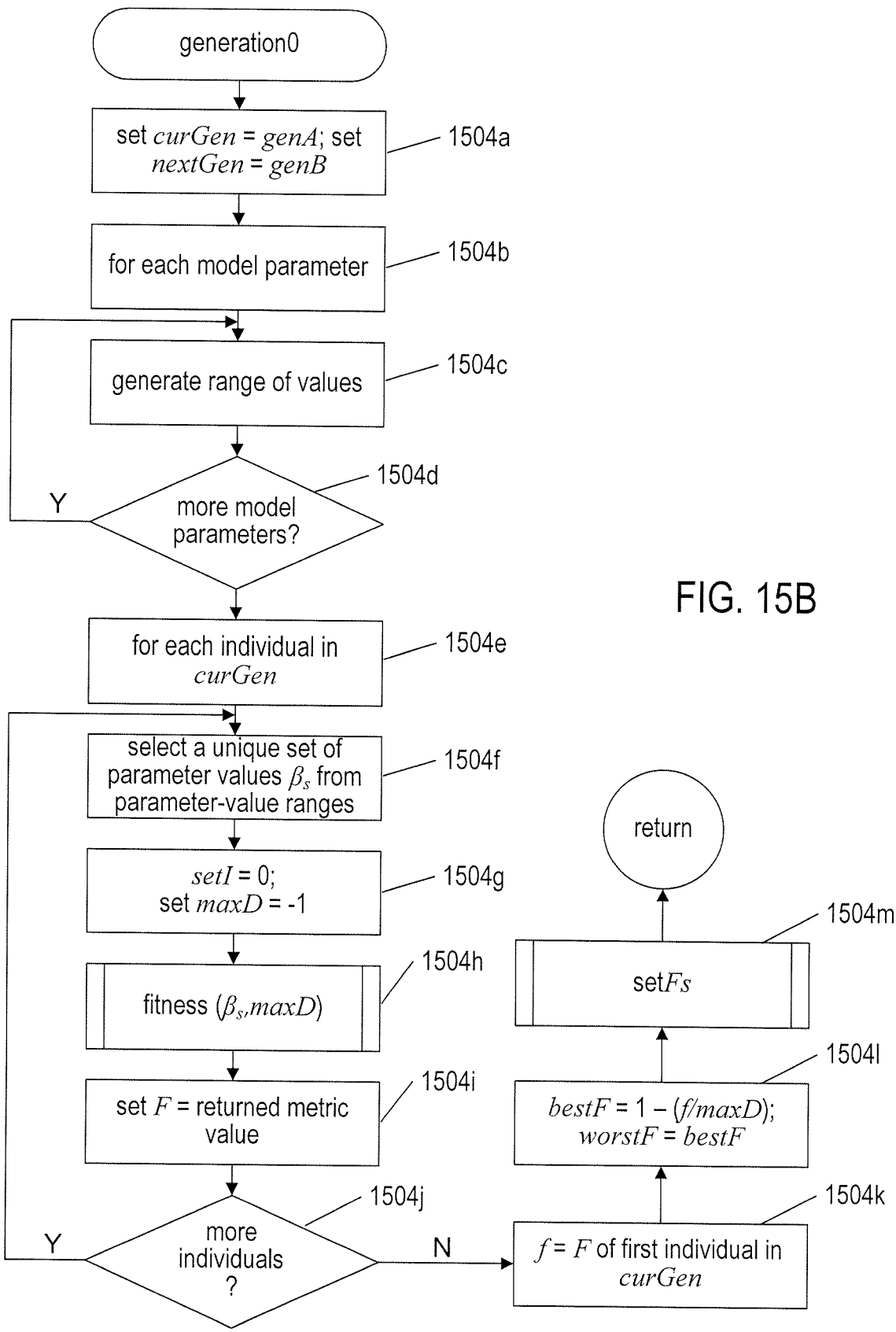

FIG. 15B provides a control-flow diagram for the routine "generation 0," called in step 1502g of FIG. 15A. In step 1504a, the reference curGen is set to the value of the reference genA and the reference nextGen is set to the value of reference genB. In the for-loop of steps 1504b-1504d, a set of candidate model parameter values is generated, as shown in matrix 1316 of FIG. 13B. Then, in the for-loop of steps 1504e-1504j, each of the individuals in generation 0 is initialized. A set of unique parameter values is selected from the candidate parameter values for the individual in step 1504f. The timestamp for the individual is set to 0 in step 1504g. In step 1504h, the routine referenced by the parameter fitness supplied to routine "fit model" is called in order to compute the metric value D for the selected set of parameter values, as discussed above with reference to FIG. 12G. Initially, the metric value is inserted as the fitness value into the individual in step 1504i. In steps 1504k and 1504l, the variables bestF and worstF are initialized with a first fitness value for the first generation-0 individual, and then, in step 1504m, the routine "setFs" is called to transform the metric values in the individuals of generation 0 to fitness values, according to equation 1308 in FIG. 13A while keeping track of the best and worst observed fitness values.

Figure 15C:
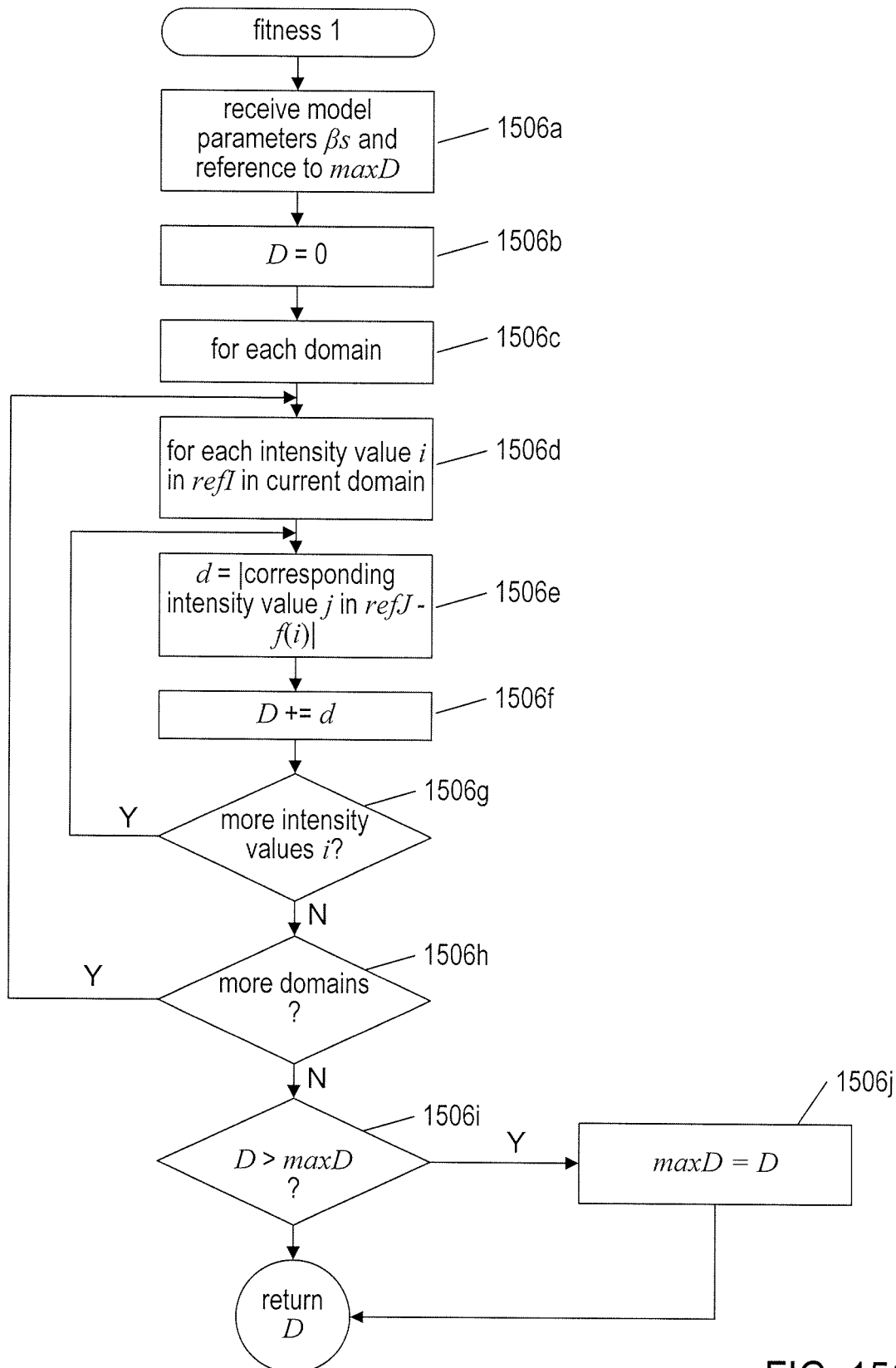

FIG. 15C provides a control-flow diagram for the routine "fitness 1," one of the fitness routines called in step 1504h of FIG. 15B. Again note that, in step 1504h of FIG. 15B, the routine "fitness 1" is called via the internal argument name "fitness." This fitness function is used for normalization, as discussed above with reference to FIG. 11. In step 1506a, the routine "fitness 1" receives a set of model parameters $\beta_s$ and a reference to the variable maxD which contains the maximum metric value so far observed. In step 1506b, local variable D is set to 0. In the outer loop of steps 1506c-1506h, each image domain is considered. In the inner loop of steps 1506d-1506g, the difference metric value for the model is computed, as discussed above with reference to FIG. 12G. When the computed difference metric D is greater than the value in maxD, as determined in step 1506i, maxD is set to the value of D in step 1506j.

Figure 15D:
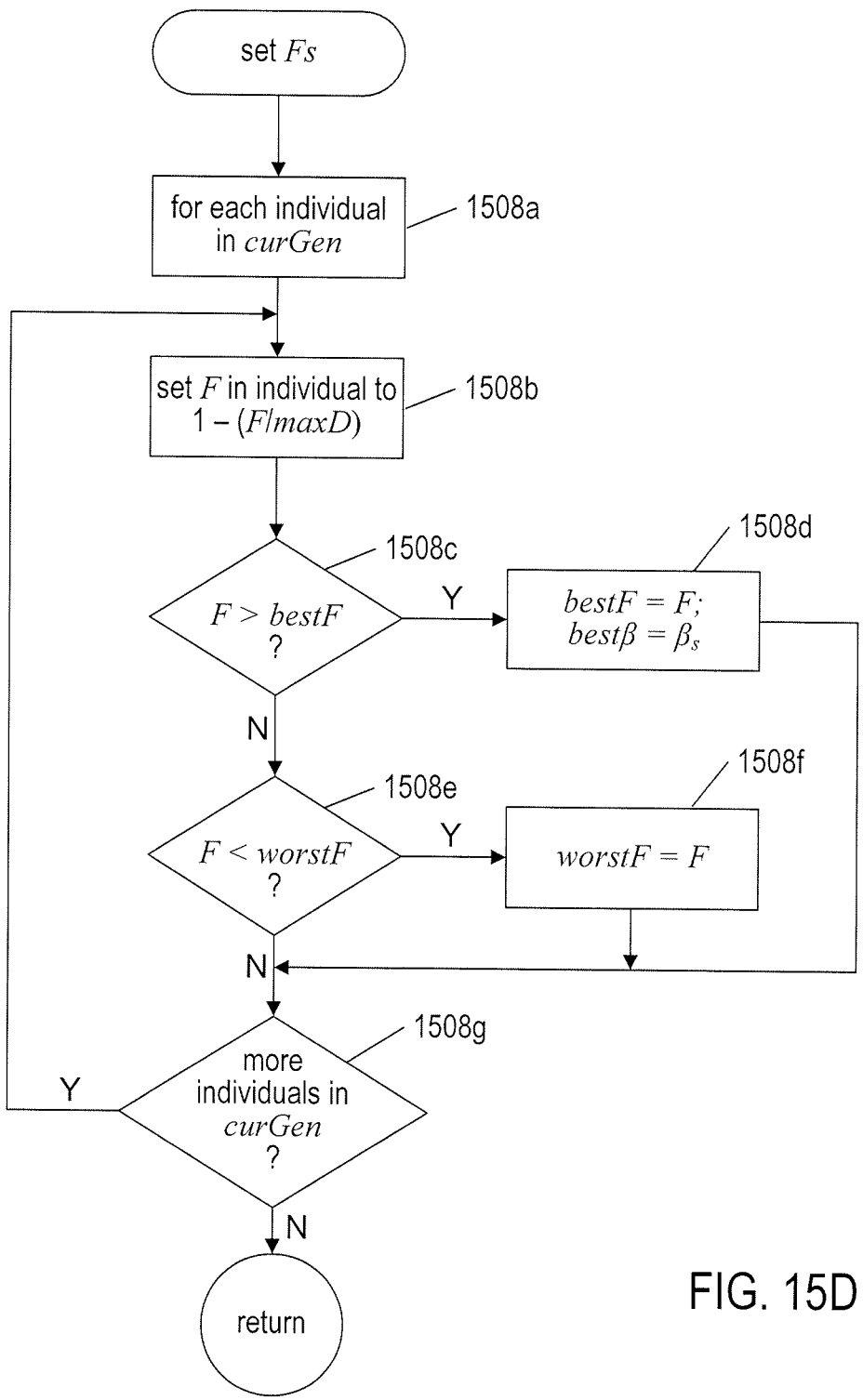

FIG. 15D provides a control-flow diagram for the routine "setFs," called in step 1504m of FIG. 15B. In the for-loop of steps 1508a-1508g, each individual in the array referenced by curGen is considered, and the difference metric stored as the fitness value in the individual is transformed, by equation 1308 in FIG. 13A, into a fitness value. That is, in step 1504i of FIG. 15B and step 1516i of FIG. 15H, discussed below, a difference-metric value is initially inserted into the field F of each individual, and now, in the routine "setFs," the difference-metric value is changed to a fitness value using equation 1308 in FIG. 13A. In addition, the computed fitness values are compared with the values stored in bestF and worstF and those values are updated when the currently computed fitness value is better or worse than the fitness values in bestF and worstF, respectively. The parameter set for the best fitness value is maintained in the variable best 13.

Figure 15E:
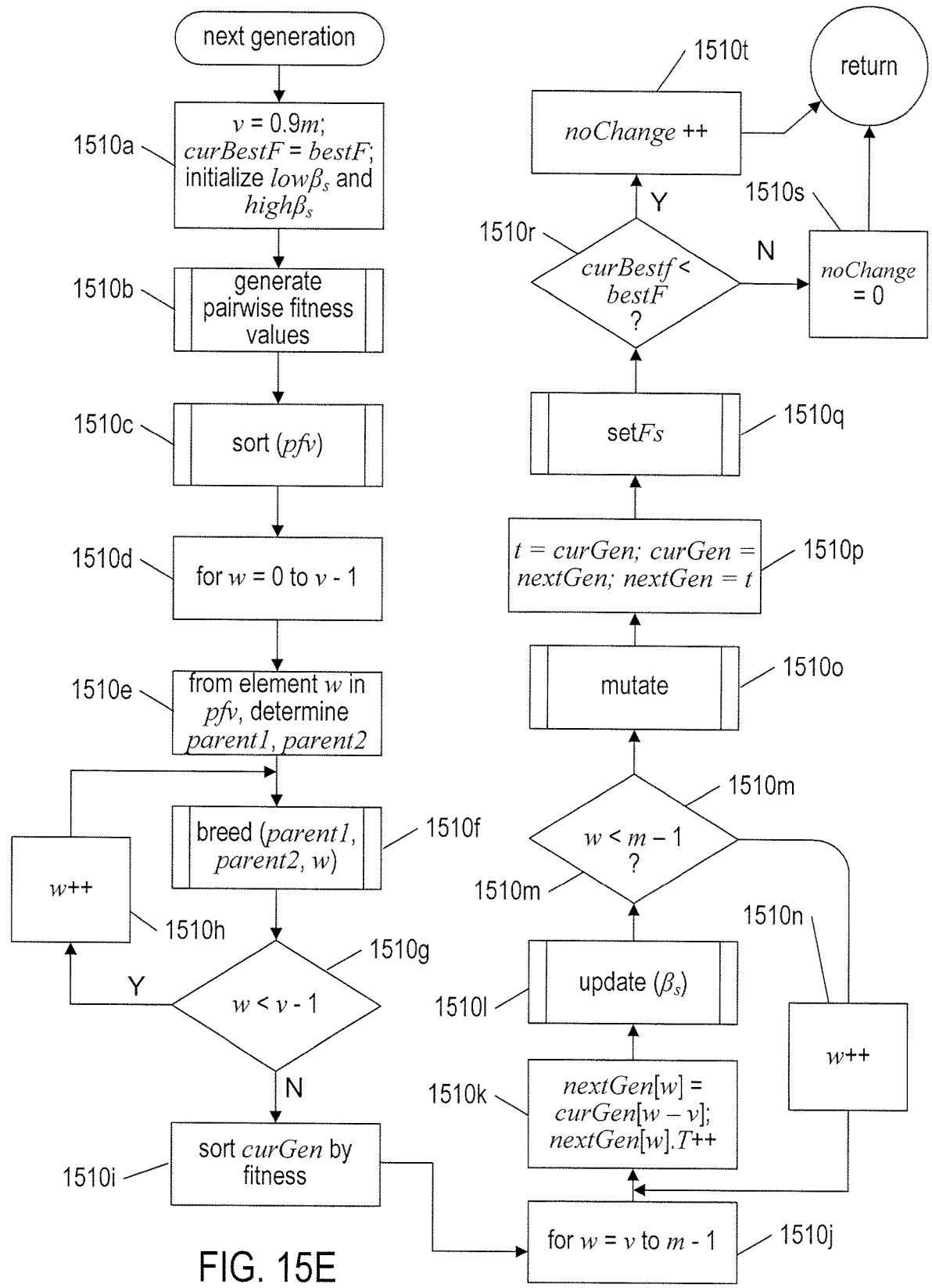

FIG. 15E provides a control-flow diagram for the routine "next generation," called in step 1502i in FIG. 15A. This routine carries out the production of a next generation of individuals, as discussed above with reference to FIGS. 13C-13F. In step 1510a, the variable v is set to 0.9 times the number of individuals m, the variable curBestF is set to the contents of variable bestF, and two arrays of model parameters low$\beta_s$ and high$\beta_s$ are both initialized. As discussed above, the number 0.9 is one possible value for the death ratio for individuals in succeeding generation, but other death ratios may be used in alternative implementations. In step 1510b, the routine "generate pairwise fitness values" is called to generate the pairwise fitness values (1324 in FIG. 13C), as discussed above with reference to FIG. 13C. In step 1510c, the pairwise fitness values, stored in an array pfv along with identifications of the individuals from which they were generated, are sorted, as discussed above with reference to sort operation 1325 in FIG. 13C. In the for-loop of steps 1510d-1510h, the most fit pairs of parents, selected based on the sorted pairwise fitness values in the array pfv, are bred, by a call to the routine "breed" in step 1510f, to produce a child individual for the next generation. Breeding is discussed above with reference to FIG. 13D. In step 1510i, the individuals in the array referenced by curGen are sorted by fitness value and, in the for-loop of steps 1510j-1510n, the most fit of the previous-generation individuals are transferred to the final 10% of individuals in the next generation, as discussed above with reference to FIG. 13C. The routine "update," called in step 1510l, is used to update the parameter-value arrays low$\beta_s$ and high$\beta_s$ to keep track of the lowest and highest values for each model parameter. In step 1510o, the routine "mutate" is called to mutate each individual in the next generation, as discussed above with reference to FIG. 13F. In step 1510p, the reference curGen is set to point to the newly created next generation and the reference nextGen is set to point to the individuals of the previous generation, in preparation for another iteration of generation production. In step 1510q, the routine "setFs" is called to transform the difference metric values in the individuals of the next generation to fitness values, as discussed above with reference to FIG. 15D. When the value stored in the local variable curBestF is less than bestF, indicating that a new best fitness value has been produced during production of the next generation of individuals, the value of the global variable noChange is set to 0 in step 1510s. Otherwise, the value in global variable noChange is incremented, in step 1510t. As discussed above, when the value stored in global variable noChange reaches a threshold value, the genetic optimization method is terminated, since at least a very good local optimum for the model parameter values has been obtained.

Figure 15F:
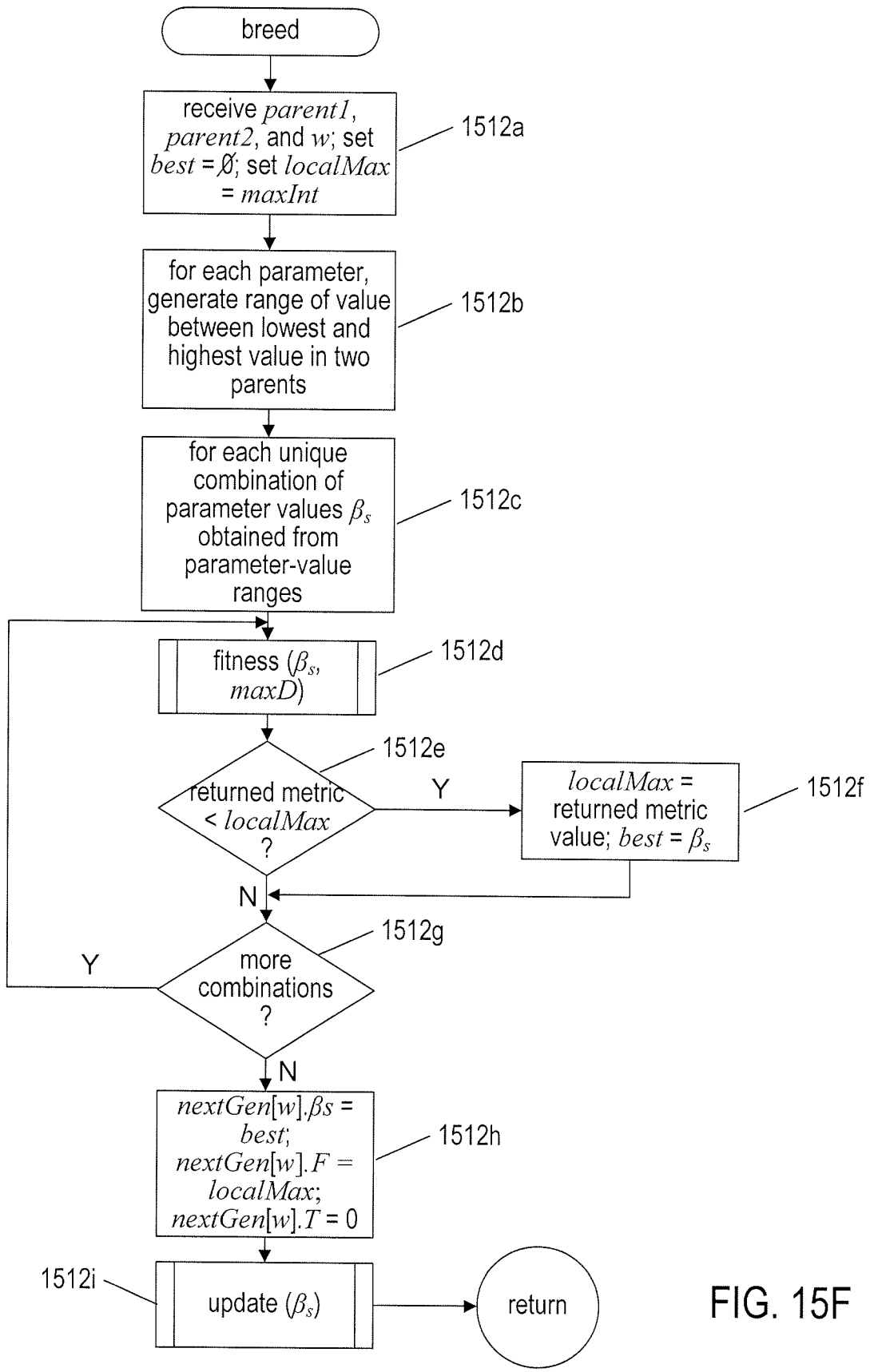

FIG. 15F provides a control-flow diagram for the routine "breed," called in step 1510f of FIG. 15E. This routine carries out the generation of a child individual for a subsequent generation from two parent individuals in a current generation, as discussed above with reference to FIG. 13D. In step 1512a, the routine "breed" receives references to the two parent individuals, parent1 and parent2, and the index w of the child individual in the subsequent generation. The variable best is set to the empty set. The variable localMax is set to a large number. In step 1512b, ranges of parameter values are determined, as discussed above with reference to tables 1342 and 1343 in FIG. 13D. In the for-loop of steps 1512c-1512g, the fitness of each of the combinations of parameter values selected from evenly spaced candidate parameter values within the ranges of values for each parameter, discussed above with reference to items 1348-1350 in FIG. 13D, is evaluated by a call to the routine "fitness" in step 1512d. The most fit set of candidate parameter values is monitored in the for-loop of steps 1512c-1512g, with the variables localMax and best set to the fitness value and candidate parameters of the best so-far-observed fitness, in step 1512f. In step 1512h, following termination of the for-loop of steps 1512c-1512g, the child individual, indexed by index w, is updated with the best set of parameters and difference metric value obtained in the for-loop of steps 1512c-1512g. The routine "update," called in step 1512i, updates the low$\beta_s$ and high$\beta_s$ arrays to keep track of the smallest and greatest values for each model parameter.

Figure 15G:
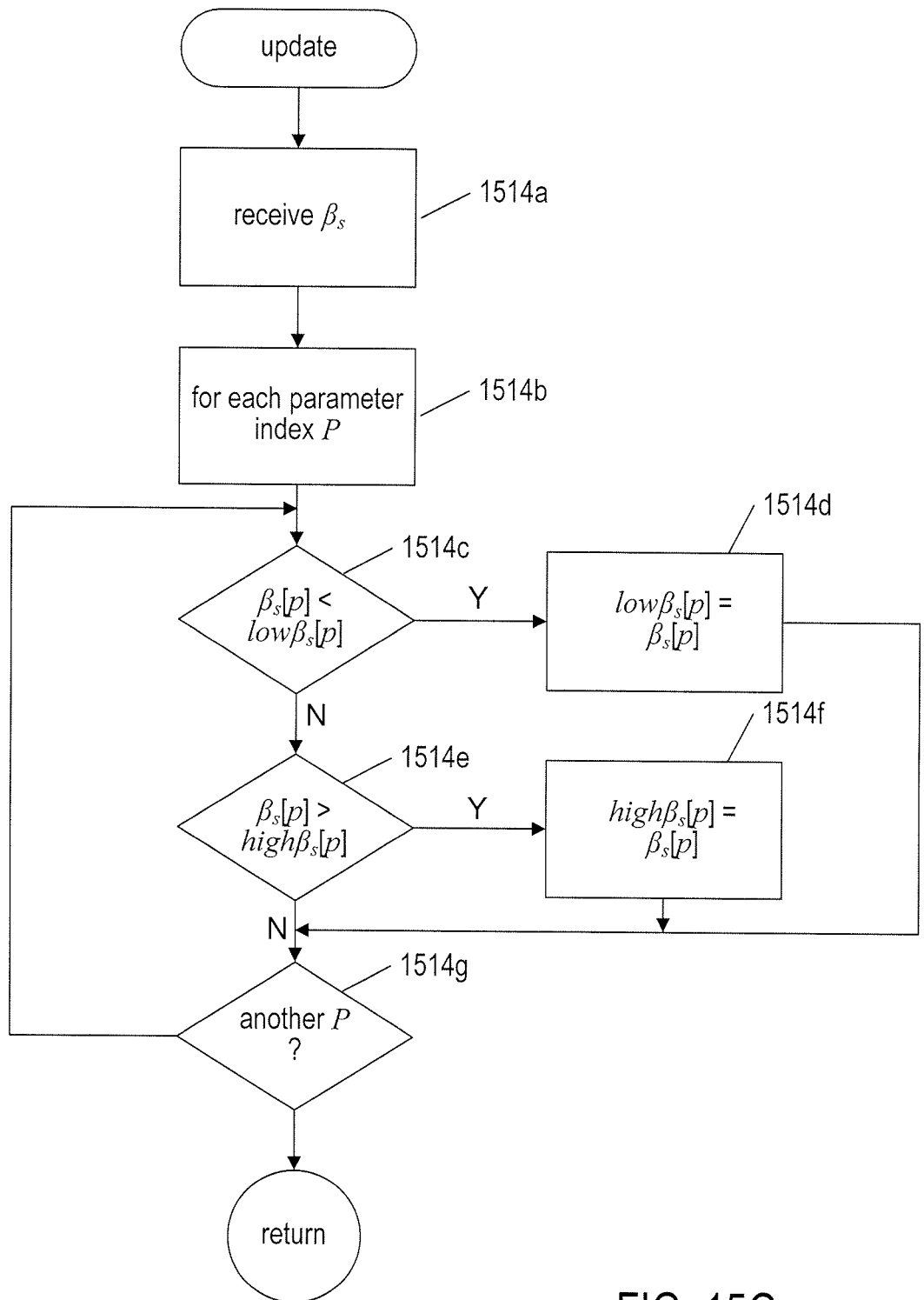

FIG. 15G provides a control-flow diagram for the routine "update," called in steps 15101 of FIG. 15E and 1512i in FIG. 15F. In step 1514a, the routine "update" receives a set of candidate parameter values. In the for-loop of steps 1514b-1514g, each parameter value in the received set of parameter values is evaluated against the contents of the two arrays low$\beta_s$ and high$\beta_s$ to ensure that these arrays contain the lowest and highest value for each model parameter so far observed during the genetic optimization of parameter values.

Figure 15H:
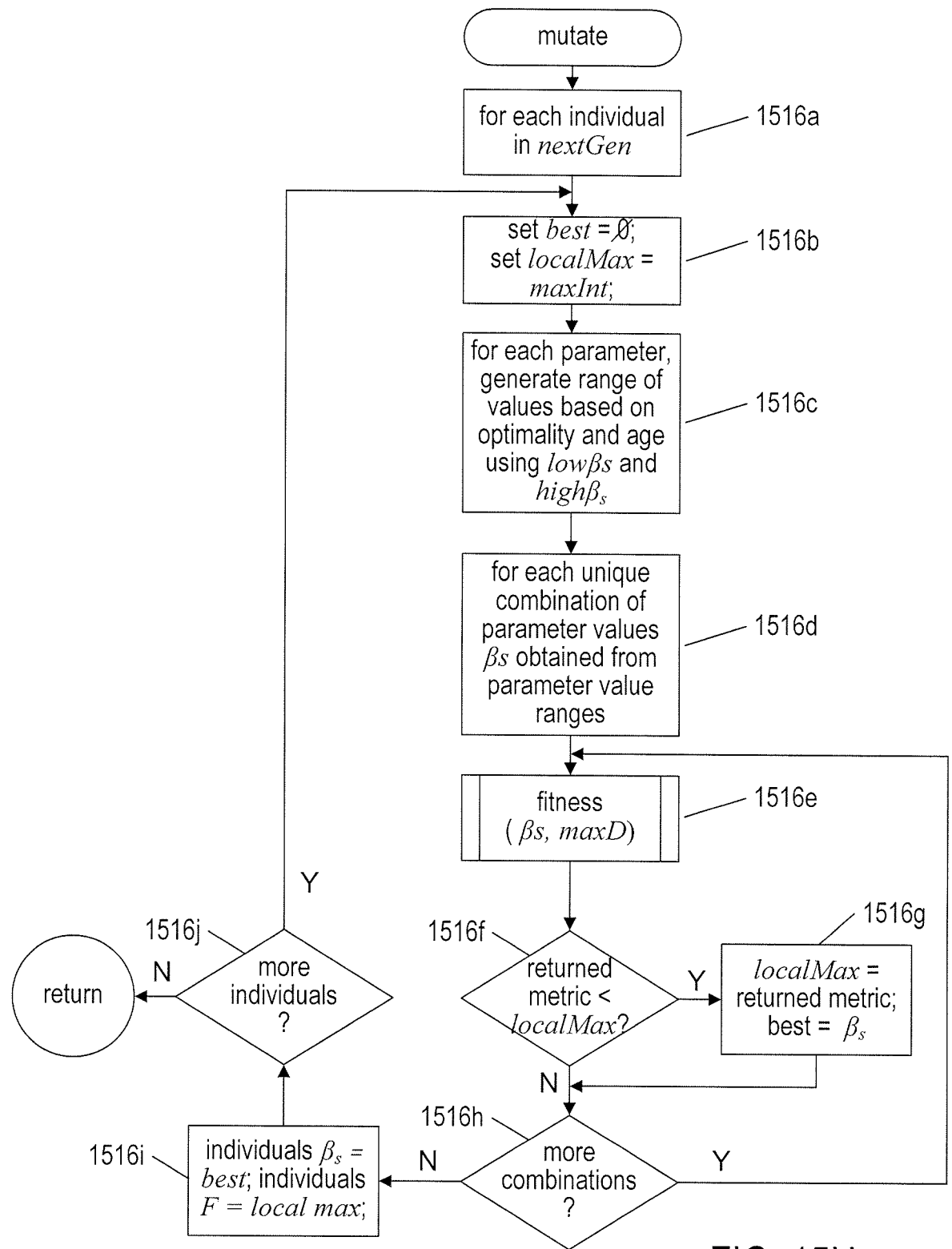

FIG. 15H provides a control-flow diagram for the routine "mutate," called in step 1510o of FIG. 15E. The routine "mutate" carries out the mutation of individuals in a next generation, as discussed above with reference to FIGS. 13E and 13F. In the for-loop of steps 1516a-1516h, each individual in the next generation is considered. In step 1516b, local variables best and localMax are initialized, similarly to the initiation of local variables in step 1512a of FIG. 15F of the same name. In step 1516c, sets of candidate parameter values are selected from a range of candidate values for each model parameter shown as array 1374 of candidate parameter values in FIG. 13E. For each combination of a parameter-value set generated from these candidate parameter values, the routine "fitness" is called, in step 1516e, to generate a difference metric for the currently considered set of model parameter values. As in the for-loop of steps 1512c-1512g in FIG. 15F, the set of parameters that generates the lowest difference metric is determined in the for-loop of steps 1516d-1516h of FIG. 15H. In step 1516i, the currently considered individual is updated with the best determined set of candidate parameters obtained by parameter mutation in steps 1516b-1516h.

Figure 15I:
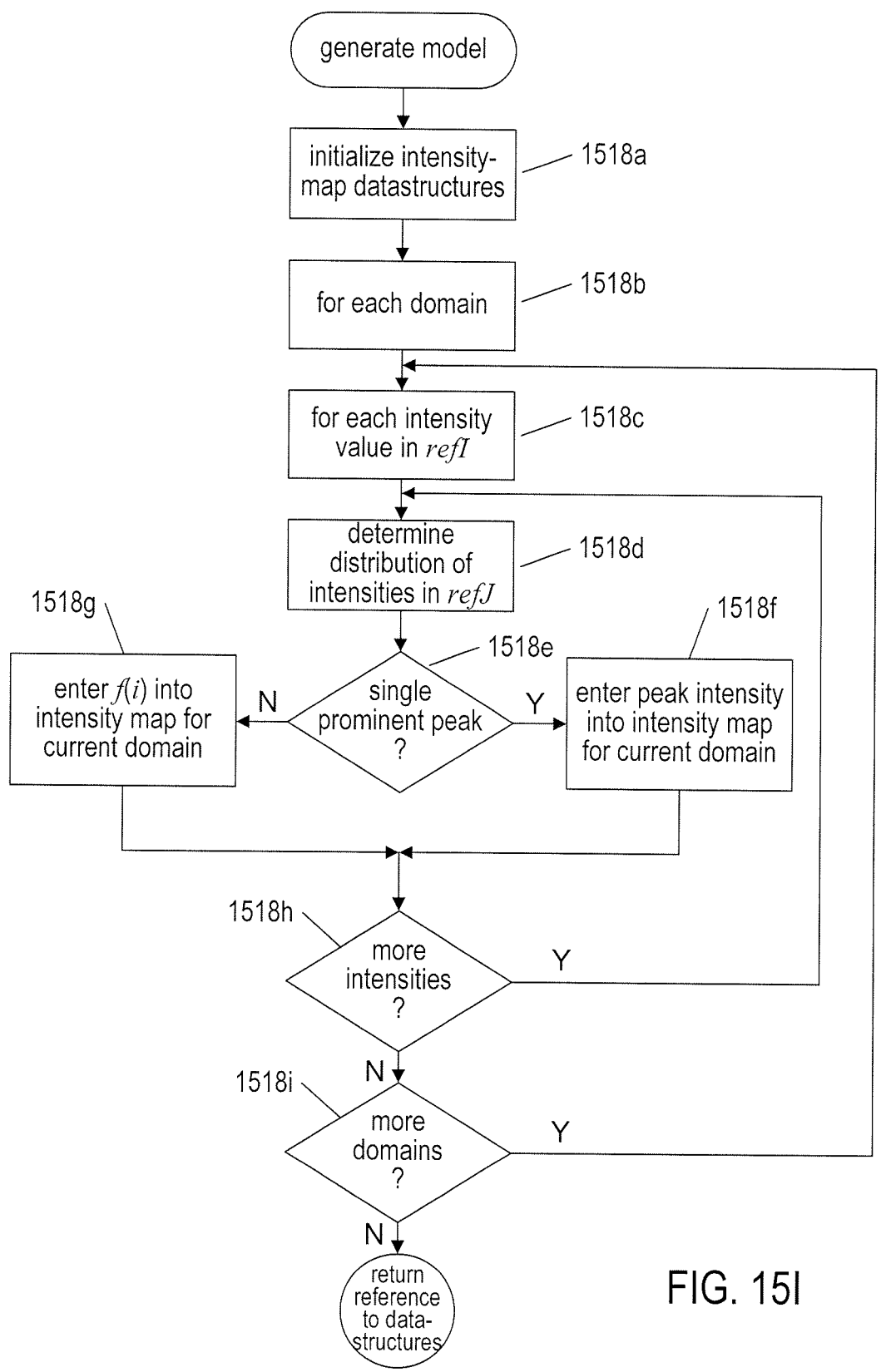

FIG. 15I provides a control-flow diagram for the routine "generate model," called in step 1118 of FIG. 11. In step 1518a, one or more data structures for the intensity map discussed above with reference to FIG. 14B are initialized. In the outer for-loop of steps 1518b-1518i, each image domain is considered. In the inner for-loop of steps 1518c-1518h, each discrete intensity value observed in the currently considered domain in image I is considered. In step 1518d, the distribution of intensities in image J for the currently considered intensity in image I is determined. When this distribution shows a single prominent peak, as determined in step 1518e, as discussed with reference to FIG. 14A, then that peak intensity is entered into the intensity map for the currently considered intensity of the currently considered domain in step 1518f. Otherwise, in step 1518g, an intensity is generated using the mapping function fit to the data by the genetic optimization method, as discussed above with reference to FIG. 14A.

Figure 15J:
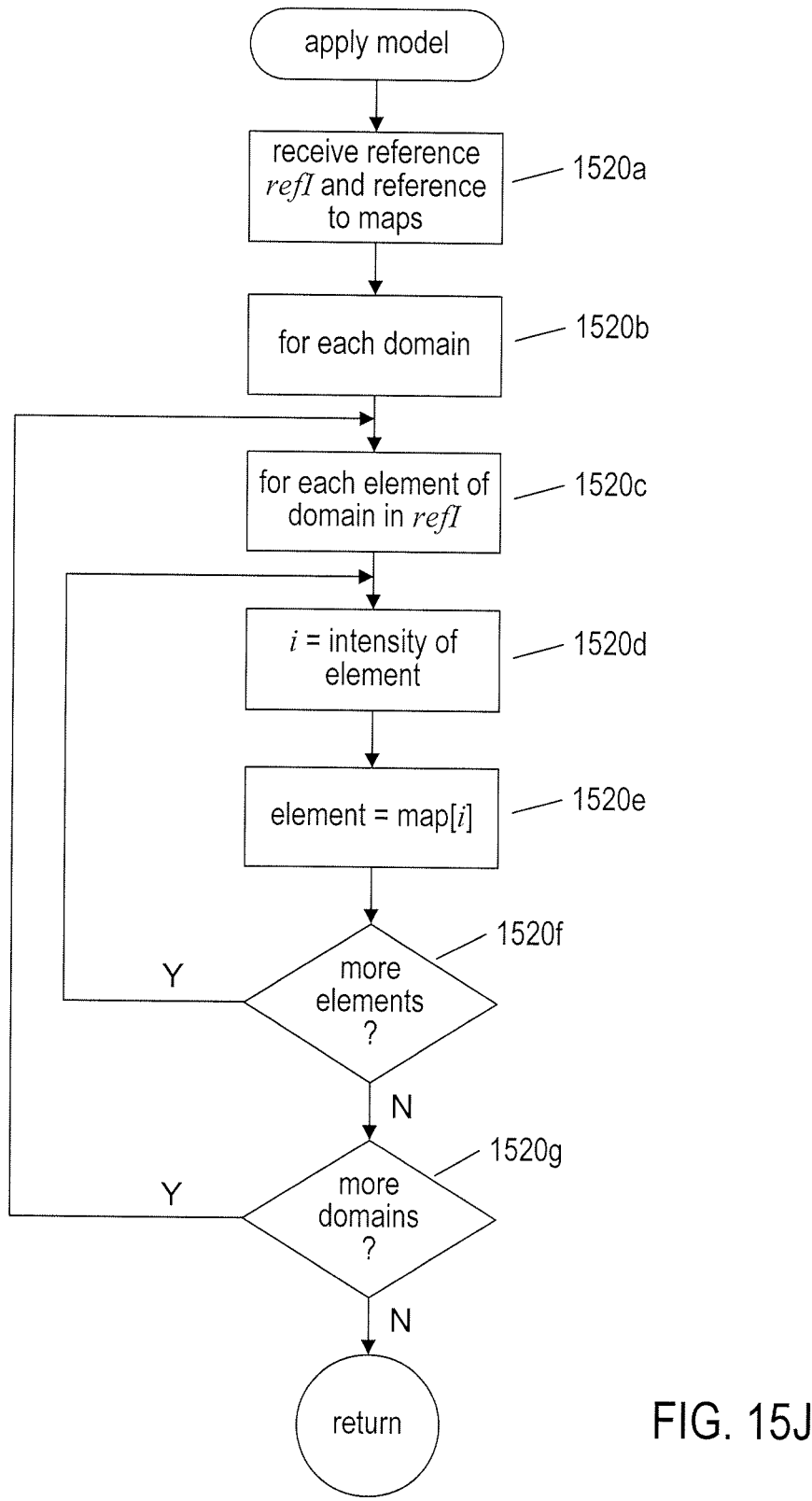

FIG. 15J provides a control-flow diagram for the routine "apply model" called in step 1120 of FIG. 11. In step 1520a, the routine "apply model" receives a reference to image I and a reference to the intensity-map data structure generated in step 1118 of FIG. 11. In the outer for-loop of steps 1520b-1520g, each domain of the image is considered. In the inner for-loop of steps 1520c-1520f, the intensity map for the currently considered domain is used to modify the intensity value of each pixel within that domain of image I.

Figure 15K:
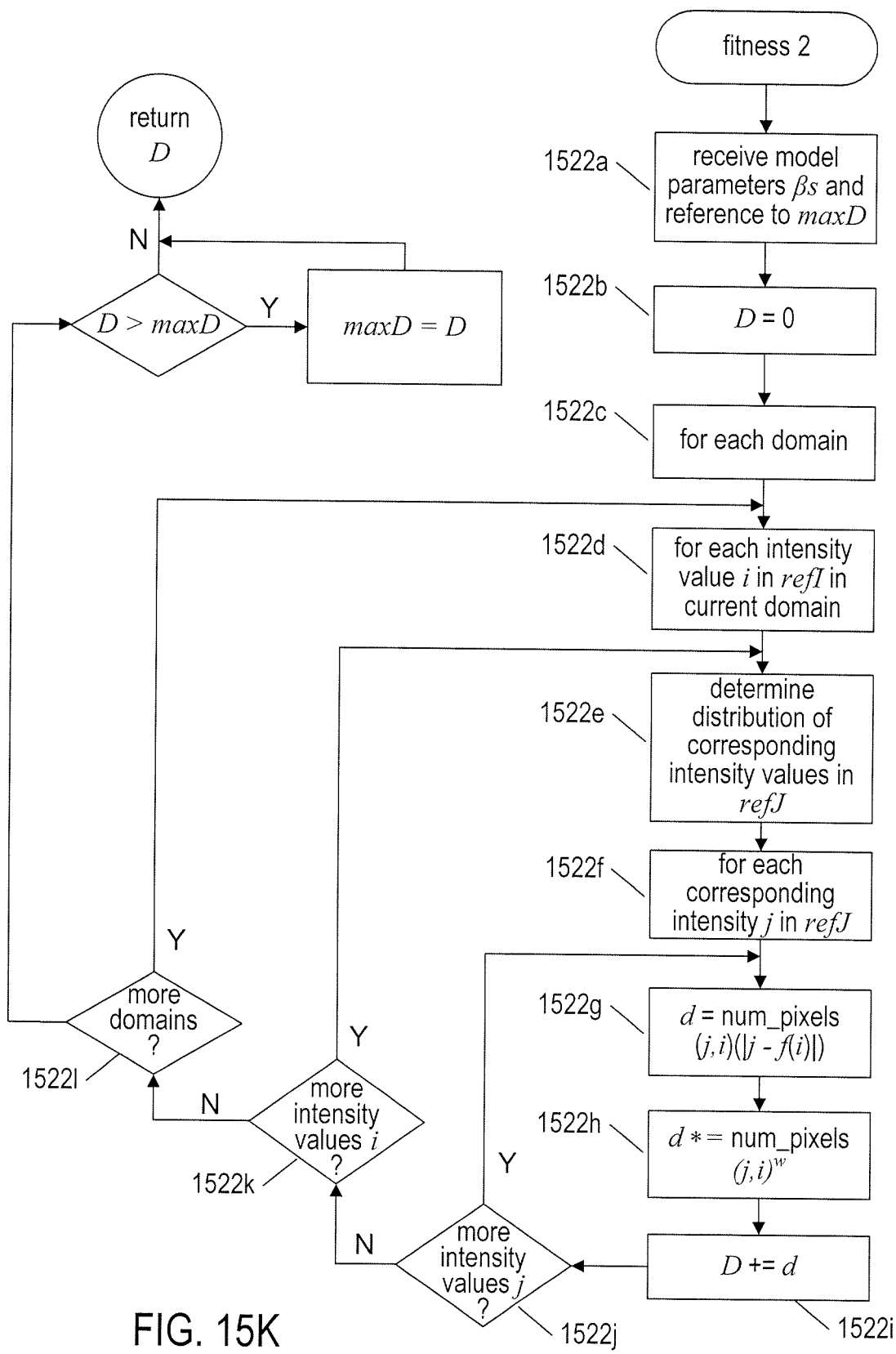

FIG. 15K provides a control-flow diagram for the routine "fitness 2," another of the fitness routines called in step 1504h of FIG. 15B. As discussed above, with reference to FIG. 11, this fitness function is called during amelioration of inhomogeneities. In step 1522a, the routine "fitness 2" receives a set of model parameters $\beta_s$ and a reference to the variable maxD, which contains the maximum metric value so far observed. In step 1522b, local variable D is set to 0. In the outer for-loop of steps 1522c-15061, each image domain is considered. In the inner for-loop of steps 1522d-1506k, each different intensity value in the currently considered domain of the image referenced by refI is considered. In the innermost for-loop of steps 1522f-1506j, each intensity in the image referenced by refJ corresponding to the currently considered intensity in the image referenced by refI is considered. In step 1522e, the information referenced by the table 1242 or histograms, discussed above with reference to FIG. 12G, is collected for the currently considered intensity in the image referenced by refI. In step 1522g, the local variable d is set to the metric value computed according to expression 1260 in FIG. 12G. In step 1522h, the metric value stored in local variable d is multiplied by the number of pixels having the currently considered intensity value of the image referenced by refJ raised to the power w, where w is a parameter for the function "fitness 2." This multiplicative factor penalizes non-compact distributions of intensity values in the image referenced by refJ corresponding to an intensity value in the image referenced by refI. Thus, data fitting for spatial mapping functions used to ameliorate inhomogeneities seeks to produce compact distributions of intensity values in the image referenced by refJ corresponding to each intensity value the image referenced by refI. When the computed difference metric D is greater than the value in maxD, as determined in step 1506i, maxD is set to the value of D in step 1506j. Various other numeric values may be computed to penalize non-compact distributions.

Although the present invention has been described in terms of particular embodiments, it is not intended that the invention be limited to these embodiments. Modifications within the spirit of the invention will be apparent to those skilled in the art. For example, any of many different implementations may be generated by modifying any of many different implementation and design parameters, including selection of hardware and computing platforms, programming languages, modular organization, control structures, data structures, and other such implementation and design parameters. Although a genetic approach to parameter optimization has proved to be efficient and robust, other types of optimization methods may be employed to generate the currently disclosed intensity map. The currently disclosed normalization method may be applied to color images as well as grayscale images, with each color channel of a color image separately normalized, in one approach, or a single-pass normalization may be used in which the intensity values for the color channels are combined.

It is appreciated that the previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The invention claimed is:

1. An image-normalization system comprising:
   a computer system that includes one or more processors, one or memories, and one or more-storage devices; and
   computer instructions, stored in the one or more memories, that, when executed on the one or more processors, control the computer system to
      receive two digital images, including a first image and a second image, each having image units that are each associated with a position and an intensity,
      identify one or more domains common to both images,
      select one or more mapping functions,
      determine parameters for the one or more mapping functions using genetic parameter fitting,
      select a final mapping function, and
      use the final mapping function to adjust intensities in one of the two images.

2. The image-normalization system of claim 1 wherein the two digital images are one of:
   a pair of two-dimensional digital images in which domains are areas and units are pixels; and
   a pair of three-dimensional digital images in which domains are volumes and units are voxels.

3. The image-normalization system of claim 1
   wherein the first and second images are registered with one another so that each equivalent pair of pixels selected from the two images correspond to the same point within the imaged environment;
   wherein, when a first image unit is associated with a position in the first image that is equivalent to a position associated with a second image unit in the second image, the first and second image units are equivalent; and
   wherein a mapping function is one of
      a parameterized function that returns an intensity value associated with an image unit in one of two digital images based on the intensity value associated with an equivalent image unit in the other of the two digital images,
      a parameterized function that returns an intensity value for an image unit in one of two digital images based on the domain of, and intensity value associated with, an equivalent image unit in the other of the two digital images; and
      a parameterized function that returns an intensity value for an image unit in one of two digital images based on the intensity value and position of the equivalent image unit in the other of the two digital images.

4. The image-normalization system of claim 3 wherein determining parameters for the one or more mapping functions further comprises:
   generating a fitness metric for the mapping function and a current set of mapping-function parameters.

5. The image-normalization system of claim 1 wherein selecting a final mapping function further comprises selecting a mapping function from the one or more selected mapping functions that produces an optimal fitness metric.

6. The image-normalization system of claim 1 further including:
   after using the final mapping function to adjust intensities in one of the two images,
      selecting a spatial mapping function,
      determining parameters for the selected spatial mapping function, and
   applying the spatial mapping function to the first image to ameliorate inhomogeneities.

* * * * *